US012141535B2

(12) United States Patent
Galitsky

(10) Patent No.: US 12,141,535 B2
(45) Date of Patent: Nov. 12, 2024

(54) TECHNIQUES FOR MAINTAINING RHETORICAL FLOW

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 451 days.

(21) Appl. No.: 17/725,496

(22) Filed: Apr. 20, 2022

(65) Prior Publication Data

US 2022/0253611 A1 Aug. 11, 2022

Related U.S. Application Data

(63) Continuation-in-part of application No. 17/071,608, filed on Oct. 15, 2020, now Pat. No. 11,775,771, (Continued)

(51) Int. Cl.
*G06F 40/30* (2020.01)
*G06F 16/31* (2019.01)
(Continued)

(52) U.S. Cl.
CPC ............ *G06F 40/35* (2020.01); *G06F 16/322* (2019.01); *G06F 16/3329* (2019.01); (Continued)

(58) Field of Classification Search
CPC ...... G06F 17/27; G06F 17/20; G06F 17/2705; G06F 17/271; G06F 17/2715; (Continued)

(56) References Cited

U.S. PATENT DOCUMENTS 5,495,605 A * 2/1996 Cadot ............... G06F 16/24537
5,930,392 A * 7/1999 Ho ......................... G06F 18/211
382/226
(Continued)

FOREIGN PATENT DOCUMENTS

CN 101957812 A 1/2011
CN 102165518 A 8/2011
(Continued)

OTHER PUBLICATIONS

Chinese Application No. 201880030891.1, Office Action mailed on Sep. 4, 2023, 16 pages (9 pages of Original Document and 7 pages of English Translation).
(Continued)

*Primary Examiner* — Lamont M Spooner
(74) *Attorney, Agent, or Firm* — Kilpatrick Townsend & Stockton LLP

(57) ABSTRACT

Disclosed systems, devices, and methods improve dialogue management through the use of dialogue discourse trees (DDTs). To determine whether a candidate response (CR) is appropriate in the dialogue, the CR can be added to other utterances that have been previously provided in a dialogue between two parties and a dialogue discourse tree (DDT) can be generated from the result. The DDT includes nodes corresponding to elementary discourse units (EDUs) representing text fragments of the utterances and the CR. The DDT may include nodes that indicate rhetorical relationships between EDUs. In some embodiments, the DDT comprises a node representing at least one dialogue-specific rhetorical relationship between two utterances. The DDT for the CR can be provided to a machine-learning model that has been trained to identify whether the rhetorical flow is maintained between the utterances of the DDT. If so, the CR can be provided in response to the request.

20 Claims, 36 Drawing Sheets

Related U.S. Application Data which is a continuation of application No. 15/975,685, filed on May 9, 2018, now Pat. No. 10,853,581.

(60) Provisional application No. 63/179,926, filed on Apr. 26, 2021, provisional application No. 62/504,377, filed on May 10, 2017.

(51) Int. Cl.
| | |
|---|---|
| G06F 16/332 | (2019.01) |
| G06F 18/22 | (2023.01) |
| G06F 40/211 | (2020.01) |
| G06F 40/35 | (2020.01) |
| G06F 40/44 | (2020.01) |
| G06F 40/51 | (2020.01) |
| G06F 40/55 | (2020.01) |
| G06N 3/08 | (2023.01) |

(52) U.S. Cl.
CPC .............. *G06F 18/22* (2023.01); *G06F 40/211* (2020.01); *G06F 40/44* (2020.01); *G06F 40/51* (2020.01); *G06F 40/55* (2020.01); *G06N 3/08* (2013.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795; G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 6,112,168 A * | 8/2000 | Corston | G06F 40/253 704/9 |
| 6,181,909 B1 | 1/2001 | Burstein et al. | |
| 6,411,424 B1 | 6/2002 | Raj | |
| 6,731,307 B1 | 5/2004 | Strubbe et al. | |
| 6,961,692 B1* | 11/2005 | Polanyi | G06F 40/35 704/8 |
| 7,013,259 B1 | 3/2006 | Polanyi et al. | |
| 7,152,031 B1* | 12/2006 | Jensen | G06F 16/3344 707/999.005 |
| 7,359,860 B1 | 4/2008 | Miller et al. | |
| 7,519,529 B1 | 4/2009 | Horvitz | |
| 7,533,013 B2* | 5/2009 | Marcu | G06F 40/35 704/7 |
| 7,551,552 B2 | 6/2009 | Dunagan et al. | |
| 7,840,556 B1* | 11/2010 | Dayal | G06F 16/2453 707/999.003 |
| 7,991,841 B2 | 8/2011 | Anderson et al. | |
| 8,260,817 B2 | 9/2012 | Boschee et al. | |
| 8,694,303 B2* | 4/2014 | Hopkins | G06F 40/44 704/8 |
| 8,756,617 B1* | 6/2014 | Boodman | H04L 63/0823 726/25 |
| 8,935,152 B1 | 1/2015 | Li et al. | |
| 9,037,464 B1 | 5/2015 | Mikolov et al. | |
| 9,171,037 B2 | 10/2015 | Galitsky et al. | |
| 9,292,490 B2* | 3/2016 | Kimelfeld | G06F 40/289 |
| 9,449,080 B1 | 9/2016 | Zhang | |
| 9,514,098 B1* | 12/2016 | Subramanya | G06F 40/284 |
| 9,559,993 B2 | 1/2017 | Palakovich et al. | |
| 9,582,501 B1* | 2/2017 | Salmon | G06F 40/30 |
| 9,620,933 B1 | 4/2017 | Huang et al. | |
| 9,646,078 B2 | 5/2017 | Galitsky et al. | |
| 9,817,721 B1 | 11/2017 | Youngworth | |
| 10,019,716 B1 | 7/2018 | Ainslie et al. | |
| 10,175,865 B2 | 1/2019 | Beaver et al. | |
| 10,289,974 B1 | 5/2019 | Ouimette | |
| 10,545,648 B2 | 1/2020 | Beaver et al. | |
| 10,551,626 B2 | 2/2020 | Marciante | |
| 10,599,885 B2 | 3/2020 | Galitsky | |
| 10,679,011 B2 | 6/2020 | Galitsky | |
| 10,796,099 B2 | 10/2020 | Galitsky et al. | |
| 10,796,102 B2 | 10/2020 | Galitsky | |
| 10,817,670 B2 | 10/2020 | Galitsky | |
| 10,839,154 B2 | 11/2020 | Galitsky | |
| 10,839,161 B2 | 11/2020 | Galitsky | |
| 10,853,574 B2 | 12/2020 | Galitsky | |
| 10,853,581 B2 | 12/2020 | Galitsky | |
| 10,935,802 B2 | 3/2021 | Marciante | |
| 10,949,623 B2 | 3/2021 | Galitsky | |
| 11,023,684 B1 | 6/2021 | Flor et al. | |
| 11,100,144 B2 | 8/2021 | Galitsky | |
| 11,182,412 B2 | 11/2021 | Galitsky | |
| 11,347,946 B2 | 5/2022 | Galitsky | |
| 11,373,632 B2 | 6/2022 | Galitsky | |
| 11,386,274 B2 | 7/2022 | Galitsky | |
| 11,410,072 B2* | 8/2022 | Burstein | G06N 5/022 |
| 11,455,469 B2* | 9/2022 | Alam | G06Q 10/107 |
| 11,586,827 B2 | 2/2023 | Galitsky | |
| 11,615,145 B2 | 3/2023 | Galitsky | |
| 11,694,037 B2 | 7/2023 | Galitsky | |
| 11,748,572 B2 | 9/2023 | Galitsky | |
| 11,775,771 B2 | 10/2023 | Galitsky | |
| 11,783,126 B2 | 10/2023 | Galitsky | |
| 11,875,118 B2 | 1/2024 | Galitsky | |
| 2001/0007987 A1* | 7/2001 | Igata | G06F 16/93 |
| 2001/0053968 A1 | 12/2001 | Galitsky et al. | |
| 2002/0040292 A1* | 4/2002 | Marcu | G06F 40/253 704/7 |
| 2002/0046018 A1* | 4/2002 | Marcu | G06F 40/44 704/9 |
| 2002/0176151 A1 | 11/2002 | Moon et al. | |
| 2003/0138758 A1* | 7/2003 | Burstein | G09B 11/00 434/167 |
| 2004/0008416 A1 | 1/2004 | Okuno | |
| 2004/0044519 A1* | 3/2004 | Polanyi | G06F 40/35 707/E17.058 |
| 2004/0133579 A1* | 7/2004 | Campbell | G06F 40/55 |
| 2004/0148170 A1 | 7/2004 | Acero et al. | |
| 2004/0158453 A1 | 8/2004 | Polanyi et al. | |
| 2004/0267770 A1* | 12/2004 | Lee | G06F 16/2465 |
| 2005/0049867 A1* | 3/2005 | Deane | G10L 15/1822 704/240 |
| 2005/0086592 A1* | 4/2005 | Polanyi | G06F 40/35 707/E17.094 |
| 2007/0073533 A1* | 3/2007 | Thione | G06F 40/35 704/9 |
| 2007/0077542 A1* | 4/2007 | Burstein | G06F 40/289 434/156 |
| 2007/0136284 A1* | 6/2007 | Cobb | G06F 40/131 |
| 2007/0192306 A1* | 8/2007 | Papakonstantinou | G06F 16/951 707/999.005 |
| 2007/0239423 A1* | 10/2007 | Miller | G06F 40/44 704/2 |
| 2007/0294229 A1 | 12/2007 | Au | |
| 2008/0172409 A1 | 7/2008 | Botros et al. | |
| 2008/0228467 A1* | 9/2008 | Womack | G06F 40/30 704/9 |
| 2009/0089252 A1 | 4/2009 | Galitsky et al. | |
| 2009/0100053 A1* | 4/2009 | Boschee | G06F 16/334 |
| 2009/0248399 A1* | 10/2009 | Au | G06F 40/237 704/9 |
| 2009/0282019 A1 | 11/2009 | Galitsky et al. | |
| 2009/0326919 A1* | 12/2009 | Bean | G06F 40/289 704/9 |
| 2010/0169309 A1 | 7/2010 | Barrett et al. | |
| 2010/0169359 A1* | 7/2010 | Barrett | G06F 16/313 707/769 |
| 2010/0299136 A1 | 11/2010 | Tong et al. | |
| 2011/0119049 A1* | 5/2011 | Ylonen | G06F 40/211 704/9 |

(56) References Cited

U.S. PATENT DOCUMENTS

| | | | |
|---|---|---|---|
| 2011/0153673 A1* | 6/2011 | Boschee | G06F 16/334 |
| | | | 707/E17.098 |
| 2011/0184718 A1 | 7/2011 | Chen | |
| 2011/0216792 A1 | 9/2011 | Chann et al. | |
| 2011/0231353 A1 | 9/2011 | Wang et al. | |
| 2011/0270774 A1 | 11/2011 | Varshavsky et al. | |
| 2012/0041950 A1 | 2/2012 | Koll et al. | |
| 2012/0078902 A1 | 3/2012 | Duboue et al. | |
| 2012/0173500 A1* | 7/2012 | Chakrabarti | G06F 16/951 |
| | | | 707/706 |
| 2012/0246578 A1 | 9/2012 | Baldwin et al. | |
| 2012/0290509 A1 | 11/2012 | Heck et al. | |
| 2013/0046757 A1* | 2/2013 | Salvetti | G06F 16/957 |
| | | | 707/723 |
| 2013/0151347 A1 | 6/2013 | Baldwin et al. | |
| 2013/0204611 A1* | 8/2013 | Tsuchida | G06F 40/40 |
| | | | 704/9 |
| 2013/0268532 A1* | 10/2013 | Doshi | G06F 16/285 |
| | | | 707/737 |
| 2013/0311485 A1* | 11/2013 | Khan | G06F 16/335 |
| | | | 707/758 |
| 2014/0040288 A1 | 2/2014 | Galitsky | |
| 2014/0090054 A1* | 3/2014 | Bolzoni | H04L 63/1425 |
| | | | 726/22 |
| 2014/0122083 A1 | 5/2014 | Xiaojiang | |
| 2014/0136188 A1* | 5/2014 | Wroczynski | G06F 40/284 |
| | | | 704/9 |
| 2015/0039295 A1* | 2/2015 | Soschen | G06F 40/205 |
| | | | 704/9 |
| 2015/0046492 A1* | 2/2015 | Balachandran | G06F 8/36 |
| | | | 707/772 |
| 2015/0051900 A1 | 2/2015 | Kimelfeld et al. | |
| 2015/0134325 A1 | 5/2015 | Skiba et al. | |
| 2015/0149461 A1* | 5/2015 | Aguilar Lemarroy | G06F 16/35 |
| | | | 707/737 |
| 2015/0161512 A1* | 6/2015 | Byron | G06F 16/24578 |
| | | | 706/12 |
| 2015/0324351 A1* | 11/2015 | Sripada | G06F 40/274 |
| | | | 704/9 |
| 2016/0026608 A1 | 1/2016 | Curin et al. | |
| 2016/0034457 A1* | 2/2016 | Bradley | G06F 16/24578 |
| | | | 707/749 |
| 2016/0055240 A1 | 2/2016 | Tur et al. | |
| 2016/0071517 A1 | 3/2016 | Beaver et al. | |
| 2016/0085743 A1* | 3/2016 | Haley | G06F 40/284 |
| | | | 704/9 |
| 2016/0086601 A1 | 3/2016 | Chotimongkol et al. | |
| 2016/0099892 A1 | 4/2016 | Palakovich et al. | |
| 2016/0232152 A1* | 8/2016 | Mahamood | G06F 40/186 |
| 2016/0245779 A1 | 8/2016 | Khalaj Amineh et al. | |
| 2016/0246779 A1* | 8/2016 | Ho | G06F 40/30 |
| 2016/0247068 A1* | 8/2016 | Lin | G06F 40/40 |
| 2016/0275073 A1* | 9/2016 | Poon | G06F 40/30 |
| 2016/0283491 A1 | 9/2016 | Lu et al. | |
| 2016/0292153 A1* | 10/2016 | Agarwalla | G06F 16/93 |
| 2016/0328667 A1 | 11/2016 | Macciola et al. | |
| 2017/0032053 A1* | 2/2017 | LeTourneau | G06F 16/322 |
| 2017/0082863 A1 | 3/2017 | Marciante | |
| 2017/0104829 A1 | 4/2017 | Degroat | |
| 2017/0116982 A1* | 4/2017 | Gelfenbeyn | G10L 15/1815 |
| 2017/0177675 A1 | 6/2017 | Beller et al. | |
| 2017/0228368 A1* | 8/2017 | Carter | G06N 5/022 |
| 2017/0277993 A1 | 9/2017 | Beaver et al. | |
| 2017/0286390 A1 | 10/2017 | Yashpe et al. | |
| 2017/0293651 A1 | 10/2017 | Boguraev et al. | |
| 2018/0121062 A1 | 5/2018 | Beaver et al. | |
| 2018/0181648 A1* | 6/2018 | Chen | G06F 16/951 |
| 2018/0189385 A1* | 7/2018 | Sun | G06F 40/30 |
| 2018/0260472 A1 | 9/2018 | Kelsey et al. | |
| 2018/0314689 A1* | 11/2018 | Wang | G10L 15/1822 |
| 2018/0365228 A1 | 12/2018 | Galitsky | |
| 2018/0365593 A1 | 12/2018 | Galitsky | |
| 2018/0373701 A1 | 12/2018 | McAteer et al. | |
| 2019/0005027 A1 | 1/2019 | He et al. | |
| 2019/0033957 A1 | 1/2019 | Shionozaki | |
| 2019/0057157 A1 | 2/2019 | Mandal et al. | |
| 2019/0103111 A1 | 4/2019 | Tiwari et al. | |
| 2019/0138190 A1 | 5/2019 | Beaver et al. | |
| 2019/0163756 A1 | 5/2019 | Bull et al. | |
| 2019/0236134 A1 | 8/2019 | Galitsky | |
| 2019/0354544 A1 | 11/2019 | Hertz et al. | |
| 2019/0370604 A1 | 12/2019 | Galitsky | |
| 2019/0371299 A1 | 12/2019 | Jiang et al. | |
| 2019/0377605 A1 | 12/2019 | Joseph | |
| 2020/0099790 A1 | 3/2020 | Ma et al. | |
| 2020/0117858 A1 | 4/2020 | Freeman et al. | |
| 2020/0279075 A1* | 9/2020 | Avedissian | G06N 20/00 |
| 2020/0301589 A1 | 9/2020 | Buzzard et al. | |
| 2021/0020165 A1 | 1/2021 | Scodary et al. | |
| 2021/0027799 A1 | 1/2021 | Scodary et al. | |
| 2021/0029248 A1 | 1/2021 | Scodary et al. | |

FOREIGN PATENT DOCUMENTS

| | | |
|---|---|---|
| CN | 103530281 A | 1/2014 |
| CN | 104484411 A | 4/2015 |
| CN | 105955956 A | 9/2016 |
| CN | 106021224 A | 10/2016 |
| CN | 106445911 A | 2/2017 |
| CN | 106502981 A | 3/2017 |
| JP | 2004295834 A | 10/2004 |
| WO | 2015089822 | 6/2015 |

OTHER PUBLICATIONS

Rubin et al., Identification of Truth and Deception in Text: Application of Vector Space Model to Rhetorical Structure Theory, Proceedings of the Workshop on Computational Approaches to Deception Detection, Apr. 23-27, 2012, pp. 97-106.

Rubin et al., Truth and Deception at the Rhetorical Structure Level, Journal of the Association for Information Science and Technology, vol. 66, No. 5, May 2015, pp. 905-917.

Xiao, Study on Information Processing-Facing Lexical Semantic Knowledge Base, Study on Establishment of Uttering Verb Semantic Network System, Press of Guang Ming Daily, Nov. 30, 2013, p. 5 (1 page of Original Document and 1 page of English Translation).

U.S. Appl. No. 16/939,531, Notice of Allowability mailed on Mar. 3, 2023, 2 pages.

U.S. Appl. No. 16/998,915, Notice of Allowance mailed on Mar. 30, 2023, 14 pages.

U.S. Appl. No. 17/003,593, Notice of Allowance mailed on Apr. 17, 2023, 12 pages.

Chinese Application No. 201880030891.1, Office Action mailed on Feb. 16, 2023, 12 pages (9 pages of Original Document and 3 pages of English Translation).

U.S. Appl. No. 16/939,531, Final Office Action, Mailed On Sep. 16, 2022, 24 pages.

2009 Annual Study: Global Cost of a Data Breach, Ponemon Institute, LLC, PGP, Apr. 2010, 36 pages.

AI Marketing, Chatbots, and Your CMS, Available Online at: https://simplea.com/Articles/AI-Marketing-Chatbots-and-Your-CMS, Accessed from Internet on Nov. 19, 2019, pp. 1-9.

BBC Inside Science, Automatic Facebook, Available Online at http://www.bbc.co.uk/programmes/b040lnlf, Apr. 17, 2014, 2 pages.

Data Loss Prevention, Trend Micro, Available Online at: http://www.trendmicro.co.in/cloud-content/us/pdfs/business/datasheets/ds_data-loss-prevention.pdf, 2010, pp. 1-2.

Data Loss Prevention & Protection, Symantec, Available Online at: http://www.symantec.com/business/theme.jsp?themeid=vontu, Accessed from Internet on Aug. 30, 2018, 6 pages.

Data Loss Prevention Products & Services, Symantec, Available Online at: https://www.symantec.com/products/dataloss-Prevention, Accessed from Internet on Aug. 30, 2018, 6 pages.

Difference in the Way Children with Autism Learn New Behaviors Described, Kennedy Krieger Institute, ScienceDaily, Available online at: www.sciencedaily.com/releases/2009/07/090706113647.htm, Jul. 10, 2009, 2 pages.

(56) References Cited

OTHER PUBLICATIONS

Exploring Dialog Management for Bots, Chatbots Magazine, Available Online at: https://chatbotsmagazine.com/exploring-dialog management-for-bots-cbb8665a2fd3, Jul. 11, 2016, 7 pages.
Frase HubSpot Assistant, Available online at: https://www.frase.io/?hubspot, Accessed from Internet on Feb. 19, 2021, 12 pages.
Get Search Results Faster, Google Search Help, Available Online at https://support.google.com/websearch/answer/106230, Accessed from Internet at Nov. 19, 2019, pp. 1-2.
Global Security Report 2010, Trustwave, Available Online at: https://www.trustwave.com/Resources/Library/Documents/2010-Trustwave-Global-Security-Report/, 2010, 49 pages.
Ignore, Deny, downplay: Accounts of Syrians from Douma Have No. Place in Western Narrative, Russia Today, Available Online at: https://www.rt.com/news/425438-douma-witnesses-gas-attack-syria/, Apr. 28, 2018, pp. 1-8.
Language Data, Yahoo Labs, Available Online at: https://webscope.sandbox.yahoo.corn/catalog.php?datatype=l&guccounter=1, Accessed Aug. 19, 2019, 5 pages.
Malaysia Airlines Flight 17, Wikipedia, Available Online at: https://en.wikipedia.org/wiki/Malaysia_Airlines_Flight_17, Accessed from Internet on: May 3, 2018, pp. 1-38.
One Per Cent, New Scientist, Available Online at http://www.newscientist.com/article/mg22229634.400-one-per-cent.html., Apr. 2, 2014, 4 pages.
OpenNLP, Available Online at: http://incubator.apache.org/opennlp/documentation/manual/opennlp.htm, 2018.
Sense2vec: Semantic Analysis of the Reddit Hivemind, ExplosionAI, Available online at: https://explosion.ai/demos/sense2vec, Nov. 22, 2019, 10 pages.
Shadow Chairman of Investigative Committee, Crime Russia, Available Online at: https://crimerussia.com/corruption/tenevoy-direktor-skr/, Aug. 25, 2016, 5 pages.
Start by Selecting A Make, Available Online at: https://web.archive.org/web/20170823095844/https://www.2carpros.com/, Accessed from Internet on: Oct. 14, 2019, 6 pages.
Suicide Bomber Trial: Emails in Full, British Broadcasting Corporation News, Available Online at: news.bbc.co.uk/1/hi/uk/ 3825765.stm, Nov. 28, 2005, pp. 1-4.
Task Oriented Dialogue Dataset Survey, AtmaHou, Available online at https://github.com/AtmaHou/Task-Oriented-Dialogue-Dataset-Survey, Accessed from Internet on Feb. 2, 2021, 18 pages.
The bAbI Project, Facebook Babi, Available Online at: https://research.fb.com/downloads/babi/, 2019, 6 pages.
Trump Russia Affair: Key Questions Answered, British Broadcasting Corporation News, Available Online at: http://www.bbc.com/news/world-us-canada-42493918, Jul. 13, 2018, pp. 1-21.
Turku NLP Group, Available Online at: http://bionlp-www.utu.fi/wv_demo/, Accessed from Internet on Nov. 4, 2021, 2 pages.
Vietnamese Police Detain 8 Suspects in Connection with Illegal Immigration Organizing, People.cn, Available Online at: http://en.people.cn/n3/2019/1104/c90000-9629296.html, Nov. 4, 2019, 1 page.
Welcome to Apache Lucene, Apache Lucene 7.5.0 and Apache Solr 7.5.0, Available Online at: www.lucene.apache.org, Jan. 11, 2018, 38 pages.
What is the best tool or API to know the text Similarity between Two Documents in NLP?, Quora, Available Online at: https://www.quora.com/What-is-the-best-tool-or-API-to-know-the-text-similarity-between-two-documents-in-NLP, 2019, 11 pages.
Word to Vec JS Demo, Turbomaze, Available Online at: http://turbomaze.github.io/word2vecjson/, Accessed from Internet on Nov. 4, 2021, 1 page.
U.S. Appl. No. 15/975,683, Non-Final Office Action mailed on Mar. 19, 2020, 16 pages.
U.S. Appl. No. 15/975,683, Non-Final Office Action mailed on Oct. 31, 2019, 27 pages.
U.S. Appl. No. 15/975,683, Notice of Allowance mailed on Jun. 12, 2020, 17 pages.
U.S. Appl. No. 15/975,685, Non-Final Office Action mailed on Apr. 1, 2020, 23 pages.
U.S. Appl. No. 15/975,685, Non-Final Office Action mailed on Nov. 15, 2019, 23 pages.
U.S. Appl. No. 15/975,685, Notice of Allowance mailed on Jul. 24, 2020, 17 pages.
U.S. Appl. No. 16/010,091, Non-Final Office Action mailed on Nov. 18, 2019, 26 pages.
U.S. Appl. No. 16/010,091, Notice of Allowance mailed on Mar. 19, 2020, 13 pages.
U.S. Appl. No. 16/010,123, Non-Final Office Action mailed on Feb. 8, 2021, 30 pages.
U.S. Appl. No. 16/010,123, Notice of Allowance mailed on May 19, 2021, 16 pages.
U.S. Appl. No. 16/010,141, Corrected Notice of Allowability mailed on Oct. 19, 2020, 3 pages.
U.S. Appl. No. 16/010,141, Final Office Action mailed on Jul. 30, 2020, 14 pages.
U.S. Appl. No. 16/010,141, Non-Final Office Action mailed on Feb. 24, 2020, 12 pages.
U.S. Appl. No. 16/010,141, Notice of Allowance mailed on Sep. 1, 2020, 9 pages.
U.S. Appl. No. 16/010,156, Notice of Allowance mailed on Feb. 6, 2020, 13 pages.
U.S. Appl. No. 16/010,156, Notice of Allowance mailed on Nov. 7, 2019, 13 pages.
U.S. Appl. No. 16/142,759, First Action Interview Office Action Summary mailed on Mar. 16, 2021, 6 pages.
U.S. Appl. No. 16/142,759, First Action Interview Pilot Program Pre-Interview Communication mailed on Oct. 6, 2020, 6 pages.
U.S. Appl. No. 16/142,759, Notice of Allowance mailed on Aug. 10, 2021, 8 pages.
U.S. Appl. No. 16/145,644, Non-Final Office Action mailed on Apr. 7, 2020, 17 pages.
U.S. Appl. No. 16/145,644, Notice of Allowance mailed on Jul. 16, 2020, 10 pages.
U.S. Appl. No. 16/145,702, Corrected Notice of Allowability mailed on Sep. 4, 2020, 3 pages.
U.S. Appl. No. 16/145,702, Final Office Action mailed on May 6, 2020, 19 pages.
U.S. Appl. No. 16/145,702, Final Office Action mailed on Sep. 10, 2019, 25 pages.
U.S. Appl. No. 16/145,702, First Action Interview Office Action Summary mailed on Apr. 29, 2019, 8 pages.
U.S. Appl. No. 16/145,702, First Action Interview Pilot Program Pre-Interview Communication mailed on Feb. 7, 2019, 6 pages.
U.S. Appl. No. 16/145,702, Non-Final Office Action mailed on Feb. 5, 2020, 30 pages.
U.S. Appl. No. 16/145,702, Notice of Allowance mailed on Jul. 1, 2020, 15 pages.
U.S. Appl. No. 16/145,777, Non-Final Office Action mailed on Apr. 3, 2020, 18 pages.
U.S. Appl. No. 16/145,777, Notice of Allowance mailed on Jul. 15, 2020, 17 pages.
U.S. Appl. No. 16/145,777, Supplemental Notice of Allowability mailed on Sep. 2, 2020, 12 pages.
U.S. Appl. No. 16/240,232, Final Office Action mailed on Oct. 21, 2021, 13 pages.
U.S. Appl. No. 16/240,232, Non-Final Office Action mailed on Apr. 9, 2021, 13 pages.
U.S. Appl. No. 16/240,232, Non-Final Office Action mailed on Jan. 4, 2022, 15 pages.
U.S. Appl. No. 16/260,930, Non-Final Office Action mailed on Aug. 12, 2020, 9 pages.
U.S. Appl. No. 16/260,930, Notice of Allowance mailed on Dec. 16, 2020, 6 pages.
U.S. Appl. No. 16/260,939, Non-Final Office Action mailed on May 1, 2020, 10 pages.
U.S. Appl. No. 16/260,939, Notice of Allowance mailed on Jun. 12, 2020, 14 pages.
U.S. Appl. No. 16/408,224, Notice of Allowance mailed on Jan. 7, 2022, 9 pages.
U.S. Appl. No. 16/408,224, Supplemental Notice of Allowability mailed on Apr. 7, 2022, 4 pages.

(56) References Cited

OTHER PUBLICATIONS

U.S. Appl. No. 16/408,224, Supplemental Notice of Allowability mailed on Feb. 15, 2022, 4 pages.
U.S. Appl. No. 16/736,517, Non-Final Office Action mailed on Dec. 8, 2021, 17 pages.
U.S. Appl. No. 16/736,517, Notice of Allowance mailed on Feb. 10, 2022, 11 pages.
U.S. Appl. No. 16/789,849, Non-Final Office Action mailed on Feb. 17, 2022, 23 pages.
U.S. Appl. No. 16/822,563, Notice of Allowance mailed on Mar. 2, 2022, 16 pages.
U.S. Appl. No. 16/841,200, Notice of Allowance mailed on Apr. 14, 2022, 13 pages.
U.S. Appl. No. 16/939,531, Non-Final Office Action mailed on Apr. 28, 2022, 23 pages.
Abbott et al., Internet Argument Corpus 2.0: An SQL Schema for Dialogic Social Media and the Corpora to Go with it, In Language Resources and Evaluation Conference, 2016, pp. 4445-4452.
Abney, Parsing by Chunks, Studies in Linguistics and Philosophy, vol. 44, Springer, Dordrecht, Nov. 10, 1994, 19 pages.
Abro et al., Natural Language Understanding for Argumentative Dialogue Systems in the Opinion Building Domain, arXiv:2103.02691v2 [cs.CL], Feb. 19, 2022, 21 pages.
Airenti et al., Conversation and Behavior Games in the Pragmatics of Dialogue, Cognitive Science, vol. 17, No. 2, Apr. 1993, pp. 197-256.
Ajjour et al., Unit Segmentation of Argumentative Texts, Proceedings of the 4th Workshop on Argument Mining, Sep. 8, 2017, pp. 118-128.
Aker et al., What Works and What Does Not: Classifier and Feature Analysis for Argument Mining, Proceedings of the 4th Workshop on Argument Mining, Sep. 8, 2017, pp. 91-96.
Aleman-Meza et al., Context-Aware Semantic Association Ranking, Proceedings of the First International Conference on Semantic Web and Databases, Sep. 7-8, 2003, pp. 24-41.
Alicke et al., Hypocrisy: What counts?, Philosophical Psychology, vol. 26, No. 5, Aug. 25, 2013, 30 pages.
Allan, Automatic Hypertext Link Typing, Digital Library, vol. 778, No. 2, Mar. 1996, pp. 42-52.
Allen et al., Analyzing Intention in Utterances, Artificial Intelligence, vol. 15, No. 3, Dec. 1980, pp. 143-178.
Alsinet et al., A Logic Programming Framework for Possibilistic Argumentation: Formalization and Logical Properties, Fuzzy Sets and Systems, vol. 159, No. 10, May 16, 2008, pp. 1208-1228.
Altinel et al., A Corpus-Based Semantic Kernel for Text Classification by Using Meaning Values of Terms, Engineering Applications of Artificial Intelligence, vol. 43, Aug. 2015, pp. 54-66.
An Vo, FBK-HLT: A New Framework for Semantic Textual Similarity, Proceedings of the 9th International Workshop on Semantic Evaluation (SemEval 2015), Jun. 2015, pp. 102-106.
Anelli et al., Knowledge-Aware and Conversational Recommender Systems, Proceedings of the 12th ACM Conference on Recommender Systems, Sep. 2018, pp. 521-522.
Antoniou et al., Representation Results for Defeasible Logic, Association for Computing Machinery Transactions on Computational Logic, vol. 2, No. 2, Apr. 2001, pp. 255-287.
Appel et al., A Hybrid Approach to the Sentiment Analysis Problem at the Sentence Level, Knowledge-Based Systems, vol. 108, May 20, 2016, 32 pages.
Ariely, Predictably Irrational, 2008, 308 pages.
Arras et al., What is Relevant in a Text Document ?: An Interpretable Machine Learning Approach, Public Library of Science One, Available Online at: https://journals.plos.org/plosone/article/fileid=10.1371/journal.pone.0181142&type=printable, Aug. 11, 2017, 23 pages.
Artooras et al., Stanford NLP-VP vs NP, Stack Overflow Website, Mar. 8-9, 2016, 2 pages.
Arya et al., One Explanation Does Not Fit All: A Toolkit and Taxonomy of AI Explainability Techniques, Available Online at: arXiv abs/1909.03012, Sep. 14, 2019, 18 pages.
Auer et al., DBpedia: A Nucleus for a Web of Open Data, International Semantic Web Conference, Lecture Notes in Computer Science, vol. 4825, Nov. 11, 2007, pp. 1-14.
Aurora, Freudian Metaphor and Surrealist Metalanguage in Michel Leiris' Failles: The Unconscious and the Sea, Litte Realite, vol. 13, 2001, 10 pages.
Axelrod, The Evolution of Cooperation, Basic Books, 1984, 9 pages.
Bahdanau et al., Neural Machine Translation by Jointly Learning to Align and Translate, International Conference on Learning Representations, May 19, 2016, 15 pages.
Banarescu et al., Abstract Meaning Representation for Sembanking, Proceedings of the 7th Linguistic Annotation Workshop & Interoperability with Discourse, Aug. 8-9, 2013, pp. 178-186.
Banchs, Movie-DiC: A Movie Dialogue Corpus for Research and Development, Proceedings of the 50th Annual Meeting of the Association for Computational Linguistics, vol. 2, Jul. 8, 2012, pp. 203-207.
Banerjee et al., WikiWrite: Generating Wikipedia Articles Automatically, Proceedings of the Twenty-Fifth International Joint Conference on Artificial Intelligence (IJCAI-16), Jul. 2016, pp. 2740-2746.
Banko et al., Open Information Extraction from the Web, In Proceedings of the Twentieth International Joint Conference on Artificial Intelligence, Jan. 6-12, 2007, pp. 2670-2676.
Bao et al., Knowledge-based Question Answering as Machine Translation, Association for Computational Linguistics, Jun. 23-25, 2014, pp. 967-976.
Baralis et al., Generalized Association Rule Mining with Constraints, Information Sciences, vol. 194, Jul. 2012, pp. 68-84.
Barden et al., Saying One Thing and Doing Another: Examining the Impact of Event Order on Hypocrisy Judgments of Others, Personality and Social Psychology, vol. 31, No. 11, Dec. 1, 2005, pp. 1463-1474.
Bar-Haim et al., Improving Claim Stance Classification with Lexical Knowledge Expansion and Context Utilization, Proceedings of the 4th Workshop on Argument Mining, Sep. 8, 2017, pp. 32-38.
Bar-Haim et al., Semantic Inference at the Lexical-Syntactic Level, Proceedings of Association for the Advancement of Artificial Intelligence, Jul. 2007, pp. 871-876.
Bar-Haim et al., Stance Classification of Context-Dependent Claims, Proceedings of the 15th Conference of the European Chapter of the Association for Computational Linguistics: vol. 1, Apr. 3-7, 2017, pp. 251-261.
Baron-Cohen et al., Does the Autistic Child Have a "Theory of Mind"? Cognition, vol. 21, No. 1, Oct. 1, 1985, pp. 37-46.
Baroni et al., Argumentation Through a Distributed Self-Stabilizing Approach, Journal of Experimental & Theoretical Artificial Intelligence, vol. 14, No. 4, 2002, pp. 273-301.
Baroni et al., Cleaneval: A Competition for Cleaning Web Pages Proceedings of the Sixth International Conference on Language Resources and Evaluation, May 2008, pp. 638-643.
Barzilay et al., Modeling Local Coherence: An Entity-Based Approach, Computational Linguistics, vol. 34, No. 1, Mar. 2008, pp. 1-34.
Barzilay et al., Using Lexical Chains for Text Summarization, Proceedings of the ACL/EACL'97 Workshop on Intelligent Scalable Text Summarization, 1997, pp. 10-17.
Bazinska, Explore Word Analogies, Available Online at: https://lamyiowce.github.io/word2viz/, Jan. 7, 2017, 2 pages.
Bedi et al., Argumentation-Enabled Interest-Based Personalized Recommender System, Journal of Experimental & Theoretical Artificial Intelligence, vol. 27, No. 2, 2015, pp. 1-45.
Bello et al., Developmental Accounts of Theory-of-mind Acquisition: Achieving Clarity via Computational Cognitive Modeling, In Proceedings of the 28th Annual Conference of the Cognitive Science Society, Jan. 2006, pp. 1014-1019.
Bengio et al., A Neural Probabilistic Language Model, Journal of Machine Learning Research, vol. 3, Feb. 3, 2003, pp. 1137-1155.
Bengio et al., Learning Long-Term Dependencies with Gradient Descent is Difficult, IEEE Transactions on Neural Networks, vol. 5, No. 2, Mar. 1994, pp. 157-166.

(56) References Cited

OTHER PUBLICATIONS

Bentahar et al., A Taxonomy of Argumentation Models Used for Knowledge Representation, Artificial Intelligence Review, vol. 33, No. 3, Mar. 2010, 49 pages.

Berkovsky et al., Influencing Individually: Fusing Personalization and Persuasion, ACM Transactions on Interactive Intelligent Systems, vol. 2, No. 2, Article 9, Jun. 2012, 8 pages.

Bernard et al., The Power of Well-Connected Arguments: Early Sensitivity to the Connective Because, Journal of Experimental Child Psychology, vol. 111, No. 1, Jan. 2012, pp. 128-135.

Berzlanovich et al., Coherence Structure and Lexical Cohesion in Expository and Persuasive Texts, Proceedings of the Workshop on Constraints in Discourse III, 2008, 8 pages.

Biran et al., Identifying Justifications in Written Dialogs by Classifying Text as Argumentative, International Journal of Semantic Computing, vol. 5, No. 4, Dec. 2011, pp. 363-381.

Bird et al., Natural Language Processing with Python Analyzing Text with the Natural Language Toolkit, Available Online at: http://www.nltk.org/book_1ed, Jun. 2009, 504 pages.

Biswa, Putt's Law, Peter Principle, Dilbert Principle of Incompetence & Parkinson's Law, Available Online at: http://asmilingassasin.blogspot.com/2015/06/putts-law-peter-principle-dilbert.html, 2015, 5 pages.

Blaylock, Managing Communicative Intentions in Dialogue Using a Collaborative Problem-Solving Model, The University of Rochester, Computer Science Department, Technical Report 774, Apr. 2002, 56 pages.

Blaylock et al., Managing Communicative Intentions with Collaborative Problem Solving, Current and New Directions in Discourse and Dialogue, Chapter-4, 2003, pp. 63-84.

Blei et al., Latent Dirichlet Allocation, Journal of Machine Learning Research, vol. 3, Jan. 2003, pp. 993-1022.

Boguslavsky et al., Multilinguality in ETAP-3: Reuse of Lexical Resources, Proceedings of the Workshop on Multilingual Linguistic Ressources, Aug. 28, 2004, 8 pages.

Bollacker et al., Freebase: A Collaboratively Created Graph Database for Structuring Human Knowledge, Proceedings of the 2008 ACM SIGMOD international conference on Management of data, Jun. 2008, pp. 1247-1250.

Bolshakov et al., Synonymous Paraphrasing Using WordNet and Internet, Department of Computer Science and Engineering, Chung-Ang University, Seoul, Jan. 1970, 12 pages.

Bordes et al., Learning End-To-End Goal-Oriented Dialog, Available online at: https://arxiv.org/abs/1605.07683, Mar. 30, 2017, 15 pages.

Bordes et al., Question Answering with Subgraph Embeddings, In Proceedings of the 2014 Conference on Empirical Methods in Natural Language Processing EMNLP, Oct. 2014, pp. 615-620.

Bordini et al., A Survey of Programming Languages and Platforms for Multi-Agent Systems, Informatica, vol. 30, No. 1, Jan. 2006, pp. 33-44.

Borgida et al., Asking Queries About Frames, Proceedings of the 5th International Conference on the Principles of Knowledge Representation and Reasoning, 1996, pp. 340-349.

Bousquet et al., Introduction to Statistical Learning Theory, Lecture Notes in Artificial Intelligence, vol. 3176, 2004, pp. 175-213.

Bowman et al., Large Annotated Corpus for Learning Natural Language Inference, Available Online at: arXiv preprint arXiv:1508.05326, Aug. 21, 2015, 11 pages.

Boyer et al., MJRTY-A Fast Majority Vote Algorithm, Chapter 5, Automated Reasoning, 1991, pp. 105-117.

Breazeal, A Motivational System for Regulating Human-Robot Interactions, Fifteenth National/tenth Conference on Artificial intelligence/Innovative Applications of Artificial Intelligence, Jul. 1, 1998, 12 pages.

Bridge, Towards Conversational Recommender Systems: A Dialogue Grammar Approach, Conference: 6th European Conference ov Case Based Reasoning, ECCBR 2002, Jan. 2002, pp. 9-22.

Britt et al., Constructing Representations of Arguments, Journal of Memory and Language, vol. 48, No. 4, 2003, pp. 794-810.

Bron et al., Algorithm 457: Finding All Cliques of an Undirected Graph, Communications of the ACM, vol. 16, No. 9, Sep. 1973, pp. 575-579.

Brzezinski et al., Accuracy Updated Ensemble for Data Streams with Concept Drift, International Conference on Hybrid Artificial Intelligence Systems, vol. 6679, May 23-25, 2011, pp. 155-163.

Buchegger et al., A Case for P2P Infrastructure for Social Networks—Opportunities & Challenges, Proceedings of 6th International Conference on Wireless On-Demand Network Systems and Services, Utah, Feb. 2-4, 2009, 8 pages.

Budanitsky et al., Evaluating WordNet-Based Measures of Lexical Semantic Relatedness, Computational Linguistics, vol. 32, No. 1, Mar. 2006, pp. 13-47.

Budzianowski et al., MultiWOZ- A Large-Scale Multi-DomainWizard-of-Oz Dataset for Task-Oriented Dialogue Modelling Proceedings of the 2018 Conference on Empirical Methods in Natural Language Processing, Oct. 31-Nov. 4, 2018, pp. 5016-5026.

Bunke, Graph-Based Tools for Data Mining and Machine Learning, Lecture Notes in Computer Science, vol. 2734, Jan. 2003, pp. 7-19.

Burke et al., The Intersection of Robust Intelligence and Trust in Autonomous Systems, Association for the Advancement of Artificial Intelligence Spring Symposium, 2014, 102 pages.

Buzing et al., Emerging Communication and Cooperation in Evolving Agent Societies, Journal of Artificial Societies and Social Simulation, vol. 8, No. 1, Available Online at http://jasss.soc.surrey.ac.uk/8/1/2.html, Jan. 31, 2005, 22 pages.

Cabrio et al., A Natural Language Bipolar Argumentation Approach to Support Users in Online Debate Interactions, Argument and Computation, vol. 4, No. 3, Nov. 26, 2013, pp. 209-230.

Cabrio et al., Combining Textual Entailment and Argumentation Theory for Supporting Online Debates Interactions, Proceedings of the 50th Annual Meeting of the Association for Computational Linguistics, Jul. 8-14, 2012, pp. 208-212.

Cai et al., Extracting Content Structure for Web Pages Based on Visual Representation, LNCS, vol. 2642, Springer, Apr. 2003, 12 pages.

Camburu et al., e-SNLI: Natural Language Inference with Natural Language Explanations, Advances in Neural Information Processing Systems, Dec. 6, 2018, 11 pages.

Campbell, Chatbot Win Prize by Changing the Subject, New Scientist, vol. 208, No. 2785, Nov. 6, 2010, 1 page.

Cardie et al., Guest Editor's Introduction: Machine Learning and Natural Language, Machine Learning, vol. 1, No. 5, Feb. 1999, pp. 1-5.

Carlson et al., Building a Discourse-Tagged Corpus in the Framework of Rhetorical Structure Theory, Proceedings of the Second SIGdial Workshop on Discourse and Dialogue, vol. 16, Sep. 1-2, 2001, 10 pages.

Carlson et al., Discourse Tagging Reference Manual, Available Online at: https://www.isi.edu/~marcu/discourse/tagging-ref-manual.pdf, Sep. 11, 2001, 87 pages.

Carreras et al., Introduction to the CoNLL-2004 Shared Task: Semantic Role Labeling, Proceedings of the Eighth Conference on Computational Natural Language Learning, Association for Computational Linguistics, May 6-7, 2004, pp. 89-97.

Carreyrou, Hot Startup Theranos Has Struggled with Its Blood-Test Technology, Available Online at: https://www.wsj.com/articles/theranos-has-struggled-with-blood-tests-1444881901, Oct. 16, 2015, 6 pages.

Cassell et al., Human Conversation as a System Framework: Designing Embodied Conversational Agents, Embodied Conversational Agents, Dec. 1, 2001, pp. 29-63.

Cassell et al., Negotiated Collusion: Modeling Social Language and Its A. Relationship Effects in Intelligent Agents, User Modeling and Adaptive Interfaces, vol. 13, No. 1-2, Feb. 1, 2003, 34 pages.

Cassimatis, Integrating Cognitive Models Based on Different Computational Methods, Twenty-Seventh Annual Conference of the Cognitive Science Society, vol. 27, 2005, 6 pages.

Castellucci et al., Context-Aware Models for Twitter Sentiment Analysis, Emerging Topics at the First Italian Conference on Computational Linguistics, vol. 1, No. 1, Dec. 2015, pp. 75-89.

(56) References Cited

OTHER PUBLICATIONS

Chakrabarti et al., Graph Mining: Laws, Generators, and Algorithms, ACM Computing Surveys, vol. 38, No. 1, Mar. 2006, pp. 69-123.
Chali et al., Complex Question Answering: Unsupervised Learning Approaches and Experiments, Journal of Artificial Intelligence Research, vol. 35, May 2009, pp. 1-47.
Chambers et al., Learning Alignments and Leveraging Natural Logic, In Proceedings of the Association for Computational Linguistics- PASCAL Workshop on Textual Entailment and Paraphrasing, Jun. 28, 2007, 6 pages.
Charolles, Cohesion, Coherence Et Pertinence De Discours, Travaux de Linguistique, vol. 29, 1995, pp. 125-151.
Chen et al., Critiquing-Based Recommenders: Survey and Emerging Trends, User Modeling and User-Adapted Interaction, vol. 22, Nos. 1-2, Apr. 2012, pp. 125-150.
Chen, Understanding Mental States in Natural Language, Proceedings of the 8th International Conference on Computational Semantics, Jan. 2009, pp. 61-72.
Cheng et al., Joint Training for Pivot-Based Neural Machine Translation, Proceedings of the Twenty-Sixth International Joint Conference on Artificial Intelligence (IJCAI-17), Feb. 21, 2017, 7 pages.
Chesnevar et al., Empowering Recommendation Technologies Through Argumentation, Argumentation in Artificial Intelligence, May 2009, pp. 403-422.
Chesnevar et al., Logical Models of Argument, ACM Computing Surveys, vol. 32, No. 4, Dec. 1, 2000, pp. 337-383.
Choi et al., QuAC: Question Answering in Context, Empirical Methods in Natural Language Processing., Aug. 28, 2018, pp. 2174-2184.
Christakopoulou et al., Towards Conversational Recommender Systems, KDD '16: Proceedings of the 22nd ACM SIGKDD International Conference on Knowledge Discovery and Data Mining, Aug. 2016, 10 pages.
Cohen, Enron Email Dataset, Available Online at: https://www.cs.cmu.edu/~enron/, Jul. 10, 2016, 1 page.
Cohen et al., Intention is Choice with Commitment, Artificial Intelligence, vol. 42, Nos. 2-3, Mar. 1990, pp. 213-261.
Collins et al., Convolution Kernels for Natural Language, NIPS'01 Proceedings of the 14th International Conference on Neural Information Processing Systems: Natural and Synthetic, 2002, 8 pages.
Collins et al., New Ranking Algorithms for Parsing and Tagging: Kernels Over Discrete Structures, and the Voted Perceptron, Proceedings of the 40th Annual Meeting of the Association for Computational Linguistics (ACL), Jul. 2002, pp. 263-270.
Coulmance et al., Trans-Gram, Fast Cross-Lingual Word-Embeddings, Available Online at: https://arxiv.org/pdf/1601.02502.pdf, Jan. 11, 2016, 8 pages.
Cox et al., Metareasoning: A Manifesto, Association for the Advancement of Artificial Intelligence, 2007, 4 pages.
Craig et al., Overhearing Dialogues and Monologues in Virtual Tutoring Sessions: Effects on Questioning and Vicarious Learning, International Journal of Artificial Intelligence in Education, Jan. 2000, pp. 242-253.
Cristea et al., Veins Theory: A Model of Global Discourse Cohesion and Coherence, In C. Boitet & P. Whitelock (Eds.), 17th International Conference on Computational Linguistics, Aug. 1998, pp. 281-285.
Croft et al., Search Engines-Information Retrieval in Practice, Pearson Education, 2010, 542 pages.
Crutzen et al., An Artificially Intelligent Chat Agent That Answers Adolescents' Questions Related to Sex, Drugs, and Alcohol: An Exploratory Study, Journal of Adolescent Health, vol. 48, No. 5, May 2011, pp. 1-6.
Cumby et al., On Kernel Methods for Relational Learning, Proceedings of the Twentieth International Conference on Machine Learning, Aug. 2003, pp. 107-114.
Cuzzocrea, Intelligent Knowledge-Based Models and Methodologies for Complex Information Systems, Information Sciences, vol. 194, Jul. 1, 2012, pp. 1-3.
Dagan et al., Recognizing Textual Entailment: Rational, Evaluation and Approaches, Natural Language Engineering, vol. 15, No. 4, Oct. 2009, pp. i-xvii.
Damer, Attacking Faulty Reasoning: A Practical Guide to Fallacy-Free Reasoning, Wadsworth Cengage Learning, 2009, 257 pages.
Damonte et al., An Incremental Parser for Abstract Meaning Representation, Proceedings of Equine Analytical Chemistry Laboratory, Apr. 10, 2017, 12 pages.
Damonte et al., Cross-lingual Abstract Meaning Representation Parsing, Proceedings of NAACL., Feb. 24, 2018, 10 pages.
Das et al., Frame-Semantic Parsing, Computational Linguistics, vol. 40, No. 1, Mar. 2014, pp. 9-56.
De Boni, Using Logical Relevance for Question Answering, Journal of Applied Logic, vol. 5, No. 1, Mar. 2007, pp. 92-103.
De Lara et al., Some Strategies for the Simulation of Vocabulary Agreement in Multi-agent Communities, Journal of Artificial Societies and Social Simulation, vol. 3, No. 4, Available online at: http://www.soc.surrey.ac.uk/JASSS/3/4/2.html, Oct. 31, 2000, 11 pages.
De Mori et al., Spoken Language Understanding, Institute of Electrical and Electronics Engineers Signal Processing Magazine, vol. 25, No. 3, May 2008, pp. 50-58.
De Rosis et al., From Greta's Mind to Her Face: Modelling the Dynamics of Affective States in a Conversational Embodied Agent, International Journal of Human-Computer Studies, vol. 59, Nos. 1-2, Jul. 1, 2003, pp. 81-118.
De Salvo Braz et al., An Inference Model for Semantic Entailment in Natural Language, AAAI'05 Proceedings of the 20th National Conference on Artificial Intelligence, vol. 3, Jul. 9-13, 2005, pp. 1043-1049.
Denero et al., The Complexity of Phrase Alignment Problems, In Proceedings of Association for Computational Linguistics-08: HLT, Short Papers, Jun. 15-20, 2008, pp. 25-28.
Devlin et al., BERT: Pre-Training of Deep Bidirectional Transformers for Language Understanding, In Proceedings of the Conference of the North American Chapter of the Association for Computational Linguistics: Human Language Technologies, vol. 1, May 24, 2019, 16 pages.
Dias et al., Feeling and Reasoning: A Computational Model for Emotional Characters, EPIA Affective Computing Workshop, Progress in Artificial Intelligence, vol. 3808, Dec. 5, 2005, pp. 127-140.
Dijkstra, Programming Considered as a Human Activity, Proceedings IFIP Congress, 1965, 7 pages.
Dinan et al., Wizard of Wikipedia: Knowledge-Powered Conversational Agents, arXiv:1811.01241v2 [cs.CL], Feb. 21, 2019, 18 pages.
Ding et al., Swoogle: A Search and Metadata Engine for the Semantic Web, CIKM '04 Proceedings of the Thirteenth ACM International Conference on Information and Knowledge Management, Nov. 8-13, 2004, pp. 652-659.
D'Inverno et al., A Formal Specification of dMARS, Intelligent Agents IV: Proceedings of the Fourth International Workshop on Agent Theories, Architectures and Languages, Jul. 24-26, 1997, 22 pages.
Donlon, Robust Intelligence (RI), National Science Foundation, Available Online at: www.nsf.gov/funding/pgm_summ.jsp?pims_id=503305&org=IIS, 2013, 3 pages.
Dosilovic et al., Explainable Artificial Intelligence: A Survey, In Proc. MIPRO, May 2018, pp. 210-215.
Dozat et al., Deep Biaffine Attention for Neural Dependency Parsing, Available Online at: https://arxiv.org/pdf/1611.01734.pdf, Mar. 10, 2017, pp. 1-8.
Du et al., Learning to Ask: Neural Question Generation for Reading Comprehension, Proceedings of the 55th Annual Meeting of the Association for Computational Linguistics, vol. 1, Apr. 29, 2017, 11 pages.
Dung, On the Acceptability of Arguments and Its Fundamental Role in Nonmonotonic Reasoning, Logic Programming and N-Person Games, Artificial Intelligence, vol. 77, No. 2, Sep. 1995, pp. 321-357.
Dunne et al., Computational Models of Argument, Proceedings of Computational Models of Argument, IOS Press, 2006, 353 pages.

(56) References Cited

OTHER PUBLICATIONS

Dwivedi, NLP -Building a Question Answering Model, Towards Data Science, Available Online at: https://towardsdatascience.com/nlp-building-a-question-answering-model-ed0529a68c54, Mar. 29, 2018, 7 pages.

Ebrahim, NLP Tutorial Using Python NLTK (Simple Examples), Dzone, Sep. 24, 2017, pp. 1-10.

Eckle-Kohler et al., On the Role of Discourse Markers for Discriminating Claims and Premises in Argumentative Discourse, Proceedings of the 2015 Conference on Empirical Methods in Natural Language Processing, Sep. 17-21, 2015, pp. 2236-2242.

Egg et al., Underspecified Discourse Representation, Constraints in Discourse, 2008, pp. 117-138.

Ehrlich et al., Maximum Common Subgraph Isomorphism Algorithms and their Applications in Molecular Science: Review, Wiley Interdisciplinary Reviews: Computational Molecular Science, vol. 1, No. 1, Jan. 21, 2011, pp. 68-79.

Ellsworth et al., Mutaphrase: Paraphrasing with FrameNet, Proceedings of the Workshop on Textual Entailment and Paraphrasing, Available Online at: http://www.icsi.berkeley.edu/pubs/speech/acl07.pdf, Jun. 2007, pp. 143-150.

Elsner et al., You Talking to Me? A Corpus and Algorithm for Conversation Disentanglement, Proceedings of ACL-08: HLT, Jun. 2008, pp. 834-842.

Endres-Niggemeyer et al., Summarizing Text for Intelligent Communication, Dagstuhl Seminar Report 79, 1995, 36 pages.

European Application No. 18727946.8, Office Action mailed on Dec. 15, 2021, 7 pages.

Erenel et al., Nonlinear Transformation of Term Frequencies for Term Weighting in Text Categorization, Engineering Applications of Artificial Intelligence, vol. 25, No. 7, Oct. 2012, pp. 1505-1514.

Fagin et al., Reasoning About Knowledge, The MIT Press, 1996, 75 pages.

Faruqui et al., Improving Vector Space Word Representations Using Multilingual Correlation, Proceedings of the 14th Conference of the European Chapter of the Association for Computational Linguistics, Apr. 26-30, 2014, pp. 462-471.

Felfernig et al., Developing Constraint-Based Recommenders, Recommender Systems Handbook, 2010, pp. 187-215.

Feng et al., A Linear-Time Bottom-Up Discourse Parser with Constraints and Post-Editing, Proceedings of the 52nd Annual Meeting of the Association for Computational Linguistics, Jun. 23-25, 2014, pp. 511-521.

Feng et al., Classifying Arguments by Scheme, Proceedings of the 49th Annual Meeting of the Association for Computational Linguistics, vol. 1, Jun. 19-24, 2011, pp. 987-996.

Feng et al., Distributional Footprints of Deceptive Product Reviews, Proceedings of the Sixth International Association for the Advancement of Artificial Intelligence Conference on Weblogs and Social Media, The Association for the Advancement of Artificial Intelligence Press, Jan. 2012, pp. 98-105.

Feng, RST-Style Discourse Parsing and Its Applications in Discourse Analysis, University of Toronto, Jun. 2015, 89 pages.

Feng et al., Syntactic Stylometry for Deception Detection, In Association for Computational Linguistics 12, Proceedings of the 50th Annual Meeting of the Association for Computational Linguistics, Jul. 8-14, 2012, pp. 171-175.

Feng et al., Text-Level Discourse Parsing with Rich Linguistic Features, Proceedings of the 50th Annual Meeting of the Association for Computational Linguistics, vol. 1, Jul. 8-14, 2012, pp. 60-68.

Feng et al., The Impact of Deep Hierarchical Discourse Structures in the Evaluation of Text Coherence, Proceedings of COLING 2014, the 25th International Conference on Computational Linguistics, Aug. 2014, 10 pages.

Ferraiolo et al., Role-Based Access Controls, Proceedings of the 15th NIST-NSA National Computer Security Conference, Oct. 13-16, 1992, 11 pages.

Ferretti et al., A Possibilistic Defeasible Logic Programming Approach to Argumentation-Based Decision-Making, Journal of Experimental & Theoretical Artificial Intelligence, vol. 26, No. 4, Jun. 10, 2014, pp. 519-550.

Ferretti et al., An Application of Defeasible Logic Programming to Decision Making in a Robotic Environment, International Conference on Logic Programming and Nonmonotonic Reasoning, vol. 4483, May 2007, pp. 297-302.

Finn, A Question Writing Algorithm, Journal of Reading Behavior, VII, vol. 4, 1975, pp. 341-367.

Flanigan et al., A Discriminative Graph-Based Parser for the Abstract Meaning Representation, Proceedings of the 52nd Annual Meeting of the Association for Computational Linguistics, Jun. 2014, pp. 1426-1436.

Florou et al., Argument Extraction for Supporting Public Policy Formulation, Proceedings of the 7th Workshop on Language Technology for Cultural Heritage, Social Sciences, and Humanities, Aug. 8, 2013, pp. 49-54.

Folino et al., Proceedings of the 3rd Workshop on Biologically Inspired Algorithms for Distributed Systems, 8th International Conference on Autonomic Computing, Jun. 14-18, 2011.

Foltz et al., The Measurement of Textual Coherence with Latent Semantic Analysis, Discourse Processes, vol. 25, Nos. 2-3, 1998, 31 pages.

Fornaciari et al., Identifying Fake Amazon Reviews as Learning from Crowds, Proceedings of the 14th Conference of the European Chapter of the Association for Computational Linguistics, Apr. 26-30, 2014, pp. 279-287.

Fouad et al., Meta-agents: Using Multiagent Networks to Manage Dynamic Changes in the Internet of Things, Association for the Advancement of Artificial Intelligence Spring Symposium Series, 2019, 2 pages.

Fox, Discourse Structure and Anaphora: Written and Conversational English, Cambridge University Press, 1987, pp. 77-92.

Frank et al., Insensitivity of the Human Sentence-Processing System to Hierarchical Structure, Psychological Science, vol. 22, No. 6, Available Online at: https://www.jstor.org/stable/pdf/25835458.pdf, Jun. 2011, pp. 829-834.

Freeley et al., Argumentation and Debate, Critical Thinking for Reasoned Decision Making, Eleventh Edition, vol. 27, No. 3, Jun. 10, 1991, pp. 137-152.

Gabbay, Action, Time and Default, Logical Foundations for Cognitive Agents, 1999, pp. 151-152.

Galitsky, A Computational Simulation Tool for Training Autistic Reasoning About Mental Attitudes, Knowledge-Based Systems, vol. 50, Sep. 2013, 34 pages.

Galitsky, A Demo of a Chatbot for a Virtual Persuasive Dialogue, Persuasive technologies 14th International Conference, Limassol, Cyprus, Apr. 9-11, 2019.

Galitsky et al., A Novel Approach for Classifying Customer Complaints Through Graphs Similarities in Argumentative Dialogues, Decision Support Systems, vol. 46, No. 3, Feb. 2009, pp. 717-729.

Galitsky, A Tool for Efficient Content Compilation, Proceedings of COLING 2016, the 26th International Conference on Computational Linguistics: System Demonstrations, Dec. 11-17, 2016, pp. 198-202.

Galitsky et al., A Web Mining Tool for Assistance with Creative Writing, European Conference on Information Retrieval, vol. 7814, Mar. 2013, pp. 828-831.

Galitsky et al., Accessing Validity of Argumentation of Agents of the Internet of Everything, Artificial Intelligence for the Internet of Everything, Chapter 11, Jan. 2019, pp. 187-216.

Galitsky et al., Argumentation in Text: Discourse Structure Matters, Available Online at: https://nlp.fi.muni.cz/trac/research/raw-attachment/wiki/cs/OCemSeMluvi/paper_15.pdf, 2018, 13 pages.

Galitsky et al., Assessing Plausibility of Explanation and Meta-Explanation in Inter-Human Conflicts, Engineering Applications of Artificial Intelligence, vol. 24, No. 8, Dec. 2011, pp. 1472-1486.

Galitsky, Assuring Chatbot Relevance at Syntactic Level, Developing Enterprise Chatbots, Apr. 2019, 42 pages.

Galitsky, Building Chatbot Thesaurus, Developing Enterprise Chatbots, Apr. 2019, pp. 221-252.

(56) References Cited

OTHER PUBLICATIONS

Galitsky et al., Building Dialogue Structure from Discourse Tree of a Question, Proceedings of the 2018 EMNLP Workshop SCAI: The 2nd International Workshop on Search-Oriented Conversational AI, Oct. 31, 2018, pp. 17-23.
Galitsky et al., Building Integrated Opinion Delivery Environment, Proceedings of the Twenty-Fourth International Florida Artificial Intelligence Research Society Conference, Jan. 2011, 6 pages.
Galitsky et al., Building Web Infrastructure for Providing Rating Services and Subscription to Them, Mathematical Modeling, vol. 19, No. 2, 2007, 14 pages.
Galitsky et al., Chatbot Components and Architectures, In Developing Enterprise Chatbots, Springer, 2019, pp. 13-47.
Galitsky et al., Chatbot with a Discourse Structure-Driven Dialogue Management, Proceedings of the Software Demonstrations of the 15th Conference of the European Chapter of the Association for Computational Linguistics, Apr. 3-7, 2017, pp. 87-90.
Galitsky et al., Concept-Based Learning of Human Behavior for Customer Relationship Management, Information Sciences, vol. 181, No. 10, May 15, 2011, pp. 2016-2035.
Galitsky et al., Constructing Imaginary Discourse Trees Improves Answering Convergent Questions, Cicling, Apr. 7-13, 2019, 5 pages.
Galitsky, Content Inversion for User Searches and Product Recommendation Systems and Methods, US Patent Application, eBay No. 47088.80, May 9, 2016, 26 pages.
Galitsky, Customers' Retention Requires an Explainability Feature in Machine Learning Systems They Use, 2018 AAAI Spring Symposium Series, 2018, pp. 214-220.
Galitsky et al., Detecting Logical Argumentation in Text via Communicative Discourse Tree, Journal of Experimental & Theoretical Artificial Intelligence, vol. 30, No. 5, May 2018, 29 pages.
Galitsky et al., Discourse-Based Approach to Involvement of Background Knowledge for Question Answering, Proceedings of the International Conference on Recent Advances in Natural Language Processing, Sep. 2-4, 2019, pp. 373-381.
Galitsky, Discourse-Level Dialogue Management, In Developing Enterprise Chatbots: Learning Linguistic Structures, Springer Nature, Apr. 5, 2019, pp. 365-387.
Galitsky et al., Discovering Common Outcomes of Agents' Communicative Actions in Various Domains, Knowledge-Based Systems, vol. 24, No. 2, Mar. 2011, pp. 210-229.
Galitsky et al., Discovering Disinformation: Discourse-Level Approach, Fifteenth Russian National AI Conference, Smolenks Russia, 2016, pp. 23-33.
Galitsky, Discovering Rhetorical Agreement between a Request and Response, Dialogue & Discourse, vol. 8, No. 2, Dec. 1, 2017, pp. 167-205.
Galitsky et al., Enabling a Bot with Understanding Argumentation and Providing Arguments., In Developing Enterprise Chatbots, Springer—Cham, Switzerland., 2019, pp. 465-532.
Galitsky, Exhaustive Simulation of Consecutive Mental States of Human Agents, Knowledge-Based Systems, vol. 43, May 2013, 41 pages.
Galitsky et al., Explainable Machine Learning for Chatbots, In Developing Enterprise Chatbots, Springer, Cham, Switzerland, 2019, pp. 53-83.
Galitsky, Extending the BDI Model to Accelerate the Mental Development of Autistic Patients, Proceedings Second International Conference on Development & Learning, Aug. 7, 2002, 7 pages.
Galitsky et al., Extending Tree Kernels Towards Paragraphs, International Journal of Computational Linguistics and Applications, vol. 5, No. 1, Jan.-Jun. 2014, pp. 105-116.
Galitsky, Finding a Lattice of Needles in a Haystack: Forming a Query from a Set of Items of Interest, FCA4AI'15 Proceedings of the 4th International Conference, vol. 1430, Jan. 2015, 8 pages.
Galitsky et al., Finding Maximal Common Sub-Parse Thickets for Multi-Sentence Search, Graph Structures for Knowledge Representation and Reasoning, Jan. 2014, 19 pages.
Galitsky et al., From Generalization of Syntactic Parse Trees to Conceptual Graphs, Proceedings of the 18th International Conference on Conceptual structures: From Information to Intelligence, Jul. 26, 2010, pp. 185-190.
Galitsky, Generalization of Parse Trees for Iterative Taxonomy Learning, Information Sciences: An International Journal, vol. 329, Issue C, Feb. 1, 2016, pp. 125-143.
Galitsky et al., How Children with Autism and Machines Learn to Interact, Autonomy and Artificial Intelligence: A Threat or Savior?, Aug. 26, 2017, pp. 195-226.
Galitsky, Improving Relevance in a Content Pipeline via Syntactic Generalization, Engineering Applications of Artificial Intelligence, vol. 58, Feb. 2017, pp. 1-26.
Galitsky et al., Improving Text Retrieval Efficiency with Pattern Structures on Parse Thickets, Formal Concept Analysis Meets Information Retrieval, ECIR, 2013, 16 pages.
Galitsky et al., Improving Trust in Automation of Social Promotion, Association for the Advancement of Artificial Intelligence, Jan. 2014, pp. 28-35.
Galitsky, Inductive Learning of Dispute Scenarios for Online Resolution of Customer Complaints, 3rd International IEEE Conference Intelligent Systems, Sep. 2006, pp. 103-108.
Galitsky et al., Inferring the Semantic Properties of Sentences by Mining Syntactic Parse Trees, Data & Knowledge Engineering, vol. 81-82, Nov.-Dec. 2012, 44 pages.
Galitsky et al., Interrupt Me Politely: Recommending Products and Services by Joining Human Conversation, Proceedings of the Workshop on Natural Language Processing in E-Commerce, Dec. 12, 2020, 11 pages.
Galitsky et al., Justification of Customer Complaints Using Emotional States and Mental Actions, Proceedings of the Seventeenth International Florida Artificial Intelligence Research Society Conference, Miami Beach, Florida, USA, Jan. 2004, 6 pages.
Galitsky et al., Learning Adversarial Reasoning Patterns in Customer Complaints, Workshop at AAAI, (WS-11-06), 2011, 8 pages.
Galitsky et al., Learning Communicative Actions of Conflicting Human Agents, Journal of Experimental & Theoretical Artificial Intelligence, vol. 20, No. 4, Dec. 2008, pp. 277-317.
Galitsky, Learning Discourse-Level Structures for Question Answering, Developing Enterprise Chatbots, Apr. 5, 2019, pp. 177-219.
Galitsky, Learning Noisy Discourse Trees, Computational Linguistics and Intellectual Technologies, Proceedings of the International Conference "Dialogue 2017". Available Online at: http://www.dialog-21.ru/media/3911/galitskyb.pdf, May 31-Jun. 3, 2017, 14 pages.
Galitsky, Learning Parse Structure of Paragraphs and its Applications in Search, Engineering Applications of Artificial Intelligence, vol. 32, Jun. 2014, pp. 160-184.
Galitsky, Machine Learning of Syntactic Parse Trees for Search and Classification of Text, Engineering Applications of Artificial Intelligence, vol. 26, No. 3, Mar. 2013, pp. 1072-1091.
Galitsky, Matching Parse Thickets for Open Domain Question Answering, Data & Knowledge Engineering, vol. 107, Dec. 9, 2016, pp. 24-50.
Galitsky et al., Matching Sets of Parse Trees for Answering Multi-Sentence Questions, Proceedings of Recent Advances in Natural Language Processing, Sep. 7-13, 2013, pp. 285-293.
Galitsky et al., Mining the Blogosphere for Contributor's Sentiments, American Association for Artificial Intelligence, Jan. 2006, 3 pages.
Galitsky, Natural Language Question Answering System: Technique of Semantic HeadersAdvanced Knowledge International, vol. 2, Apr. 2003, 333 pages.
Galitsky, Natural Language Understanding with the Generality Feedback, Discrete Mathematics and Theoretical Computer Science Technical Report 99-32, Jun. 1999, pp. 1-21.
Galitsky et al., On a Chat Bot Finding Answers with Optimal Rhetoric Representation, Proceedings of Recent Advances in Natural Language Processing, Nov. 10, 2017, pp. 253-259.
Galitsky, On a Chatbot Conducting a Virtual Social Dialogue, 28th Association for Computing Machinery International Conference, Nov. 2019, 9 pages.

(56) References Cited

OTHER PUBLICATIONS

Galitsky et al., On a Chatbot Conducting Dialogue-in-Dialogue, Proceedings of the 20th Annual SIGdial Meeting on Discourse and Dialogue, Sep. 11-13, 2019, pp. 118-121.

Galitsky et al., On a Chatbot Conducting Virtual Dialogues, CIKM '19: Proceedings of the 28th ACM International Conference on Information and Knowledge Management, vol. 4, Nov. 3, 2019, pp. 2925-2928.

Galitsky et al., Parse Thicket Representation for Multi-Sentence Search, In: International Conference on Conceptual Structures, vol. 7735, Jan. 2013, pp. 153-172.

Galitsky et al., Programming Spatial Algorithms in Natural Language, Natural Language Processing, Available Online at https://www.researchgate.net/publication/255598711_Programming_Spatial_Algorithms_in_Natural_Language, Jan. 2008, pp. 16-23.

Galitsky, Providing Personalized Recommendation for Attending Events Based on Individual Interest Profiles, Artificial Intelligence Research, vol. 5, No. 1, Apr. 2016, 37 pages.

Galitsky, Reasoning About Attitudes of Complaining Customers, Knowledge-Based Systems, vol. 19, No. 7, Nov. 1, 2006, pp. 592-615.

Galitsky, Recommendation by Joining a Human Conversation, In Artificial Intelligence for Customer Relationship Management: solving customer problems, Dec. 24, 2020, pp. 63-92.

Galitsky et al., Rhetoric Map of an Answer to Compound Queries, Proceedings of the 53rd Annual Meeting of the 20 Association for Computational Linguistics and the 7th International Joint Conference of Natural Language Processing, vol. 2, Jul. 26-31, 2015, pp. 681-686.

Galitsky, Rhetorical Agreement: Maintaining Cohesive Conversations, Springer Nature, 2019, pp. 327-360.

Galitsky et al., Simulating the Conflict Between Reputation and Profitability for Online Rating Portals, Journal of Artificial Societies and Social Simulation vol. 8, No. 2, 2005, 21 pages.

Galitsky et al., Style and Genre Classification by Means of Deep Textual Parsing, Computational Linguistics and Intellectual Technologies: Proceedings of the International Conference "Dialogue 2016", Jun. 1-4, 2016, pp. 1-45.

Galitsky et al., Team Formation by Children with Autism, Research Gate, Available Online at: https://www.researchgate.net/publication/283023160, Jan. 2015, 10 pages.

Galitsky et al., Text Classification Based on Deep Textual Parsing, Available Online at: http://ceur-ws.org/Vol-1886/paper_8.pdf, 2011, 9 pages.

Galitsky et al., Text Classification into Abstract Classes Based on Discourse Structure, Proceedings of Recent Advances in Natural Language Processing, Sep. 7-9, 2015, pp. 200-207.

Galitsky et al., Text Integrity Assessment: Sentiment Profile vs Rhetoric Structure, CICLing, Springer International Publishing, Apr. 2015, pp. 126-139.

Galitsk, Transfer Learning of Syntactic Structures for Building Taxonomies for Search Engines, Engineering Applications of Artificial Intelligence, vol. 26, No. 10, Nov. 2013, 32 pages.

Galitsky, Using Extended Tree Kernels to Recognize Metalanguage in Text, Studies in Computational Intelligence, Feb. 2017, 25 pages.

Galitsky et al., Using Generalization of Syntactic Parse Trees for Taxonomy Capture on the Web, Proceedings of the 19th International Conference on Conceptual Structures, ICCS, Jul. 25, 2011, pp. 104-117.

Ganter et al., Pattern Structures and Their Projections, International Conference on Conceptual Structures, July 30-Aug. 3, 2001, 16 pages.

Garcia et al., Defeasible Logic Programming: An Argumentative Approach, Theory and Practice of Logic Programming, vol. 4, No. 2, Jan. 2004, pp. 95-138.

Garcia-Villalba et al., A Framework to Extract Arguments in Opinion Texts, International Journal of Cognitive Informatics and Natural Intelligence, vol. 6, No. 3, pp. 62-87, Jul.-Sep. 2012.

Gartner, Gartner Says 25 Percent of Customer Service Operations Will Use Virtual Customer Assistants by 2020, Newsroom, Available Online at https://www.gartner.com/newsroom/id/3858564, Feb. 19, 2018, pp. 1-3.

Ghosh et al., Analyzing Argumentative Discourse Units in Online Interactions, Proceedings of the First Workshop on Argumentation Mining, Jun. 26, 2014, pp. 39-48.

Gildea, Loosely Tree-Based Alignment for Machine Translation, Proceedings of the 41st Annual Meeting of the Association for Computational Linguistics, vol. 1, Jul. 2003, pp. 80-87.

Glickman et al., Web Based Probabilistic Textual Entailment, Computer Science Department, Available Online at: https://citeseerx.ist.psu.edu/viewdoc/download?doi=10.1.1.125.6555&rep=rep1&type=pdf, Jan. 2005, 4 pages.

Go et al., Twitter Sentiment Classification Using Distant Supervision, Technical Report, Jan. 2009, 6 pages.

Gomez et al., CICBUAPnlp: Graph-Based Approach for Answer Selection in Community Question Answering Task, Proceedings of the 9th International Workshop on Semantic Evaluation (SemEval 2015), Jun. 4-5, 2015, pp. 18-22.

Gomez et al., Reasoning with Inconsistent Ontologies through Argumentation, Applied Artificial Intelligence, vol. 24, No. 1-2, Feb. 2010, pp. 102-148.

Goutsos, Modeling Discourse Topic: Sequential Relations and Strategies in Expository Text, Text, vol. 16, No. 4, Dec. 1, 1996, pp. 501-533.

Grasso, Characterising Rhetorical Argumentation, Heriot-watt University, Department of Computing & Electrical Engineering, Jun. 2003, 235 pages.

Grasso, Playing with RST: Two Algorithms for the Automated Manipulation of Discourse Trees, Text, Speech and Dialogue: Second International Workshop, TSD'99 Plzen, Czech Republic, Lecture Notes in Computer Science, vol. 1692, Sep. 1, 1999, pp. 357-360.

Greenberg, Conversational Experiences: Building Relationships One Conversation at a Time, Social CRM: The Conversation, Oct. 30, 2018, 10 pages.

Grefenstette et al., Multi-Step Regression Learning for Compositional Distributional Semantics, Proceedings of the 10th International Conference on Computational Semantics, Jan. 30, 2013, 11 pages.

Grefenstette, Towards a Formal Distributional Semantics: Simulating Logical Calculi with Tensors, University of Oxford, Apr. 28, 2013, 10 pages.

Gronroos, The Relationship Marketing Process: Communication, Interaction, Dialogue, Value, Journal of Business & Industrial Marketing, vol. 19, Issue 2, Mar. 2004, pp. 99-113.

Grosz et al., Attention, Intentions, and the Structure of Discourse, Computational Linguistics, vol. 12, No. 3, July-Sep. 1986, pp. 175-204.

Grosz et al., Centering: A Framework for Modeling the Local Coherence of Discourse, Computational Linguistics, vol. 21, No. 2, Jan. 1995, pp. 203-225.

Grosz, Collaborative Plans for Complex Group Action, Artificial Intelligence, vol. 86, No. 2, Oct. 1, 1996, pp. 269-357.

Grosz et al., Discourse Analysis, in Understanding Spoken Language, Elsevier North-Holland, 1978, 36 pages.

Grudin, The Rise of Incompetence, Association for Computing Machinery Interactions, Available Online at: https://interactions.acm.org/archive/view/january-february-2016/the-rise-of-incompetence, Jan.-Feb. 2016, 2 pages.

Gundel et al., Cognitive Status and The Form of Referring Expressions in Discourse, Language, vol. 69, No. 2, Jun. 1993, pp. 274-307.

Guo et al., A Deep Relevance Matching Model for Ad-hoc Retrieval, In Proceedings of the 25th ACM International on Conference on Information and Knowledge Management, Oct. 24-28, 2016.

Hai et al., Deceptive Review Spam Detection via Exploiting Task Relatedness and Unlabeled Data, Proceedings of the 2016 Conference on Empirical Methods in Natural Language Processing, Nov. 1-5, 2016, pp. 1817-1826.

Hall et al., The Weka Data Mining Software: An Update, Special Interest Group on Knowledge Discovery and Data Mining, Explo-

(56) References Cited

OTHER PUBLICATIONS rations Newsletter, vol. 11, No. 1, Available Online at: http://dx.doi.org/10.1145/1656274.1656278, Jun. 2009, pp. 10-18.

Halliday et al., Cohesion in English, vol. 14, No. 1, 1980, pp. 47-50.

Hara et al., Exploring Difficulties in Parsing Imperatives and Questions, Proceedings of the 5th International Joint Conference on Natural Language Processing, Nov. 8-13, 2011, pp. 749-757.

Hart et al., Text Classification for Data Loss Prevention, Proceedings of the 11th International Conference on Privacy Enhancing Technologies, Jul. 27-29, 2011, 21 pages.

Hasida et al., SemAF: Discourse Structures, Online Available at: http://slideplayer.com/slide/6408486/, 2018, 6 pages.

Haussler, Convolution Kernels on Discrete Structures UCSC-CRL-99-10, University of California, Santa Barbara Technical Report, Jul. 8, 1999, 38 pages.

Hayes et al., The Future of Social Media Entertainment, Available Online at: http://www.personalizemedia.com/the-future-of-social-media-entertainment-slides/., Oct. 26, 2008, 6 pages.

He et al., Jointly Predicting Predicates and Arguments in Neural Semantic Role Labeling, Proceedings of the 56th Annual Meeting of the Association for Computational Linguistics, Available Online at: https://aclanthology.org/P18-2058.pdf, Jul. 15-20, 2018, pp. 364-369.

Heerschop et al., Polarity Analysis of Texts Using Discourse Structure, In Proceedings of the 20th ACM International Conference on Information and Knowledge Management, CIKM '11, Oct. 24, 2011, 10 pages.

Heilman et al., Good Question! Statistical Ranking for Question Generation, Human Language Technologies: The 2010 Annual Conference of the North American Chapter of the Association for Computational Linguistics, Jun. 2, 2010, pp. 609-617.

Hendrikx et al., Procedural Content Generation for Games: A Survey, ACM Transactions on Multimedia Computing, Communications and Applications, vol. 9, No. 1, Feb. 2013, pp. 1:1-1:22.

Hernault et al., A Sequential Model for Discourse Segmentation, International Conference on Intelligent Text Processing and Computational Linguistics, CICLing 2010: Computational Linguistics and Intelligent Text Processing, Mar. 21-27, 2010, pp. 315-326.

Hobbs, Coherence and Coreference, Cognitive Science, vol. 3, No. 1, Jan.-Mar. 1979, pp. 67-90.

Hoffman, Financial Report Ontology, Available Online at: http://www.xbrlsite.com/2015/fro/, 2015, 2 pages.

Hogenboom et al., Polarity Classification Using Structure-Based Vector Representations of Text, Decision Support Systems, vol. 74, Issue C, Jun. 1, 2015, 18 pages.

Hogenboom et al., Using Rhetorical Structure in Sentiment Analysis, Communications of the ACM, vol. 58, No. 7, Jul. 2015, pp. 69-77.

Houngbo et al., An Automated Method to Build A Corpus of Rhetorically-Classified Sentences in Biomedical Texts, Proceedings of the First Workshop on Argumentation Mining, Association for Computational Linguistics, Jun. 26, 2014, pp. 19-23.

Ibeke et al., Extracting and Understanding Contrastive Opinion through Topic Relevant Sentences, Proceedings of the Eighth International Joint Conference on Natural Language Processing, vol. 2, Nov. 27-Dec. 1, 2017, pp. 395-400.

Ilvovsky, Going Beyond Sentences When Applying Tree Kernels, Proceedings of the Student Research Workshop, vol. 20, No. 4, Jun. 22-27, 2014, pp. 56-63.

Indian Application No. 201947044096, First Examination Report mailed on Jan. 13, 2022, 5 pages.

Indian Application No. 202047007447, First Examination Report mailed on Sep. 9, 2021, 6 pages.

Iosif et al., Unsupervised Semantic Similarity Computation Between Terms Using Web Documents, Institute of Electrical and Electronics Engineers Transactions on Knowledge and Data Engineering, vol. 22, No. 11, Nov. 2010, pp. 1637-1647.

Iruskieta et al., A Qualitative Comparison Method for Rhetorical Structures: Identifying Different Discourse Structures in Multilingual Corpora, Lang Resources & Evaluation, vol. 49, No. 2, May 28, 2014, 47 pages.

Izquierdo et al., Appearances Can Be Deceiving: Lessons Learned Re-Implementing Axelrod's 'Evolutionary Approach to Norms, Journal of Artificial Societies and Social Simulation, vol. 8, No. 3, Available Online at http://jasss.soc.surrey.ac.uk/8/3/2.html, Jun. 30, 2005, 25 pages.

Jaccard, The Distribution of the Flora in the Alpine Zone, New Phytologist, vol. 11, No. 2, Feb. 1912, 15 pages.

Jansen et al., Discourse Complements Lexical Semantics for Non-Factoid Answer Reranking, Proceedings of the 52nd Annual Meeting of the Association for Computational Linguistics, vol. 1, Jun. 23-25, 2014, pp. 977-986.

Jansen et al., Worldtree: A Corpus of Explanation Graphs for Elementary Science Questions Supporting Multi-Hop Inference, CoRR, abs/1802.03052, 2018, 9 pages.

Janusz et al., Unsupervised Similarity Learning from Textual Data, Fundamenta Informaticae, vol. 119, Aug. 2012, pp. 319-336.

Jasinskaja et al., Rhetorical Relations, On the Coherence and Structure of Discourse, Available at: https://sfb1252.uni-koeln.de/sites/sfb_1252/user_upload/Pdfs_Publikationen/Jasinskaja_Karagjosova_accepted_Rhetorical_Relations_draft.pdf, Aug. 13, 2015, pp. 1-23.

Ji et al., An Information Retrieval Approach to Short Text Conversation, arXiv:1408.6988v1 [cs. IR], Aug. 29, 2014, 21 pages.

Ji et al., Neural Discourse Structure for Text Categorization, Proceedings of the 55th Annual Meeting of the Association for Computational Linguistics, vol. 1, Jul. 30-Aug. 4, 2017, pp. 996-1005.

Ji et al., Representation Learning for Text-Level Discourse Parsing, Association for Computational Linguistics, vol. 1: Long Papers, Available Online at: https://www.aclweb.org/anthology/P14-1002, Jun. 1, 2014, pp. 13-24.

Jia et al., Adversarial Examples for Evaluating Reading Comprehension Systems, Empirical Methods in Natural Language Processing, Jul. 23, 2017, 11 pages.

Jiang et al., Semantic Similarity Based on Corpus Statistics and Lexical Taxonomy, In Proceedings of International Conference Research on Computational Linguistics, Aug. 1997, 15 pages.

Jijkoun et al., Recognizing Textual Entailment Using Lexical Similarity, Available Online at: https://u.cs.biu.ac.il/~nlp/RTE1/Proceedings/jijkoun_and_de_rijke.pdf, Jan. 2005, 4 pages.

Jindal et al., Opinion Spam and Analysis, Proceeding WSDM '08 Proceedings of the 2008 International Conference on Web Search and Data Mining, Feb. 11, 2008, pp. 219-229.

Joachims et al., Cutting-Plane Training of Structural SVMs, Machine Learning, vol. 77, No. 1, May 9, 2009, pp. 27-59.

John et al., Estimating Continuous Distributions in Bayesian Classifiers, Proceedings of the Eleventh Conference on Uncertainty in Artificial Intelligence, Aug. 18, 1995, 8 pages.

Johnson et al., Procedural Generation of Linguistics, Dialects, Naming Conventions and Spoken Sentences, Proceedings of 1st International Joint Conference of DiGRA and FDG, 2016, pp. 1-9.

Johnson et al., The FrameNet Tagset for Frame-Semantic and Syntactic Coding of Predicate-Argument Structure, Proceedings of the First Meeting of the North American Chapter of the Association for Computational Linguistics, Apr. 2000, pp. 56-62.

Jorgensen et al., Challenges of Studying and Processing Dialects in Social Media, Proceedings of the ACL 2015 Workshop on Noisy User-Generated Text, Jul. 1, 2015, pp. 9-18.

Joty et al., A Novel Discriminative Framework for Sentence-Level Discourse Analysis, Proceedings of the Joint Conference on Empirical Methods in Natural Language Processing and Computational Natural Language Learning, Jul. 12-14, 2012, pp. 904-915.

Joty et al., CODRA: A Novel Discriminative Framework for Rhetorical Analysis, Computational Linguistics, vol. 41, No. 3, Sep. 1, 2015, pp. 385-435.

Joty et al., Combining Intra- and Multi-Sentential Rhetorical Parsing for Document-Level Discourse Analysis, 51st Annual Meeting of the Association for Computational Linguistics, vol. 1, Aug. 4-9, 2013, pp. 486-496.

(56) References Cited

OTHER PUBLICATIONS

Joty et al., Discriminative Reranking of Discourse Parses Using Tree Kernels, Proceedings of the 2014 Conference on Empirical Methods in Natural Language Processing, Oct. 25-29, 2014, pp. 2049-2060.

Jurafsky et al., Speech and Language Processing: An Introduction to Natural Language Processing, Computational Linguistics, and Speech Recognition, Pearson, Prentice Hall, 2000, pp. 719-761.

Kaiser et al., The Visual Perception of Motion by Observers with Autism Spectrum Disorders: A Review and Synthesis, Psychonomic Bulletin and Review, vol. 16, No. 15, Oct. 2009, pp. 761-777.

Kaminka et al., Flexible Teamwork in Behavior-based Robots, Proceedings, The Twentieth National Conference on Artificial Intelligence and the Seventeenth Innovative Applications of Artificial Intelligence Conference, Jul. 9-13, 2005, pp. 108-113.

Kaminka et al., Robust Multi Agent Teams via Socially-Attentive Monitoring, Journal of Artifcial Intelligence Research, vol. 12, No. 1, Feb. 1, 2000, pp. 105-147.

Kan et al., Linear Segmentation and Segment Significance, Department of Computer Science and Center for Research on Information Access, Sep. 15, 1998, 9 pages.

Kapoor et al., Algorithms for Enumerating All Spanning Trees of Undirected and Weighted Graph, SIAM Journal on Computing, vol. 24, No. 2, Society for Industrial and Applied Mathematics, Apr. 1995, pp. 247-265.

Kapoor et al., Algorithms for Generating All Spanning Trees of Undirected and Weighted Graphs, SIAM J. Computer, vol. 24, No. 2, Apr. 1, 1995, pp. 461-472.

Kate et al., Learning to Transform Natural to Formal Languages, Conference: Proceedings, The Twentieth National Conference on Artificial Intelligence and the Seventeenth Innovative Applications of Artificial Intelligence Conference, Jul. 2005, 7 pages.

Kelley, An Iterative Design Methodology for User-Friendly Natural Language Office Information Applications, ACM Transaction on Information Systems, vol. 2, No. 1, Mar. 1984, pp. 26-41.

Keltner et al., Understanding Emotions, Third Edition, Wiley & Co., Feb. 1996, 521 pages.

Kennedy et al., "Like-me" Simulation as an Effective and Cognitively Plausible Basis for Social Robotics, International Journal of Social Robotics, vol. 1, No. 2, Feb. 24, 2009, pp. 181-194.

Kerly et al., Bringing Chatbots into Education: Towards Natural Language Negotiation of Open Learner Models, Knowledge-Based Systems, vol. 20, No. 2, Dec. 11, 2006, 14 pages.

Khan et al., SWIMS: Semi-Supervised Subjective Feature Weighting and Intelligent Model Selection for Sentiment Analysis, Knowledge-Based Systems, vol. 100, May 15, 2016, pp. 97-111.

Khardon et al., "The Subsumption Lattice and Query Learning", Journal of Computer and System Sciences, vol. 72, No. 1, Feb. 2006, pp. 72-94.

Kim et al., Medevi: Retrieving Textual Evidence of Relations Between Biomedical Concepts from Medline, Bioinformatics, vol. 24, No. 11, Jun. 1, 2008, pp. 1410-1412.

Kipper et al., A Large-Scale Classification of English Verbs, Language Resources and Evaluation Journal, vol. 42, Dec. 2008, pp. 21-40.

Kipper et al., VerbNet Overview, Extensions, Mappings and Applications, Proceedings of Human Language Technologies, Annual Conference of the North American Chapter of the Association for Computational Linguistics, Companion, vol. Tutorial Abstracts, Jun. 2009, pp. 13-14.

Kirschner et al., Linking the Thoughts: Analysis of Argumentation Structures in Scientific Publications, Proceedings of the 2nd Workshop on Argumentation Mining, Jun. 4, 2015, pp. 1-11.

Kittredge et al., An Advanced English Grammar with Exercises, The Athenaeum Press, 1913, 266 pages.

Klenner, A Model for Multi-Perspective Opinion Inferences, Proceedings of IJCAI Workshop Natural Language Meets Journalism, Jul. 9, 2016, pp. 6-11.

Kocisky et al., The NarrativeQA Reading Comprehension Challeng, Transactions of the Association for Computational Linguistics, vol. 6, May 2018, pp. 317-328.

Kohavi, A Study of Cross-Validation and Bootstrap for Accuracy Estimation and Model Selection, IJCAI'95: Proceedings of the 14th international joint conference on Artificial intelligence, vol. 2, Aug. 20, 1995, 7 pages.

Koiti, Presentation on Theme: WG2 PWI24617-5 SemAF, Discourse Structure, Berlin HASIDA Koiti AIST, Accessed Oct. 14, 2019, 2 pages.

Kong, Are Simple Business Request Letters Really Simple? A Comparison of Chinese and English Business Request Letters, Text-Interdisciplinary Journal for the Study of Discourse, vol. 18, No. 1, 1998, pp. 103-141.

Kong et al., Improve Tree Kernel-Based Event Pronoun Resolution with Competitive Information, Proceedings of the Twenty-Second International Joint Conference on Artificial Intelligence, vol. 3, Jul. 16-22, 2011, pp. 1814-1819.

Kontos et al., Question Answering and Rhetoric Analysis of Biomedical Texts in the Aroma System, National and Kapodistrian University of Athens, Unpublished Manuscript, 2006, 6 pages.

Kostelnik et al., Chatbots For Enterprises: Outlook, Acta Universitatis Agriculturae ET Silviculturae Mendelianae Brunensis, vol. 67, No. 6, 2019, pp. 1541-1550.

Kovalerchuk et al., Toward Virtual Data Scientist with Visual Means, International Joint Conference on Neural Networks, May 1, 2017, pp. 3073-3080.

Krakovna et al., Increasing the Interpretability of Recurrent Neural Networks Using Hidden Markov Models, ICML Workshop on Human Interpretability in Machine Learning, Sep. 30, 2016, pp. 46-50.

Krippendorff, Reliability in Content Analysis: Some Common Misconceptions and Recommendations, Human Communication Research, vol. 30, No. 3, Jul. 2004, 15 pages.

Kuchaiev et al., Topological Network Alignment Uncovers Biological Function and Phylogeny, Journal of the Royal Society Interface, vol. 7, Mar. 24, 2010, pp. 1341-1354.

Kumar et al., A Framework for Automatic Question Generation from Text using Deep Reinforcement Learning, Proceedings of the 2019 IJCAI Workshop SCAI: The 4th International Workshop on Search-Oriented Conversational AI, Aug. 3, 2019, 7 pages.

Kuncheva, Classifier Ensembles for Changing Environments, Proccedings 5th Int. Workshop on Multiple Classifier Systems, Springer-Verlag, LNCS, vol. 3077, Jun. 2004, pp. 1-15.

Kushman et al., Learning to Automatically Solve Algebra Word Problems, Proceedings of the 52nd Annual Meeting of the Association for Computational Linguistics, Jun. 23-25, 2014, pp. 271-281.

Kuyten et al., A Discourse Search Engine based on Rhetorical Structure Theor, Advances in Information Retrieval: 37th European Conference on IR Research, Lecture Notes in Computer Science, vol. 9022. Springer, Cham., Mar. 2015, 12 pages.

Kwiatkowski et al., Natural Questions: A Benchmark for Question Answering Research, Transactions of the Association of Computational Linguistics, 2019, 14 pages.

Kwiatkowski et al., Scaling Semantic Parsers With on-the-fly Ontology Matching, Empirical Methods in Natural Language Processing, Oct. 18-21, 2013, pp. 1545-1556.

Kwon et al., Identifying and Classifying Subjective Claims, The Proceedings of the 8th Annual International Digital Government Research Conference, May 20-23, 2007, pp. 76-81.

Lake et al., Human-Level Concept Learning Through Probabilistic Program Induction, Science, vol. 350, No. 6266, Dec. 11, 2015, pp. 1332-1338.

Lan et al., ALBERT: A Lite BERT for Self-Supervised Learning of Language Representations, In Conference Paper at ICLR 2020, Feb. 9, 2020, pp. 1-17.

Larsson et al., Information State and Dialogue Management in the TRINDI Dialogue Move Engine Toolkit, Natural Language Engineering, vol. 6, Issue 3-4, Sep. 2000, pp. 323-340.

(56) References Cited

OTHER PUBLICATIONS

Lavie et al., METEOR: An Automatic Metric for MT Evaluation with High Levels of Correlation with Human Judgments, Proceedings of the Second Workshop on Statistical Machine Translation, Jun. 2007, 4 pages.

Lawless et al., AI and the Mitigation of Error: A Thermodynamics of Teams, Association for the Advancement of Artificial Intelligence Spring Symposia, 2016, 8 pages.

Lawless et al., Robust Intelligence (RI) Under Uncertainty: Mathematical Foundations of Autonomous Hybrid (Human-Machine-Robot) Teams, Organizations and Systems, Structure and Dynamics, vol. 6, No. 2, 2013, 35 pages.

Lawrence et al., Combining Argument Mining Techniques, Working Notes of the 2nd Argumentation Mining Workshop, Jun. 4, 2015, pp. 127-136.

Lawrence et al., Mining Argumentative Structure from Natural Language Text Using Automatically Generated Premise-Conclusion Topic Models, Proceedings of the 4th Workshop on Argument Mining, Sep. 8, 2017, pp. 39-48.

Lee et al., Deterministic Coreference Resolution Based on Entity-Centric, Precision-Ranked Rules, Computational Linguistics, vol. 39, No. 4, 2013, pp. 885-916.

Lee, Genres, Registers, Text Types, Domain, and Styles: Clarifying the Concepts and Navigating a Path Through the BNC Jungle, Language Learning & Technology, vol. 5, No. 3, Sep. 2001, pp. 37-72.

Levchuk et al., Active Inference in Multiagent Systems: Context-driven Collaboration and Decentralized Purpose-driven Team Adaptation, Artificial Intelligence for the Internet of Everything, 2019, 9 pages.

Levenshtein et al., Binary Codes Capable of Correcting Deletions, Insertions, and Reversals, Cybernetics and Control Theory, vol. 10, No. 8, Feb. 1966, pp. 707-710.

Levesque et al., GOLOG: A Logic Programming Language for Dynamic Domains, Journal of Logic Programming, vol. 31, No. 1-3, Apr.-Jun. 1997, pp. 59-83.

Levinson, Presumptive Meanings: The Theory of Generalized Conversational Implicature, Cambridge, MA: The Massachusetts Institute of Technology Press, Jan. 2000, pp. 1-10.

Li et al., A Diversity-Promoting Objective Function for Neural Conversation Models, arXiv:1510.03055v3 [cs.CL], Jun. 10, 2016, 11 pages.

Li et al., Adversarial Learning for Neural Dialogue Generation, Available Online at: https://www.aclweb.org/anthology/D17-1230.pdf, Sep. 24, 2017, 13 pages.

Li et al., Annotating the Little Prince with Chinese AMRs, LAW-2016, Berlin, Germany, Aug. 11, 2016, 9 pages.

Li et al., Chinese Abstract Meaning Representation, Available online at: https://catalog.ldc.upenn.edu/LDC2021T13, 2019, 2 pages.

Li et al., DailyDialog: A Manually Labelled Multi-Turn Dialogue Dataset, Proceedings of the Eighth International Joint Conference on Natural Language Processing, Long Papers, vol. 1, Dec. 1, 2017, pp. 986-995.

Li et al., Deep Reinforcement Learning for Dialogue Generation, Proceedings of the 2016 Conference on Empirical Methods in Natural Language Processing, Nov. 1-5, 2016, pp. 1192-1202.

Li et al., Dialogue History Matters! Personalized Response Selection in Multi-turn Retrieval-based Chatbots, Available online at: https://arxiv.org/abs/2103.09534, Mar. 17, 2021, 25 pages.

Li et al., Recursive Deep Models for Discourse Parsing, Conference: Proceedings of the 2014 Conference on Empirical Methods in Natural Language Processing, Jan. 2014, 10 pages.

Li et al., Shifting Matrix Management: A Model for Multi-Agent Cooperation, Engineering Applications of Artificial Intelligence, vol. 16, No. 3, Apr. 1, 2003, pp. 191-201.

Liang et al., Extending Implicit Discourse Relation Recognition to the PDTB-3, Available Online at: https://arxiv.org/pdf/2010.06294v1.pdf, Oct. 13, 2020, 13 pages.

Liang, Lambda Dependency-Based Compositional Semantics, Technical report, Available Online at: https://arxiv.org/pdf/1309.4408.pdf, Sep. 19, 2013, 7 pages.

Liapis et al., Sentient Sketchbook: Computer-Aided Game Level Authoring, In Proceedings of Association for Computing Machinery Conference on Foundations of Digital Games, May 2013, pp. 213-220.

Lin et al., A PDTB-Styled End-to-End Discourse Parser, Natural Language Engineering, vol. 20, No. 2, Apr. 2014, pp. 151-184.

Lin et al., DIRT—Discovery of Inference Rules from Text, Proceedings of the Seventh ACM SIGKDD International Conference on Knowledge Discovery and Data Mining, Aug. 26-29, 2001, pp. 323-328.

Lin et al., Recognizing Implicit Discourse Relations in the Penn Discourse Treebank, Conference: Proceedings of the 2009 Conference on Empirical Methods in Natural Language Processing, vol. 1, Aug. 6-7, 2009, pp. 343-351.

Ling et al., Program Induction by Rationale Generation: Learning to Solve and Explain Algebraic Word Problems, CoRR, abs/1705.04146, Oct. 23, 2017, 10 pages.

Lioma et al., Rhetorical Relations for Information Retrieval, Proceedings of the 35th international ACM SIGIR conference on Research and Development in Information Retrieval. Association for Computing Machinery, Aug. 12-16, 2012, pp. 931-940.

Lippi et al., Argument Mining from Speech: Detecting Claims in Political Debates, AAAI'16: Proceedings of the Thirtieth AAAI Conference on Artificial Intelligence, Feb. 2016, pp. 2979-2985.

Lippi et al., Argumentation Mining: State of the Art and Emerging Trends, ACM Transactions on Internet Technology, vol. 16, No. 2, Article 10, Mar. 2016, pp. 1-25.

Lippi et al., Margot: A Web Server for Argumentation Mining, Expert Systems with Applications, vol. 65, Dec. 2016, pp. 292-303.

Lisetti, Embodied Conversational Agents for Psychotherapy, CHI 2008 Workshop on Technology in Mental Health, vol. 5, No. 3, Jul. 31, 2008, 12 pages.

Litman et al., A Plan Recognition Model for Subdialogues in Conversations, Cognitive Science, vol. 11, No. 2, Apr. 1987, pp. 163-200.

Liu et al., How NOT to Evaluate Your Dialogue System: An Empirical Study of Unsupervised Evaluation Metrics for Dialogue Response Generation, Proceedings of the Conference on Empirical Methods in Natural Language Processing, Jan. 3, 2017, 15 pages.

Liu et al., Roberta: A Robustly Optimized Bert Pretraining Approach, arXiv:1907.11692, Available Online at: https://arxiv.org/abs/1907.11692, Jul. 26, 2019, 13 pages.

Liu et al., Towards Better Analysis of Deep Convolutional Neural Networks, IEEE Transactions on Visualization and Computer Graphics, vol. 23, No. 1, May 2016, pp. 1-10.

Lo Cascio et al., Grammatica dell'Argomentare: Strategie e Strutture, [A grammar of Arguing: strategiesand structures] Firenze: La Nuova Italia, 1991, pp. 662-663.

Logacheva et al., ConvAi Dataset of Topic-Oriented Human-to-Chatbot Dialogues, The NIPS '17 Competition: Building Intelligent Systems, 2018, pp. 47-57.

Louis et al., Discourse Indicators for Content Selection in Summaization, SIGDIAL Conference, The Association for Computer Linguistics, Sep. 2010, pp. 147-156.

Lowe et al., On the Evaluation of Dialogue Systems with Next Utterance Classification, Proceedings of the 17th Annual Meeting of the Special Interest Group on Discourse and Dialogue, Sep. 13-15, 2016, pp. 264-269.

Lowe et al., The Ubuntu Dialogue Corpus: A Large Dataset for Research in Unstructured Multi-Turn Dialogue Systems, In Proceedings of the 16th Annual Meeting of the Special Interest Group on Discourse and Dialogue, Feb. 4, 2016, 10 pages.

Luan et al., LSTM based Conversation Models, Department of Electrical Engineering, University of Washington, Mar. 31, 2016, 5 pages.

Lucas, Computer-Assisted Text Analysis for Comparative Politics, Political Analysis, vol. 23, No. 2, Feb. 4, 2015, pp. 254-277.

Lyons et al., Trust and Human-Machine Teaming: A Qualitative Study, Artificial Intelligence for the Internet of Everything, 2019, pp. 101-116.

(56) References Cited

OTHER PUBLICATIONS

Macagno, Argumentation Schemes, Cambridge University Press, 2008, pp. 517-573.

Maccartney et al., A Phrase-Based Alignment Model for Natural Language Inference, Conference on Empirical Methods in Natural Language Processing, Oct. 25, 2008, pp. 802-811.

Macewan, The Essentials of Argumentation, D. C. Heath, 1898, 474 pages.

Makhalova et al., Information Retrieval Chatbots Based on Conceptual Models, In book: Graph-Based Representation and Reasoning, Jun. 2019, pp. 230-238.

Makhalova et al., News Clustering Approach Based on Discourse Text Structure, Proceedings of the First Workshop on Computing News Storylines, Jul. 2015, pp. 16-20.

Makhalova et al., Pattern Structures for News Clustering, Proceedings of the 4th International Conference on What can FCA do for Artificial Intelligence, vol. 1430, Jul. 2015, pp. 35-42.

Mann, Discourse Structures for Text Generation, Proceedings of the 10th International Conference on Computational Linguistics and 22nd annual meeting on Association for Computational Linguistics, Jul. 2-6, 1984, pp. 367-375.

Mann et al., Rhetorical Structure Theory and Text Analysis, University of Southern California, Nov. 1989, 66 pages.

Mann et al., Rhetorical Structure Theory: Description and Construction of Text Structures, University of Southern California, Oct. 1986, 22 pages.

Mann et al., Rhetorical Structure Theory: Towards a Functional Theory of Text Organization, Text-Interdisciplinary Journal for the Study of Discourse, vol. 8, No. 3, Jan. 1988, pp. 243-281.

Mansilla et al., Asknext: An Agent Protocol for Social Search, Information Sciences, vol. 190, May 1, 2012, pp. 144-161.

Mansilla et al., Automation of Social Networks with QA Agents, Proceedings of 9th International Conference on Autonomous Agents and Multi-Agent Systems, AAMAS, Jan. 2010, pp. 1437-1438.

Marcheggiani et al., Encoding Sentences with Graph Convolutional Networks for Semantic Role Labeling, In Proceedings of the 2017 Conference on Empirical Methods in Natural Language Processing (EMNLP), Jul. 30, 2017, 11 pages.

Marcu et al., An Unsupervised Approach to Recognizing Discourse Relations, Proceedings of the 40th Annual Meeting of the Association for Computational Linguistics (ACL), Jul. 2002, 8 pages.

Marcu, From Discourse Structures to Text Summaries, Proceedings of the ACL Workshop on Intelligent Scalable Text Summarization, 1997, pp. 82-88.

Marcu, The Theory and Practice of Discourse Parsing and Summarization, MIT Press, Nov. 2000, 248 pages.

Marir et al., Rhetorical Structure Theory for Content-Based Indexing and Retrieval of Web Documents, ITRE 2004, 2nd International Conference Information Technology: Research and Education, Jun. 28- Jul. 1, 2004, pp. 160-164.

Markle-Huss et al., Improving Sentiment Analysis with Document-Level Semantic Relationships from Rhetoric Discourse Structures, 50th Hawaii International Conference on System Sciences, Jan. 2017, pp. 1142-1151.

Marks et al., Want Classified Information? Talk to The Chatbot, New Scientist, vol. 223, No. 2980, Aug. 2, 2014, p. 22.

Mathkour, A Novel Rhetorical Structure Approach for Classifying Arabic Security Documents, International Journal of Computer Theory and Engineering, vol. 1, No. 3, Aug. 2009, pp. 195-200.

Matousek et al., Text, Speech and Dialogue, Second International Workshop, TSD'99 Plzen, Czech Republic, Sep. 13-17, 1999, 11 pages.

Mavridis et al., Semantic Analysis of Web Documents for the Generation of Optimal Content, Engineering Applications of Artificial Intelligence, vol. 35, Oct. 2014, pp. 114-130.

May et al., SemEval-2017 Task 9: Abstract Meaning Representation Parsing and Generation, Proceedings of the 11th International Workshop on Semantic Evaluation, Aug. 3-4, 2017, pp. 536-545.

Maziero et al., Revisiting Cross-Document Structure Theory for Multi-Document Discourse Parsing, Information Processing & Management, vol. 50, No. 2, Mar. 2014, pp. 297-314.

McCarthy, Making Robots Conscious of Their Mental States, Proceedings of Machine Intelligence Conference 15, Jul. 1995, 8 pages.

McNamara et al., Are Good Texts Always Better? Interactions of Text Coherence, Background Knowledge, and Levels of Understanding in Learning from Text, Cognition and Instruction, vol. 14, No. 1, Mar. 1996, pp. 1-43.

Mercier et al., Why Do Humans Reason? Arguments for an Argumentative Theory, Behavioral and Brain Sciences, vol. 34, No. 2, Apr. 2011, pp. 57-111.

Miceli et al., Emotional and Non-Emotional Persuasion, Applied Artificial Intelligence, Jun. 2006, pp. 1-25.

Mikolov et al., Distributed Representations of Words and Phrases and Their Compositionality, Advances in Neural Information Processing Systems, vol. 26, Oct. 16, 2013, pp. 1-9.

Mikolov et al., Efficient Estimation of Word Representations in Vector Space, Available Online at: https://arxiv.org/pdf/1301.3781.pdf, Sep. 7, 2013, pp. 1-12.

Milenkovic et al., Uncovering Biological Network Function via Graphlet Degree Signatures, Cancer Informatics, vol. 6, Apr. 14, 2008, pp. 257-273.

Mitchell et al., Composition in Distributional Models of Semantics, Cognitive Science, vol. 34, No. 8, Mar. 25, 2010, pp. 1388-1429.

Mitkov et al., A Computer-Aided Environment for Generating Multiple-Choice test items, Natural Language Engineering, vol. 12, No. 2, Jun. 2006, pp. 177-194.

Mitocariu et al., Comparing Discourse Tree Structures, Computational Linguistics and Intelligent Text Processing: 14th International Conference, vol. 7816, Mar. 24-30, 2013, 11 pages.

Mittu et al., Introduction to the Symposium on AI and the Mitigation of Human Error, Association for the Advancement of Artificial Intelligence Spring Symposia, 2016, 4 pages.

Mochales et al., Argumentation Mining, Artificial Intelligence and Law, vol. 19, No. 1, Apr. 11, 2011, pp. 1-22.

Moens et al., Automatic Detection of Arguments in Legal Texts, Proceedings of the 11th International Conference on Artificial Intelligence and Law, ICAIL 2007, Jun. 4-8, 2007, pp. 225-230.

Moldovan et al., COGEX: A Logic Prover for Question Answering, Proceedings of HLT-NAACL, Main Papers, May-Jun. 2003, pp. 87-93.

Molnar, Interpretable Machine Learning. A Guide for Making Black Box Models Explainable, Available online at: https://christophm.github.io/interpretable-ml-book/, Aug. 14, 2018, 185 pages.

Montaner et al., A Taxonomy of Recommender Agents on the Internet, Artificial Intelligence Review, vol. 19, No. 4, Jun. 1, 2003, pp. 285-330.

Morato et al., Experiments in Discourse Analysis Impact on Information Classification and Retrieval Algorithms, Information Processing and Management, vol. 39, No. 6, Nov. 2003, pp. 825-851.

Moreda et al., Corpus-Based Semantic Role Approach in Information Retrieval, Data & Knowledge Engineering, vol. 61, No. 3, Jun. 2007, pp. 467-483.

Moschitti, Efficient Convolution Kernels for Dependency and Constituent Syntactic Trees, European Conference on Machine Learning, Sep. 2006, pp. 318-329.

Moschitti, Kernel Methods, Syntax and Semantics for Relational Text Categorization, In proceeding of ACM 17th Conference on Information and Knowledge Management, Oct. 26-30, 2008, pp. 253-262.

Moskowitz et al., Human Caused Bifurcations in a Hybrid Team—A Position Paper, Association for the Advancement of Artificial Intelligence Spring Symposia, 2016, 4 pages.

Mudrakarta et al., Did the Model Understand the Question?, Available Online at: https://arxiv.org/pdf/1805.05492.pdf, May 14, 2018, 12 pages.

Mukherjee et al., Fake Review Detection: Classification and Analysis of Real and Pseudo Reviews, Technical Report, Department of Computer Science, 2013, 11 pages.

(56) References Cited

OTHER PUBLICATIONS

Mukherjee et al., What Yelp Fake Review Filter Might Be Doing?, Proceedings of the Seventh International Association for the Advancement of Artificial Intelligence Conference on Weblogs and Social Media, Jan. 2013, pp. 409-418.
Murphy et al., What Makes a Text Persuasive? Comparing Students' and Experts' Conceptions of Persuasiveness, International Journal of Educational Research, vol. 35, pp. 675-698, 2001.
Nagarajan et al., Pivotal Sentiment Tree Classifier, International Journal of Scientific & Technology Research, vol. 3, No. 11, Nov. 15, 2014, pp. 290-295.
Nakamura et al., Another Diversity-Promoting Objective Function for Neural Dialogue Generation, Association for the Advancement of Artificial Intelligence, Nov. 21, 2018, 8 pages.
Narasimhan, Nvidia Clocks World Fastest Bert Training Time and Largest Transformer Based Model, Paving Path for Advanced Conversational AI, nVIDIA Developer Blog, Available Online at: https://developer.nvidia.com/blog/training-bert-with-gpus/, Aug. 13, 2019, 5 pages.
Narducci et al., Improving the User Experience with a Conversational Recommender System, International Conference of the Italian Association for Artificial Intelligence, 2018, pp. 528-538.
Nguyen et al., A Neural Local Coherence Model, Proceedings of the 55th Annual Meeting of the Association for Computational Linguistics, vol. 1, Long papers, Jul. 2017, pp. 1320-1330.
Novikova et al., Why We Need New Evaluation Metrics for NLG, Proceedings of the 2017 Conference on Empirical Methods in Natural Language Processing, Available Online at: http://aclanthology.lst.uni-saarland.de/D17-1238.pdf, Sep. 7-11, 2017, pp. 2241-2252.
Olivia et al., Case-based BDI Agents: An Effective Approach for Intelligent Search on the World Wide Web, Intelligent Agents in Cyberspace, 1999, pp. 20-27.
Oppong, What Was I Thinking? (The Science of Systematic Irrationality), Available Online at: https://medium.com/kaizen-habits/what-was-i-thinking-the-science-of-systematic-irrationality-e053e5476fcf, Oct. 25, 2018, 6 pages.
Oraby et al., And That's a Fact: Distinguishing Factual and Emotional Argumentation in Online Dialogue, Proceedings of the 2nd Workshop on Argumentation Mining, Jun. 4, 2015, pp. 116-126.
O'Reilly et al., Reversing the Reverse Cohesion Effect: Good Texts Can Be Better for Strategic, High-Knowledge Readers, Discourse Processes, vol. 43, No. 2, Dec. 5, 2007, pp. 121-152.
Ospina et al., Eliciting the Patient's Agenda- Secondary Analysis of Recorded Clinical Encounters, Journal of General Internal Medicine, vol. 34, No. 1, 2018, pp. 36-40.
Ott et al., Finding Deceptive Opinion Spam by Any Stretch of the Imagination, Proceedings of the 49th Annual Meeting of the Association for Computational Linguistics, vol. 1, Jun. 19-24, 2011, pp. 309-319.
Ott et al., Negative Deceptive Opinion Spam, Proceedings of the Conference of the North American Chapter of the Association for Computational Linguistics, Jun. 9-14, 2013, pp. 497-501.
Ourioupina et al., Application of Default Reasoning to Semantic Processing Under Question-Answering DIMACS Tech Report 16, May 2001, pp. 1-22.
Ouyang et al., Improving Recommendation by Deep Latent Factor-Based Explanation, Associated for the Advancement of Artificial Intelligence, 2020, 9 pages.
Pak et al., Twitter as a Corpus for Sentiment Analysis and Opinion Mining, Proceedings of the International Conference on Language Resources and Evaluation, May 17-23, 2010, pp. 1320-1326.
Palmer, SemLink: Linking PropBank, VerbNet and FrameNet, Proceedings of the Generative Lexicon Conference, GL 2009, Sep. 17, 2009, 54 pages.
Papineni et al., BLEU: A Method for Automatic Evaluation of Machine Translation, Proceedings of the 40th Annual Meeting on Association for Computational Linguistics, Available Online at: https://dl.acm.org/doi/pdf/10.3115/1073083.1073135, Jul. 2002, pp. 311-318.
Parameswaran, Emotions in Intelligent Agents FLAIRS-02 Proceedings, May 14-16, 2001, pp. 82-86.
Paranjape et al., Human-Like Informative Conversations: Better Acknowledgements Using Conditional Mutual Information, arXiv:2104.07831v1 [cs.CL], Apr. 16, 2021, 14 pages.
Park et al., Multimodal Explanations: Justifying Decisions and Pointing to the Evidence, CoRR, abs/1802.08129, Feb. 15, 2018, 11 pages.
Pasternack et al., Extracting Article Text from the Web with Maximum Subsequence Segmentation, Proceedings of the 18th International Conference on World Wide Web, Apr. 20-24, 2009, pp. 971-980.
International Application No. PCT/US2018/031890, International Preliminary Report on Patentability mailed on Nov. 21, 2019, 9 pages.
International Application No. PCT/US2018/031890, International Search Report and Written Opinion mailed on Aug. 17, 2018, 12 pages.
International Application No. PCT/US2018/053376, International Preliminary Report on Patentability mailed on Apr. 9, 2020, 12 pages.
International Application No. PCT/US2018/053376, International Search Report and Written Opinion mailed on Feb. 11, 2019, 18 pages.
International Application No. PCT/US2018/053376, Invitation to Pay Additional Fees and Partial Search Report mailed on Dec. 21, 2018, 11 pages.
International Application No. PCT/US2018/053392, International Preliminary Report on Patentability mailed on Apr. 9, 2020, 7 pages.
International Application No. PCT/US2018/053392, International Search Report and Written Opinion mailed on Dec. 17, 2018, 11 pages.
International Application No. PCT/US2019/015696, International Preliminary Report on Patentability mailed on Aug. 13, 2020, 8 pages.
International Application No. PCT/US2019/015696, International Search Report and Written Opinion mailed on Apr. 23, 2019, 12 pages.
International Application No. PCT/US2019/031580, International Preliminary Report on Patentability mailed on Nov. 19, 2020, 8 pages.
International Application No. PCT/US2019/031580, International Search Report and Written Opinion mailed on Jul. 5, 2019, 12 pages.
International Application No. PCT/US2021/035515, International Search Report and Written Opinion mailed on Sep. 15, 2021, 14 pages.
Peldszus et al., From Argument Diagrams to Argumentation Mining in Texts: A Survey, International Journal of Cognitive Informatics and Natural Intelligence, vol. 7, No. 1, Jan. 1, 2013, pp. 1-31.
Pelsmaekers et al., Rhetorical Relations and Subordination in L2 Writing, Linguistic Choice Across Genres: Variation in Spoken and Written English, Jul. 15, 1998, pp. 191-213.
Pendyala et al., Towards a Truthful World Wide Web from a Humanitarian Perspective, Institute of Electrical and Electronics Engineers 2015 Global Humanitarian Technology Conference, Oct. 8-11, 2015, 7 pages.
Pennington et al., GloVe: Global Vectors for Word Representation, Proceedings of the 2014 Conference on Empirical Methods in Natural Language Processing (EMNLP), Oct. 25-29, 2014, pp. 1532-1543.
Perrin et al., An Information-Theoretic Based Model for Large-Scale Contextual Text Processing, Information Sciences, vol. 116, Nos. 2-4, Jan. 1999, pp. 229-252.
Persing et al., Modeling Argument Strength in Student Essays, Proceedings of the 53rd Annual Meeting of the Association for Computational Linguistics and the 7th International Joint Conference on Natural Language Processing, Jul. 26-31, 2015, pp. 543-552.
Peter et al., The Peter Principle: Why Things Always Go Wrong, William Morrow and Company, 1968.
Peters et al., Deep Contextualized Word Representations, Proceedings of the 2018 Conference of the North American Chapter of the

(56) References Cited

OTHER PUBLICATIONS

Association for Computational Linguistics: Human Language Technologies, vol. 1, Jun. 1-6, 2018, pp. 2227-2237.

Pisarevskaya et al., An Anatomy of a Lie: Discourse Patterns in Customer Complaints Deception Dataset, In Companion Proceedings of The 2019 World Wide Web Conference, 2019, pp. 373-380.

Piwek et al., T2D: Generating Dialogues Between Virtual Agents Automatically from Text, Intelligent Virtual Agents, Sep. 17, 2007, pp. 161-174.

Plotkin, A Note on Inductive Generalization, Machine Intelligence 5, Chapter 8, 1970, pp. 153-163.

Poesio et al., Centering: A Parametric Theory and Its Instantiations, Computational Linguistics, vol. 30, No. 3, Sep. 1, 2004, pp. 309-363.

Polleti et al., Explanations Within Conversational Recommendation Systems: Improving Coverage Through Knowledge Graph Embeddings, Association for the Advancement of Artificial Intelligence (www.aaai.org), 2020, 8 pages.

Ponti, Machine Learning Techniques Applied to Dependency Parsing, Available Online at: https://vision.unipv.it/AI/AIRG/MachineLearningTechniquesAppliedToDependencyParsingRevised.pdf, Oct. 2015, 45 pages.

Poon et al., Unsupervised Semantic Parsing, Proceedings of the 2009 Conference on Empirical Methods in Natural Language Processing, Aug. 2009, pp. 1-10.

Popescu et al., Logic-Based Rhetorical Structuring for Natural Language Generation in Human-Computer Dialogue, Proceedings of the 10th International Conference on Text, Speech and Dialogue, Sep. 3-7, 2007, pp. 309-317.

Popescu-Belis, Dialogue Acts: One or More Dimensions?, ISSCO Working Paper No. 62, University of Geneva, Nov. 2005, pp. 1-46.

Prasad et al., The Penn Discourse TreeBank 2.0, Proceedings of the Sixth International Conference on Language Resources and Evaluation, 2008, 8 pages.

Qu et al., Weakly-Supervised Open-Retrieval Conversational Question Answering, arXiv:2103.02537v1 [cs.IR], Mar. 3, 2021, 15 pages.

Radev, A Common Theory of Information Fusion from Multiple Text Sources Step One: Cross-document Structure, Proceedings of the 1st SIGDial Workshop on Discourse and Dialogue, vol. 10, Oct. 7-8, 2000, pp. 74-83.

Radev et al., Centroid-Based Summarization of Multiple Documents: Sentence Extraction, Utility-Based Evaluation, 60 and User Studies, Proceedings of the 2000 NAACL-ANLPWorkshop on Automatic summarization—vol. 4 (NAACL-ANLP-AutoSum '00). Available Online at: https://doi.org/10.3115/1117575.1117578, Dec. 2000, 10 pages.

Rahwan et al., An Argumentation-Based Approach for Practical Reasoning, Proceedings of the Fifth International Joint Conference on Autonomous Agents and Multiagent Systems, May 8-12, 2006, pp. 347-354.

Rajpurkar et al., Know What You Don't Know: Unanswerable Questions for SQUAD, arXiv:1806.03822, Available Online at: https://arxiv.org/pdf/1806.03822.pdf, Jun. 11, 2018, 9 pages.

Rajpurkar et al., SQuAD: 100,000+ Questions for Machine Comprehension of Text, Proceedings of the Conference on Empirical Methods in Natural Language Processing, Available online at: https://doi.org/10.18653/v1/D16-1264, Oct. 11, 2016, pp. 2383-2392.

Rayana et al., Collective Opinion Spam Detection: Bridging Review Networks and Metadata, Proceedings of the 21st Association for Computing Machinery Special Interest Group on Knowledge Discovery and Data Mining International Conference on Knowledge Discovery and Data Mining, Aug. 11-14, 2015, 10 pages.

Recasens et al., The Life and Death of Discourse Entities: Identifying Singleton Mentions, Proceedings of NAACL-HLT, Jun. 9-14, 2013, pp. 627-633.

Redeker, Coherence and Structure in Text and Discourse, In: William Black & Harry Bunt (eds.), Abduction, Belief and Context in Dialogue. Studies in Computational Pragmatics, Jan. 2000, pp. 1-28.

Redey, Conformal Text Representation, Engineering Applications of Artificial Intelligence, vol. 6, No. 1, Feb. 1993, pp. 65-71.

Reed et al., Language Resources for Studying Argument, Proceedings of the 6th Conference on Language Resources and Evaluation, LREC2008, ELRA, May 2010, pp. 2613-2618.

Reichman, Getting Computers to Talk Like You and Me, Discourse Context, Focus and Semantics (An ATN Model), Massachusetts Institute of Technology Press, Jul. 1985, 17 pages.

Reiter, Proving Properties of States in the Situational Calculus, Journal Artificial Intelligence, vol. 64, No. 2, Dec. 1993, 17 pages.

Ribeiro et al., "Why Should I Trust You?" Explaining the Predictions of Any Classifier, KDD '16: Proceedings of the 22nd ACM SIGKDD International Conference on Knowledge Discovery and Data Mining, Available Online at: https://dl.acm.org/doi/10.1145/2939672.2939778, Aug. 2016, pp. 1135-1144.

Rich et al., Collagen: A Collaboration Manager for Software Interface Agents, User Modeling and User-Adapted Interaction, vol. 8, No. 3-4, Mar. 1998, 36 pages.

Ricoeur, The Rule of Metaphor: The Creation of Meaning in Language, University of Toronto Press, 1975, pp. 65-100.

Ritter et al., Data-Driven Response Generation in Social Media, Proceedings of the 2011 Conference on Empirical Methods in Natural Language Processing, Jul. 27-31, 2011, pp. 583-593.

Robinson, A Machine-Oriented Logic Based on the Resolution Principle, Journal of the Association for Computing Machinery, vol. 12, No. 1, Jan. 1965, pp. 23-41.

Rohde et al., Discourse Coherence: Concurrent Explicit and Implicit Relations, In Proceedings of the 56th Annual Meeting of the ACL, Available Online at: https://aclanthology.org/P18-1210.pdf, Jul. 15-20, 2018, pp. 2257-2267.

Rose et al., Discourse Processing of Dialogues with Multiple Threads, In Proceedings of the 33rd Annual Meeting of the Association for Computational Linguistics, Jun. 26-30, 1995, pp. 31-38.

Rosenthal et al., SemEval-2014 Task 9: Sentiment Analysis in Twitter, Proceedings of the 8th International Workshop on Semantic Evaluation (SemEval 2014), Aug. 23-24, 2014, pp. 73-80.

Roth et al., Neural Semantic Role Labeling with Dependency Path Embeddings, In Proceedings of the 54th Annual Meeting of the Association for Computational Linguistics (ACL), Available Online at: https://aclanthology.org/P16-1113.pdf, Aug. 7-12, 2016, pp. 1192-1202.

Rubiolo et al., Knowledge Discovery Through Ontology Matching: An Approach Based on an Artificial Neural Network Model, Information Sciences, vol. 194, Jul. 2012, pp. 107-119.

Ruder, An Overview of Gradient Descent Optimization Algorithms, Available Online at: https://arxiv.org/pdf/1609.04747.pdf, Jun. 15, 2017, 14 pages.

Ruppenhofer et al., FrameNet II: Extended Theory and Practice, Available Online at: https://framenet.icsi.berkeley.edu/fndrupal/the_book., 2016, 129 pages.

Russell et al., Principles of Metareasoning, Artificial Intelligence, vol. 49, No. (1-3), May 1991, pp. 400-411.

Sadek et al., A Discourse-Based Approach for Arabic Question Answering, Association for Computing Machinery Transactions on Asian and Low-Resource Language Information Processing, vol. 16, No. 2, Article 11, Nov. 4, 2016, pp. 1-18.

Sadek et al., Arabic Rhetorical Relations Extraction for Answering "Why" and "How to" Questions, Proceedings of the 17th international Conference on Applications of Natural Language Processing and Information Systems, Jun. 26, 2012, pp. 385-390.

Sagui et al., Modeling News Trust: A Defeasible Logic Programming Approach, Inteligencia Artificial, vol. 12, No. 40, Nov. 2008, pp. 63-72.

Sakai, Alternatives to Bpref, Proceedings of the 30th Annual International ACM SIGIR Conference on Research and Development in Information Retrieval, Jul. 2007, pp. 71-78.

Salton et al., On the Specification of Term Values in Automatic Indexing, Journal of Documentation, vol. 29, No. 4, Apr. 1, 1973, 35 pages.

(56) References Cited

OTHER PUBLICATIONS

Salton et al., Term Weighting Approaches in Automatic Text Retrieval, Information Processing & Management, vol. 24, No. 5, Nov. 1987, 22 pages.

Santhosh et al., Discourse Based Advancement on Question Answering System, International Journal on Soft Computing, Artificial Intelligence and Applications, vol. 1, No. 2, Oct. 2012, pp. 1-12.

Sardianos et al., Argument Extraction from News, Proceedings of the 2nd Workshop on Argumentation Mining, Jun. 4, 2015, pp. 56-66.

Sauper et al., Automatically Generating Wikipedia Articles: A Structure-Aware Approach, Proceedings of the 47th Annual Meeting of the Association for Computational Linguistics and the 4th International Joint Conference on Natural Language Processing of the Asian Federation of Natural Language Processing, Aug. 2-7, 2009, pp. 208-216.

Scheffler et al., Mapping PDTB-Style Connective Annotation to RST-Style Discourse Annotation, Proceedings of the 13th Conference on Natural Language Processing, 2016, pp. 242-247.

Scheutz, Agents with or Without Emotions, Proceedings of the Fifteenth International Florida Artificial Intelligence Research Society Conference, May 14, 2002, pp. 89-93.

Schlosser, Can Including Pros and Cons Increase the Helpfulness and Persuasiveness of Online Reviews? The Interactive Effects of Ratings and Arguments, Journal of Consumer Psychology, vol. 21, No. 3, Jul. 2011, pp. 226-239.

Schnabel et al., Evaluation Methods for Unsupervised Word Embeddings, Proceedings of the 2015 Conference on Empirical Methods in Natural Language Processing, Available Online at: https://www.aclweb.org/anthology/D15-1036.pdf, Sep. 17-21, 2015, pp. 298-307.

Schnedecker, Les Chaines De Reference Dans Les Portraits Journalistiques : Elements De Description, Travaux de Linguistique, Jan. 2005, pp. 85-133.

Schnedecker, Nom Propre Et Chaines De Reference, Recherches Linguistiques, 1997, 3 pages.

Scholman et al., A Step-Wise Approach to Discourse Annotation: Towards a Reliable Categorization of Coherence 64 Relations, Categories of Coherence Relations in Discourse Annotation, Dialogue & Discourse, vol. 7, No. 2, Feb. 2016, 28 pages.

Scholman et al., Examples and Specifications That Prove a Point: Identifying Elaborative and Argumentative Discourse Relations, Dialogue & Discourse, vol. 8, No. 2, Jul. 2017, pp. 56-83.

Schulz et al., A Frame Tracking Model for Memory-Enhanced Dialogue Systems, Available Online at: https://arxiv.org/pdf/1706.01690.pdf, Jun. 6, 2017, 9 pages.

Searle, Speech Acts: An Essay in the Philosophy of Language, Cambridge University Press, Jan. 1969, pp. 22-53.

Selivanov, GloVe Word Embeddings, Available Online at: https://cran.rproject.org/web/packages/text2vec/vignettes/glove.html, Feb. 18, 2020, 4 pages.

Seo et al., Online Community Search Using Thread Structure, In Proceedings of the 18th ACM Conference on Information and Knowledge Management, Nov. 2009, 4 pages.

Seo et al., Syntactic Graphs: A Representation for the Union of All Ambiguous Parse Trees, Computational Linguistics, vol. 15, No. 1, Mar. 1, 1989, pp. 19-32.

Serban et al., A Hierarchical Latent Variable Encoder-Decoder Model for Generating Dialogues, vol. 31 No. 1: Proceedings of the Thirty-First Association for the Advancement of Artificial Intelligence Conference on Artificial Intelligence, Jun. 14, 2016, 15 pages.

Serban et al., A Survey of Available Corpora for Building Data-Driven Dialogue Systems, Available online at: https://arxiv.org/pdf/1512.05742.pdf, Mar. 21, 2017, 56 pages.

Serban et al., Building End-To-End Dialogue Systems Using Generative Hierarchical Neural Network Models, Proceedings of the Thirtieth Association for the Advancement of Artificial Intelligence Conference on Artificial Intelligence, Apr. 6, 2016, 8 pages.

Serban et al., Generating Factoid Questions with Recurrent Neural Networks: The 30M Factoid Question-Answer Corpus, Proceedings of the 54th Annual Meeting of the Association for Computational Linguistics, vol. 1 Long Papers, May 29, 2016, 13 pages.

Severyn et al., Fast Support Vector Machines for Convolution Tree Kernels, Data Mining Knowledge Discovery, vol. 25, No. 2, Sep. 2012, 33 pages.

Shaw, 3 Reasons Why People Say One Thing and Do Another, Available online at: https://beyondphilosophy.com/3-reasons-why-people-say-one-thing-and-do-another/, May 22, 2015, 7 pages.

Shoham, Agent-Oriented Programming, Artificial Intelligence, vol. 60, No. 1, Mar. 1, 1993, pp. 51-92.

Shuldiner, Raising Them Right: AI and the Internet of Big Things, Chapter 8, Artificial Intelligence for the Internet of Everything, Feb. 21, 2019, pp. 139-143.

Sidorov et al., Syntactic N-Grams as Machine Learning Features for Natural Language Processing, Expert Systems with Applications, vol. 41, No. 3, Feb. 15, 2014, pp. 853-860.

Sjoera, The Linguistics Behind Chat Bots, iCapps, Available Online at: http://www.icapps.com/the-linguistics-behind-chatbots/, Feb. 22, 2017, 9 pages.

Sloman, Architecture-Based Conceptions of Mind, In Proceedings of 11th International Congress of Logic, Methodology and Philosophy of Science, 2000, 18 pages.

Socher et al., Learning Continuous Phrase Representations and Syntactic Parsing with Recursive Neural Networks, Proceedings of the NIPS Deep Learning and Unsupervised Feature Learning Workshop, Jan. 2010, pp. 1-9.

Socher et al., Recursive Deep Models for Semantic Compositionality Over a Sentiment Treebank, Proceedings of the 2013 Conference on Empirical Methods in Natural Language Processing, Oct. 2013, pp. 1631-1642.

Somasundaran et al., Supervised and Unsupervised Methods in Employing Discourse Relations for Improving Opinion Polarity Classification, Proceedings of the 2009 Conference on Empirical Methods in Natural Language Processing: vol. 1-vol. 1, In EMNLP, ACL, Aug. 2009, pp. 170-179.

Sordoni et al., A Neural Network Approach to Context-Sensitive Generation of Conversational Responses, arXiv: 1506.06714v1 [cs.CL], Jun. 22, 2015, 11 pages.

Soricut et al., Sentence Level Discourse Parsing using Syntactic and Lexical Information, NAACL '03: Proceedings of the 2003 Conference of the North American Chapter of the Association for Computational Linguistics on Human Language Technology—vol. 1, Available Online at: https://www.aclweb.org/anthology/J02-4002, May 27, 2003, pp. 149-156.

Sperber et al., Relevance: Communication and Cognition, Blackwell, Oxford and Harvard University Press, 1986, 331 pages.

Stab et al., Identifying Argumentative Discourse Structures in Persuasive Essays, Proceedings of the 2014 Conference on Empirical Methods in Natural Language Processing (EMNLP), Oct. 1, 2014, pp. 46-56.

Stab et al., Recognizing Insufficiently Supported Arguments in Argumentative Essays, Proceedings of the 15th Conference of the European Chapter of the Association for Computational Linguistics (EACL 2017), vol. 1, Apr. 3-7, 2017, pp. 980-990.

Stab et al., Recognizing the Absence of Opposing Arguments in Persuasive Essays, Proceedings of the 3rd Workshop on Argument Mining, Aug. 7-12, 2016, pp. 113-118.

Stein et al., Towards More Flexible and Common-sensical Reasoning About Beliefs, Representing Mental States and Mechanisms, 1995 AAAI Spring Symposium, Mar. 1995, 9 pages.

Stevenson et al., A Semantic Approach to IE Pattern Induction, Proceedings of the 43rd Annual Meeting on Association for Computational Linguistics, Jun. 2005, pp. 379-386.

Stone et al., Multiagent Systems: A Survey from a Machine Learning Perspective, Autonomous Robots, vol. 8, No. 3, Jun. 1, 2000, 57 pages.

Strubell et al., Linguistically-Informed Self-Attention for Semantic Role Labeling, Available Online at: https://arxiv.org/pdf/1804.08199.pdf?source=post_page, Nov. 12, 2018, 14 pages.

Suchanek et al., A Core of Semantic Knowledge, In Proceedings of the 16th international conference on World Wide Web, May 8-12, 2007, pp. 697-706.

(56) References Cited

OTHER PUBLICATIONS

Sun et al., Conversational Recommender System, Available Online at https://arxiv.org/pdf/1806.03277.pdf, Jun. 8, 2018, 10 pages.
Sun et al., Discourse Processing for Context Question Answering Based on Linguistic Knowledge, Knowledge-Based System, vol. 20, No. 6, Aug. 1, 2007, pp. 1-23.
Sun et al., Exploiting Product Related Review Features for Fake Review Detection, Mathematical Problems in Engineering, vol. 2016, No. 1, Article ID 4935792, Aug. 4, 2016, 8 pages.
Sun et al., Exploring Syntactic Structural Features for Sub-Tree Alignment Using Bilingual Tree Kernels, Proceedings of the 48th Annual Meeting of the Association for Computational Linguistics, Jul. 2010, pp. 306-315.
Sun et al., Tree Sequence Kernel for Natural Language, Proceedings of the Twenty-Fifth Association for the Advancement of Artificial Intelligence Conference on Artificial Intelligence, Aug. 2011, 6 pages.
Surdeanu et al., Two Practical Rhetorical Structure Theory Parsers, Proceedings of the Conference of the North American Chapter of the Association for Computational Linguistics-Human Language Technologies, Jun. 5, 2015, pp. 1-5.
Suwandaratna et al., Discourse Marker Based Topic Identification and Search Results Refining, In Information and Automation for Sustainability (ICIAFs), 5th International Conference, 2010, pp. 119-125.
Suykens et al., Advances in Learning Theory: Methods, Models and Applications, IOS Press, NATO Science Series, III: Computer and Systems Sciences, vol. 190, May 2006, 440 pages.
Taboada et al., Rhetorical Structure Theory: Looking Back and Moving Ahead, Discourse Studies, vol. 8, No. 3, Jan. 24, 2006, pp. 423-459.
Taboada, The Genre Structure of Bulletin Board Messages, Text Technology, vol. 13, No. 2, Nov. 2, 2004, pp. 55-82.
Tai et al., Improved Semantic Representations from Tree-Structured Long Short-Term Memory Networks, Available Online at: https://arxiv.org/pdf/1503.00075.pdf, May 30, 2015, 11 pages.
Tamma et al., Ontologies for Supporting Negotiation in E-commerce, Engineering Applications of Artificial Intelligence, vol. 18, No. 2, Mar. 2005, pp. 223-236.
Tang et al., Coooolll: A Deep Learning System for Twitter Sentiment Classification, Proceedings of the 8th International Workshop on Semantic Evaluation (SemEval 2014), Aug. 23-24, 2014, pp. 208-212.
Tao et al., Multi-Representation Fusion Network for Multi-turn Response Selection in Retrieval-based Chatbots, In Proceedings of the Twelfth ACM International Conference on Web Search and Data Mining, Feb. 11-15, 2019, pp. 267-275.
Teufel et al., Summarizing Scientific Articles: Experiments with Relevance and Rhetorical Status, Computational Linguistics, vol. 28, No. 4, Dec. 2002, pp. 409-445.
Theranos, Wall Street Journal: Letter to the Editor, Theranos Works to Realize Access to Preventive Care, Available Online at: https://theranos.com/news/posts/wall-street-journal-letter-to-the-editor, Dec. 22, 2015, 4 pages.
Thompson et al., A Personalized System for Conversational Recommendations, Journal of Artificial Intelligence Research, vol. 21, No. 1, Mar. 2004, pp. 393-428.
Thompson et al., Learning to Parse NL Database Queries into Logical Form, Proceedings of the ICML-97 Workshop on Automata Induction, Grammatical Inference, and Language Aquicision, Jul. 1997, 9 pages.
Tneogi, Conversational Interfaces Need a Different Content Management System, Chatbot Magazine, Available Online at https://chatbotsmagazine.com/conversational-interfaces-need-a-different-content-management-system-b105bb6f716, Mar. 26, 2017, pp. 1-3.
Todirascu et al., Coherence and Cohesion for the Assessment of Text Readability, Proceedings of NLPCS 2013, Oct. 2013, pp. 11-19.
Torrance et al., Rhetorical Structure Analysis as a Method for Understanding Writing Processes, Presented at the Multidisciplinary Approaches to Discourse (MAD) Workshop, Information Technology Research Institute Technical Report Series, Aug. 2001, 9 pages.
Toulmin, The Uses of Argument, Cambridge At the University Press, 1958, 259 pages.
Trafton et al., ACT-R/E: An Embodied Cognitive Architecture for Human-Robot Interaction, Journal of Human-Robot Interaction, vol. 2, No. 1, Feb. 2013, 26 pages.
Traum et al., Conversation Acts in Task-Oriented Spoken Dialogue, University of Rochester Computer Science, Computational Intelligence, vol. 8, No. 3, Jun. 1992, 31 pages.
Traum et al., Discourse Obligations in Dialogue Processing, Proceedings of the 32nd Annual Meeting on Association for Computational Linguistics, Jun. 27-30, 1994, pp. 1-8.
Traum, Rhetorical Relations, Action and Intentionality in Conversation, Proceedings ACL SIG Workshop on Intentionality and Structure in Discourse Relations, Jun. 1993, pp. 132-135.
Trstenjak et al., KNN with TF-IDF Based Framework for Text Categorization, Procedia Engineering, vol. 69, 24th Danube Adria Association for Automation and Manufacturing International Symposium on Intelligent Manufacturing and Automation, 2014, pp. 1356-1364.
Tseng et al., Tree-Structured Semantic Encoder with Knowledge Sharing for Domain Adaptation in Natural Language Generation, Available Online at: https://arxiv.org/pdf/1910.06719.pdf, Oct. 2, 2019, 10 pages.
Tsui, English Conversation, Describing English Language, Oxford University Press, 1994, 37 pages.
Turek, Explainable Artificial Intelligence (XAI), Available Online at: https://www.darpa.mil/program/explainable-artificial-intelligence, Accessed from Internet on Aug. 27, 2019, pp. 1-10.
Turner, A Model Explanation System: Latest Updates and Extensions, ICML Workshop on Human Interpretability in Machine Learning, Available Online at: https://arxiv.org/pdf/1606.09517v1.pdf, Jun. 30, 2016, pp. 1-5.
Uliyar, A Primer: Oracle Intelligent Bots, Powered by Artificial Intelligence, White Paper, Sep. 2017, pp. 1-28.
Van Der Wees et al., Five Shades of Noise: Analyzing Machine Translation Errors in User-Generated Text, Proceedings of the ACL 2015 Workshop on Noisy User-generated Text, Jul. 31, 2015, pp. 28-37.
Van Dijk, Explorations in the Semantics and Pragmatics of Discourse, Text and Context, Longman Linguistics Library, 1977, 274 pages.
Van Durme et al., Towards Light Semantic Processing for Question Answering, Proceedings of the HLT-NAACL 2003 Workshop on Text meaning, vol. 9, May 2003, pp. 54-61.
Van Eemeren et al., Fundamentals of Argumentation Theory: A Handbook of Historical Backgrounds and Contemporary Developments, Routledge, Taylor & Francis Group, Mar. 1, 1996, 440 pages.
Vapnik, The Nature of Statistical Learning Theory, Springer Science, 1995, 201 pages.
Vaswani et al., Attention is all You Need, 31st Conference on Neural Information Processing Systems, Available Online at:https://arxiv.org/pdf/1706.03762.pdf, Dec. 6, 2017, pp. 1-15.
Venkatesh et al., On Evaluating and Comparing Conversational Agents, 31st Conference on Neural Information Processing Systems, Jan. 2018, 10 pages.
Verberne et al., Discourse-Based Answering of Why-Questions, TAL Traitement Automatique des Langues, vol. 47, No. 2, Sep. 2007, pp. 21-41.
Virtanen, Analysing Argumentative Strategies: A Reply to a Complaint, Anglicana Turkuensia, vol. 14, 1995, pp. 539-547.
Vorontsov et al., Additive Regularization of Topic Models, Machine Learning, vol. 101, No. 1-3, Oct. 2015, 21 pages.
Wade, 5 Ways Chatbots Are Revolutionizing Knowledge Management, Available Online at: https://blog.getbizzy.io/5-ways-chatbots-are-revolutionizing-knowledge-management-bdf925db66e9, Feb. 12, 2018, pp. 1-8.
Walia et al., Semantic Features for Automated Answer Scoring, International Journal if Advance Research in Science and Engineering, vol. 6, No. 10, Oct. 24, 2017, 6 pages.

(56) References Cited

OTHER PUBLICATIONS

Walker et al., Quantitative and Qualitative Evaluation of Darpa Communicator Spoken Dialogue Systems, Proceedings of the 39th Annual Meeting of the Association for Computational Linguistics, Jul. 6-11, 2001, 8 pages.

Walton, Argumentation Schemes for Presumptive Reasoning, Lawrence Erlbaum Associates, Publishers, 1996, 39 pages.

Walton, Dialogical Models of Explanation, Explanation-Aware Computing: Papers from the Association for the Advancement of Artificial Intelligence Workshop, Technical Report WS-07-06, Association for the Advancement of Artificial Intelligence Workshop Press, Jan. 2007, 9 pages.

Wang et al., A Dataset for Research on Short-Text Conversation, Proceedings of the 2013 Conference on Empirical Methods in Natural Language Processing, Oct. 18-21, 2013, pp. 935-945.

Wang et al., A Joint Model for Question Answering and Question Generation, Learning to Generate Natural Language Workshop, ICML, Jun. 5, 2017, 7 pages.

Wang et al., A Simple and Generic Belief Tracking Mechanism for the Dialog State Tracking Challenge: On the Believability of Observed Information, Proceedings of the SIGDIAL 2013 Conference, Aug. 22-24, 2013, pp. 423-432.

Wang et al., An Information Retrieval Approach Based on Discourse Type, Proceedings of the 11th International Conference on Applications of Natural Language to Information Systems, May 2006, pp. 197-202.

Wang et al., Kernel Based Discourse Relation Recognition with Temporal Ordering Information, Proceedings of the 48th Annual Meeting of the Association for Computational Linguistics, Jul. 11-16, 2010, pp. 710-719.

Wang et al., Learning Sentence Representation with Guidance of Human Attention, Proceedings of the Twenty-Sixth International Joint Conference on Artificial Intelligence (IJCAI-17), May 2017, pp. 4137-4143.

Wang et al., Predicting Thread Discourse Structure Over Technical Web Forums, Proceedings of the 2011 Conference on Empirical Methods in Natural Language Processing, Jul. 27, 2011, pp. 13-25.

Wang et al., Using Learning Analytics to Understand the Design of an Intelligent Language Tutor-Chatbot Lucy, International Journal of Advanced Computer Science and Applications, vol. 4, No. 11, Nov. 2013, pp. 124-131.

Webber et al., Discourse Structure and Language Technology, Natural Language Engineering, vol. 18, No. 4, Oct. 2012, pp. 437-490.

Webber et al., The Penn Discourse Treebank 3.0 Annotation Manual, Available Online at: https://catalog.ldc.upenn.edu/docs/LDC2019T05/PDTB3-Annotation-Manual.pdf, Mar. 15, 2019, 81 pages.

Weigand et al., Argumentation Semantics of Communicative Action, Proceedings of the 9th International Working Conference on the Language-Action Perspective on Communication Modelling, Jun. 2004, pp. 159-178.

Wenyin et al., A Short Text Modeling Method Combining Semantic and Statistical Information, Information Sciences, vol. 180, No. 20, Oct. 15, 2010, pp. 4031-4041.

Wilks, Machine Conversations, The Springer International Series in Engineering and Computer Science, vol. 511, 1999, 38 pages.

Wolf et al., Representing Discourse Coherence: A Corpus-Based Study, Computational Linguistics, vol. 31, No. 2, Jun. 2005, pp. 134-140.

Wooldridge, Reasoning about Rational Agents, MIT Press, Jul. 14, 2000, 2 pages.

Wu et al., Adaptive Peer to Peer Social Networks for Distributed Content Based Web Search, Social Information Retrieval Systems: Emergent Technologies and Applications for Searching the Web Effectively, IGI Global, 2007, 31 pages.

Wu et al., Enhancing Text Representation for Classification Tasks with Semantic Graph Structures, International Journal of Innovative Computing, Information and Control, vol. 7, No. 5, May 2011, pp. 2689-2698.

Wu et al., Sequential Matching Network: A New Architecture for Multi-turn Response Selection in Retrieval-based Chatbots, In Proceedings of the 55th Annual Meeting of the Association for Computational Linguistics (vol. 1: Long Papers), vol. 1, May 15, 2017, 10 pages.

Wuchner et al., Data Loss Prevention Based on Data-Driven Usage Control, Proceedings of the Institute of Electrical and Electronics Engineers 23rd International Symposium on Software Reliability Engineering, Nov. 27-30, 2012, 10 pages.

Yang et al., Extract Conceptual Graphs from Plain Texts in Patent Claims, Engineering Applications of Artificial Intelligence, vol. 25, No. 4, Jun. 2012, pp. 874-887.

Yang et al., Reflections on Rational Choice-The Existence of Systematic Irrationality, The Journal of Socio-Economics. vol. 37, No. 3, Jun. 2008, pp. 1218-1233.

Yao et al., Information Extraction over Structured data: Question Answering with Freebase, In Proceedings of the 52nd ACL, Jun. 23-25, 2014, pp. 956-966.

Yao et al., Online Deception Detection Refueled by Real World Data Collection, Proceedings of Recent Advances in Natural Language Processing, Jul. 28, 2017, 10 pages.

Yao et al., Semantics-Based Question Generation and Implementation, Dialogue & Discourse, vol. 3, No. 2, Mar. 17, 2012, pp. 11-42.

Yessenalina et al., Compositional Matrix-Space Models for Sentiment Analysis, Proceedings of the 2011 Conference on Empirical Methods in Natural Language Processing, Jul. 27-31, 2011, pp. 172-182.

Yih et al., Semantic Parsing via Staged Query Graph Generation: Question Answering with Knowledge Base, Microsoft Research, Proceedings of the 53rd Annual Meeting of the Association for Computational Linguistics and the 7th International Joint Conference on Natural Language Processing, vol. 1, Jul. 26-31, 2015, pp. 1321-1331.

Young et al., POMDP-Based Statistical Spoken Dialogue Systems: A Review, Proceedings of the IEEE, vol. 101, No. 5, Jan. 9, 2013, pp. 1160-1179.

Yu et al., A Multi-Agents Based E-Maintenance System with Case-based Reasoning Decision Support, Engineering Applications of Artificial Intelligence, vol. 16, No. 4, Jun. 1, 2003, 12 pages.

Yu et al., Detecting User Engagement in Everyday Conversations, Available online at: https://arxiv.org/pdf/cs/0410027.pdf, Oct. 13, 2004, 4 pages.

Yu et al., Learning to Skim Text, Available Online at: https://arxiv.org/pdf/1704.06877.pdf, Apr. 29, 2017, 11 pages.

Yuan et al., Machine Comprehension by Text-to-Text Neural Question Generation, Proceedings of the 2nd Workshop on Representation Learning for Natural Language Processing, Aug. 3, 2017, pp. 15-25.

Zanzotto et al., Estimating Linear Models for Compositional Distributional Semantics, Proceedings of the 23rd International Conference on Computational Linguistics (COLING 2010), Aug. 23-27, 2010, pp. 1263-1271.

Zarrella et al., MITRE: Seven Systems for Semantic Similarity in Tweets, Proceedings of the 9th International Workshop on Semantic Evaluation (SemEval 2015), Jun. 4-5, 2015, pp. 12-17.

Zeilenga, Lightweight Directory Access Protocol (LDAP) Read Entry Controls, Standards Track, Network Working Group, IETF, RFC 4527, Jun. 2006, 8 pages.

Zhang et al., Exploring Syntactic Structured Features Over Parse Trees for Relation Extraction Using Kernel Methods, Information Processing & Management, vol. 44, No. 2, Mar. 2008, pp. 687-701.

Zhang et al., Question Classification Using Support Vector Machines, Proceedings of the 26th Annual International Acm Sigir Conference on Research and Development in Information Retrieval, Jul. 28-Aug. 1, 2003, pp. 26-32.

Zhang et al., Semantic Role Labeling Using a Grammar-Driven Convolution Tree Kernel, Institute of Electrical and Electronics Engineers, Transactions on Audio Speech and Language Processing, vol. 16, No. 7, Sep. 2008, pp. 1315-1329.

Zhao et al., Application-Driven Statistical Paraphrase Generation, Proceedings of the 47th Annual Meeting of the ACL and the 4th IJCNLP of the AFNLP, Aug. 2-7, 2009, pp. 834-842.

(56) References Cited

OTHER PUBLICATIONS

Zhao et al., Facilitating Discourse Analysis with Interactive Visualization, Institute of Electrical and Electronics Engineers Transactions on Visualization and Computer Graphics, vol. 18, No. 12, Dec. 2012, 10 pages.

Zhao et al., Joint Syntacto-Discourse Parsing and the Syntacto-Discourse Treebank, Oregon State University, Available online at: https://arxiv.org/pdf/1708.08484.pdf, Aug. 28, 2017, pp. 2117-2123.

Zhou et al., Multi-Turn Response Selection for Chatbots with Deep Attention Matching Network, Proceedings of the 56th Annual Meeting of the Association for Computational Linguistics (vol. 1: Long Papers), Jul. 2018, pp. 1118-1127.

Zhou et al., Multi-view Response Selection for Human-Computer Conversation, Proceedings of the 2016 Conference on Empirical Methods in Natural Language Processing, Nov. 2016, pp. 372-381.

Zhu et al., Explainable AI for Designers: A Human-Centered Perspective on Mixed-Initiative Co-Creation, IEEE Conference on Computational Intelligence and Games (CIG), 2018, 8 pages.

U.S. Appl. No. 16/789,849, Notice of Allowance mailed on Oct. 26, 2022, 11 pages.

U.S. Appl. No. 16/939,531, Notice of Allowance mailed on Jan. 18, 2023, 10 pages.

U.S. Appl. No. 16/998,915, Non-Final Office Action mailed on Jan. 31, 2023, 27 pages.

U.S. Appl. No. 17/003,593, Non-Final Office Action mailed on Feb. 2, 2023, 18 pages.

U.S. Appl. No. 17/017,225, Non-Final Office Action mailed on Feb. 2, 2023, 31 pages.

U.S. Appl. No. 17/071,608, Non-Final Office Action mailed on Feb. 2, 2023, 25 pages.

Bhatia et al., Better Document-level Sentiment Analysis from RST Discourse Parsing, Proceedings of the 2015 Conference on Empirical Methods in Natural Language Processing, Sep. 2015, pp. 2212-2218.

Carlson et al., Building a Discourse-Tagged Corpus in the Framework of Rhetorical Structure Theory, Current and New Directions in Discourse and Dialogue, 2003, pp. 85-112.

Friederici et al., Verb Argument Structure Processing: The Role of Verb-Specific and Argument-Specific Information, Journal of Memory and Language, vol. 43, No. 3, Oct. 2000, pp. 476-507.

Pechsiri et al., Mining Causality from Texts for Question Answering System, IEICE Transactions, On Information and Systems, vol. 90, No. 10, Oct. 2007, pp. 1523-1533.

U.S. Appl. No. 17/017,225, Notice of Allowance, mailed on May 30, 2023, 17 pages.

U.S. Appl. No. 17/071,608, Notice of Allowance, mailed on Jun. 23, 2023, 10 pages.

Japanese Application No. 2021-206038, Office Action, mailed on Jul. 25, 2023, 2 pages.

Japanese Application No. 2022-092790, Office Action, mailed on Jul. 25, 2023, 2 pages.

U.S. Appl. No. 17/137,949, Notice of Allowance, mailed on Aug. 31, 2023, 22 pages.

U.S. Appl. No. 17/749,019, Non-Final Office Action mailed on Jan. 5, 2024, 20 pages.

Gildea et al., Automatic Labeling of Semantic Roles, Sep. 30, 2002, pp. 245-288.

Japanese Patent Application No. JP2021-206038, Notice of Decision to Grant mailed on Jan. 16, 2024.

Japanese Patent Application No. JP2022-092790, Office Action mailed on Oct. 29, 2023, 2 pages.

U.S. Appl. No. 17/337,028, Notice of Allowance mailed on Feb. 6, 2024, 15 pages.

U.S. Appl. No. 16/789,849, Non-Final Office Action mailed on Jul. 1, 2022, 25 pages.

Krishna et al., Automatic Generation and Insertion of Assessment Items in Online Video Courses, Proceedings of the 20th International Conference on Intelligent User Interfaces Companion, Mar. 2015, pp. 1-4.

Kuyten et al., Fully Automated Generation of Question-Answer Pairs for Scripted Virtual Instruction, International Conference on Intelligent Virtual Agents, Sep. 12, 2012, pp. 1-14.

\* cited by examiner

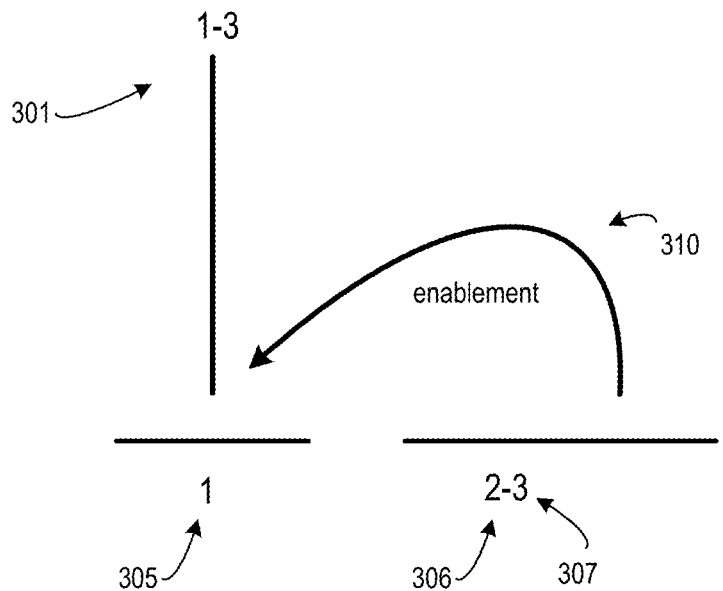
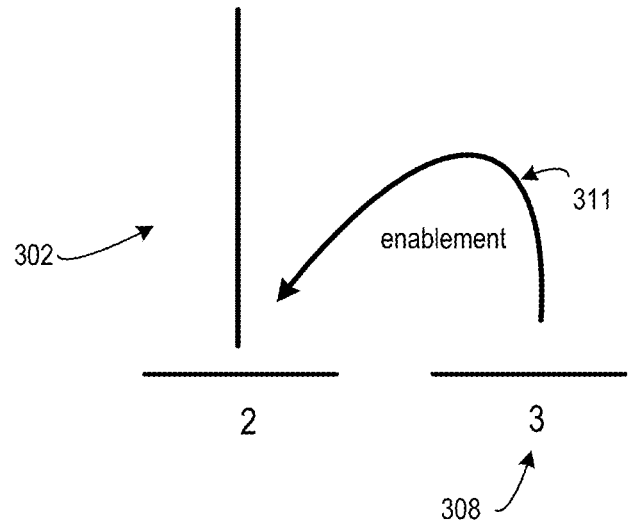
FIG. 3

*elaboration*
  elaboration
    *joint*
      TEXT: How are you doing?
      TEXT: I am going to swimming class in Prague.
    elaboration
      *elaboration*
        TEXT: Anyone want to join?
        elaboration
          TEXT: The location is near Vyšehrad.
        joint
          TEXT: Interesting!
      *joint*
        elaboration
          TEXT: Do you have coaches
          TEXT: who can help me practice swimming?
        TEXT: Yes we have.
      elaboration
        TEXT: Can I have a first lesson on butterfly stroke?

Discourse Tree 2400

*FIG. 24*

TECHNIQUES FOR MAINTAINING RHETORICAL FLOW

CROSS-REFERENCES TO RELATED APPLICATIONS

This application is a continuation-in-part of U.S. patent application Ser. No. 17/071,608, filed Oct. 15, 2020, which is a continuation of U.S. Ser. No. 15/975,685, filed May 9, 2018, which claims the benefit of U.S. Provisional Application No. 62/504,377, filed May 10, 2017, which is incorporated by reference for all purposes. This application also claims the benefit of U.S. Provisional Application No. 63/179,926, filed Apr. 26, 2021, which is incorporated by reference for all purposes.

TECHNICAL FIELD

This disclosure is generally concerned with linguistics. More specifically, this disclosure relates to generating and utilizing Dialogue Discourse Trees (DDTs) to represent dialogue and to manage rhetorical flow. The DDTs discussed herein are generated based at least in part on historical utterances and enable proper dialogue logic to be maintained in a dialogue.

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of "chatbots" and agents to answer questions, facilitate discussion, manage dialogues, and provide social promotion is increasingly popular. To address this need, a broad range of technologies including compositional semantics has been developed. Such technologies can support automated agents in the case of simple, short queries and replies.

But such solutions are unable to leverage rich discourse related information to answer questions, perform dialog management, provide recommendations, or implement "chatbot" systems, because existing solutions are unable to successfully select an utterance in dialogue that maintains a proper dialogue logic from among a set of topically suitable, but rhetorically incohesive utterances. Hence, new solutions are needed that can accurately represent rhetorical agreement between a question and an answer.

BRIEF SUMMARY

Generally, systems, devices, and methods of the present invention are related to utilizing dialogue discourse trees for dialogue management.

A computer-implemented method for utilizing dialogue discourse trees for dialogue management is disclosed herein. The computer-implemented method may comprise receiving a request from a user device, the request comprising an utterance of dialogue between two entities. The computer-implemented method may comprise generating an instance of dialogue based at least in part on merging a plurality of utterances previously provided by either of the two entities. In some embodiments, the plurality of utterances comprise the utterance of the request. The computer-implemented method may comprise identifying, from a corpus of candidate responses, a set of candidate responses for the utterance of the request. The computer-implemented method may comprise generating, for a candidate response of the set of candidate response, a dialogue discourse tree for the instance of dialogue and the candidate response. In some embodiments, the dialogue discourse tree includes nodes corresponding to elementary discourse units representing text fragments of the plurality of utterances and the candidate response, at least one non-terminal node of the nodes in the dialogue discourse tree representing a rhetorical relationship between two elementary discourse units and each terminal node of the nodes of the dialogue discourse tree being associated with an elementary discourse unit. In some embodiments, the dialogue discourse tree comprises a node representing at least one dialogue-specific rhetorical relationship between two utterances of the instance of dialogue. The computer-implemented method may comprise classifying the dialogue discourse tree for the candidate response utilizing a first machine-learning model, the first machine-learning model being previously trained using a supervised learning technique and a training data set comprising a plurality of dialogue discourse trees previously labeled as valid or invalid. The computer-implemented method may comprise providing the candidate response in response to the request based at least in part on classifying the dialogue discourse tree for the candidate response.

In some embodiments, identifying the set of candidate responses from the corpus of candidate responses further comprises: 1) determining, for the utterance of the request, a first communicative discourse tree comprising a question root node, 2) determining, for the candidate response, a second communicative discourse tree, wherein the second communicative discourse tree comprises an answer root node, 3) responsive to identifying that the question root node and the answer root node are identical, 4) merging the first and second communicative discourse trees to form a merged communicative discourse tree, 5) computing a level of complementarity between the first communicative discourse tree and the second communicative discourse tree by providing the merged communicative discourse tree to a second machine-learning model, the second machine-learning model being previous trained to determine a level of complementarity of sub-trees of two communicative discourse trees, and 6) responsive to determining that the level of complementarity is above a threshold, identifying the utterance of the request and the candidate response as complementary.

In some embodiments, classifying the dialogue discourse tree comprises classifying the dialogue discourse tree for the candidate response as being valid or invalid, wherein a valid classification indicates proper rhetorical flow is maintained between the utterances corresponding to the dialogue discourse tree, and wherein an invalid classification indicates proper rhetorical flow is broken between the utterances corresponding to the dialogue discourse tree.

In some embodiments, the computer-implemented method comprises generating the training data set for the first machine-learning model based at least in part on generating a plurality of dialogue instances from a corpus of documents. Generating a dialogue instance from a document further may comprise: 1) splitting input text of the document into a set of text fragments, 2) building a communicative discourse tree for a text fragment of the set of text fragments, 3) identifying a set of satellite elementary discourse units of the communicative discourse tree for the text fragment, 4) selecting an entity or an attribute from a satellite elementary discourse unit, 5) generating a query from the entity or the attribute selected from the satellite elementary discourse unit, 6) executing the query against a knowledge base, 7) generating a question corresponding to the satellite elementary discourse unit based at least in part on one or more search results obtained from executing the query, 8) updating the communicative discourse tree based at least in part on inserting the question as a new node, the new node being inserted based at least in part on the satellite elementary discourse unit, and 9) generating the dialogue instance using the updated communicative discourse tree, or any suitable combination of the above.

The computer-implemented method may comprise generating a second dialogue discourse tree based at least in part on the dialogue instance. The second dialogue discourse tree may second nodes corresponding to second elementary discourse units representing second text fragments of the dialogue instance, at least one non-terminal node of the nodes in the second dialogue discourse tree representing a respective rhetorical relationship between two elementary discourse units and each terminal node of the nodes of the second dialogue discourse tree being associated with an elementary discourse unit. In some embodiments, the second dialogue discourse tree comprises a node representing at least one dialogue-specific rhetorical relationship between two utterances of the second dialogue discourse tree. The computer-implemented method may comprise associating the second dialogue discourse tree with a label indicating the second dialogue discourse tree is valid and storing the second dialogue discourse tree and the label as part of the training data set utilized to train the first machine-learning model.

In some embodiments, generating the dialogue discourse tree may comprise 1) generating a discourse tree for the candidate response, the discourse tree comprising a set of nodes, each non-terminal node of the set of nodes in the discourse tree representing a corresponding rhetorical relationship between two elementary discourse units and each terminal node of the set of nodes of the discourse tree being associated with a particular elementary discourse unit, 2) identifying, in the discourse tree, a rhetorical relation of type elaboration or joint, wherein the rhetorical relation relates a first elementary discourse unit and a second elementary discourse unit, and wherein the first elementary discourse unit and the second elementary discourse unit form a reference sentence, 3) identifying an abstract meaning representation of a template based at least in part on identifying one or more common entities between the discourse tree and the abstract meaning representation of the template, 4) identifying a semantic relation corresponding to the rhetorical relation, wherein the semantic relation corresponds to a word of the template, and 5) replacing, in the discourse tree, the rhetorical relation with an updated rhetorical relation that corresponds to the semantic relation, or any suitable combination of the above.

In some embodiments, providing the candidate response as part of the dialogue and in response to the request is further based at least in part on determining that the candidate response is topically relevant to utterance of the request.

The exemplary method(s) discussed herein can be implemented on systems and/or devices including one or more processors and/or stored as instructions on a non-transitory computer-readable medium. Various aspects of the present disclosure may be implemented by using a computer program product, comprising computer program/instructions which, when executed by a processor, cause the processor to perform any of the methods disclosed herein.

BRIEF DESCRIPTION OF THE DRAWINGS

FIG. 3 depicts a further example of a discourse tree in accordance with an aspect.

FIG. 24 illustrates an exemplary discourse tree generated from text (e.g., text 128 of FIG. 1, an instance of dialogue, dialogue formed by merging multiple utterances between a chatbot and a user), in accordance with at least one embodiment.

DETAILED DESCRIPTION

Figure 1:
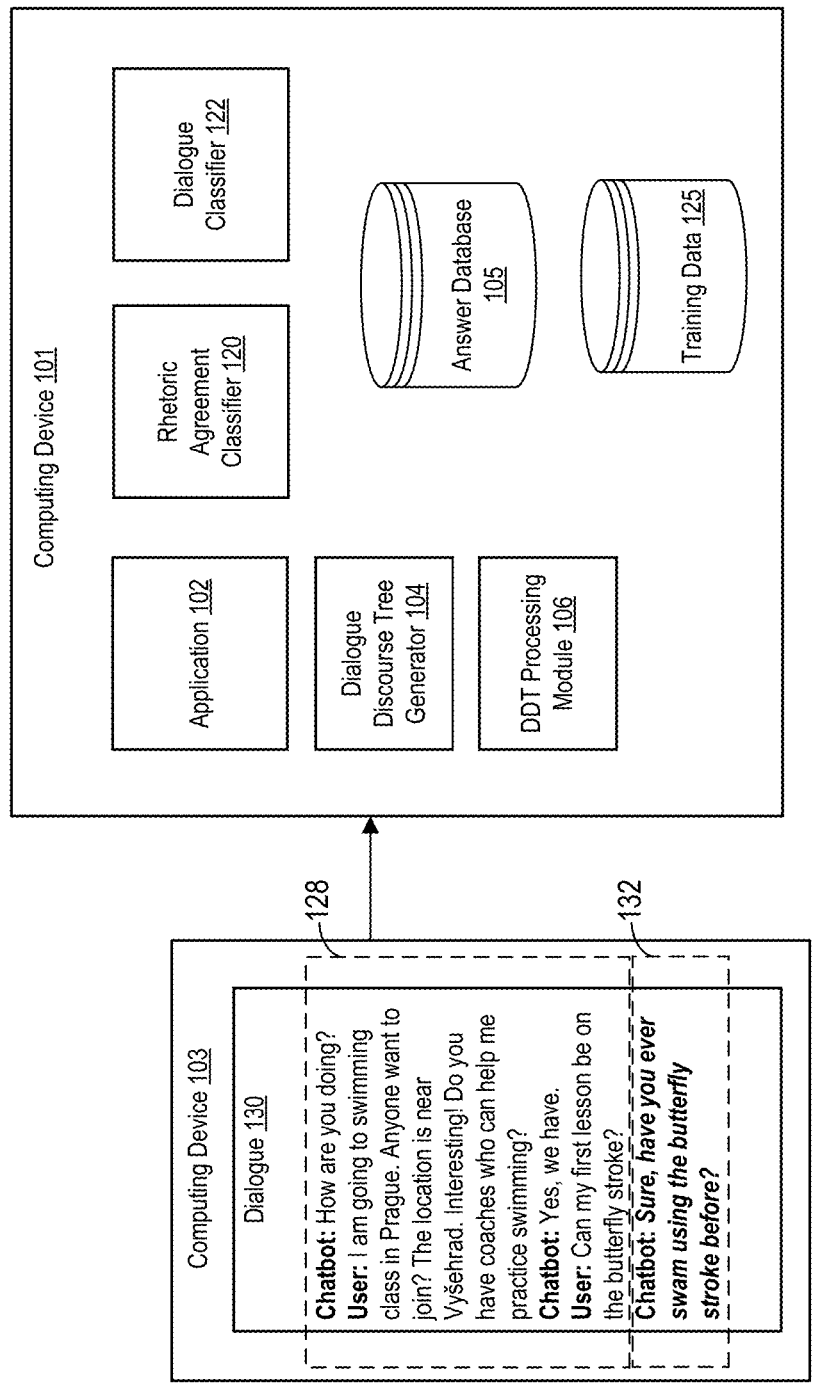
FIG. 1 shows an exemplary dialogue classification environment, in accordance with an aspect.

Aspects disclosed herein provide technical improvements to the area of computer-implemented linguistics. More specifically, this disclosure is directed to generating and utilizing Dialogue Discourse Trees (DDTs) to represent dialogue and to manage rhetorical flow. The DDTs discussed herein are generated based at least in part on historical utterances and enable proper dialogue logic to be maintained in a dialogue.

Chatbots have received a considerable amount of attention from academic researchers and have achieved remarkable success in a myriad of industry scenarios, such as in chit-chat machines, information seeking and searching, and intelligent assistants. Social dialogue systems are becoming robust and reliable and are being widely used to converse with humans. In recent years, this progress is driven mostly by advances in neural generation which can tackle a broad variety of user utterances and provide meaningful chatbot responses. Users expect their interactions with these dialogue agents to be similar to real social relationships.

Modern approaches to dialogue systems can be categorized into two groups: 1) domain-specific and 2) open-domain. Domain-specific models generally pursue to solve and complete one specific target (e.g., restaurant reservation, transportation or social promotion, etc.), which rely on domain knowledge and engineering. Conversely, open-domain dialogues involve unlimited topics within a conversation. Therefore, building an open-domain dialogue system is more challenging with the lack of sufficient knowledge engineering. Leveraging a vast amount of available dialogue datasets, constructing open-domain dialogue systems has attracted a growing interest in the NLP community. Among dialogue systems in the open-domain setting, generation-based and retrieval-based methods are the industry mainstreams. At the same time, generation-based methods learn to create a feasible response for a user-issued query while retrieval-based methods extract a proper response from a set of available candidate utterances.

In contrast to the "common response" created by generation models, retrieval-based methods can extract fluent and informative responses from human conversations. Early retrieval-based methods mainly address the issue of single-turn response selection, where the dialogue context only contains one utterance.

Generation-based methods generate responses with natural language generation models learned from conversation data, while retrieval-based methods re-use the existing responses by selecting proper ones from an index of the conversation data. While retrieval-based chatbots have the advantage of returning informative and fluent responses, they focus response selection for a single-turn conversation in which conversation history is ignored. The present disclosure relates to multi-turn response selection which takes a message and utterances of previous turns as an input and selects a response that is natural and relevant to the entire context of the conversation.

The problem of finding the best utterance is at least two dimensional. When both dimensions are tackled simultaneously under the previous data-driven approaches, topical relevance is handled well, while rhetorical flow in random and uncontrolled. This is because there are quite a few levels of abstraction between the syntactic level available to the learning system and the discourse level which controls the rhetorical flow. It is difficult to accumulate sufficient data to learn the rhetorical flow from the ground syntactic level. Maintaining the proper dialogue flow is an essential task of a dialogue manager (DM). The disclosed techniques separate rhetorical flow from the topical relevance. A Discourse Dialogue Tree (DDT) may be generated to represent the discourse of a dialogue. The DDT can be used to assess rhetorical agreement between multiple utterance in a dialogue to maintain rhetorical flow. Using a DDT, utterances can be selected that are natural and relevant to the entire context of the conversation. Use of these DDTs enables a chatbot to successfully select an utterance in dialogue that maintains a proper dialogue logic (e.g., that is topically suitable and rhetorically cohesive with other utterances in the conversation).

There are other issues in end-to-end learning based dialogue management. A lack of control over neural generation methods makes it difficult to reliably use them to introduce new information in utterances asking questions or replying to user requests. When current chatbots (explicitly provided with new factual content) introduce facts in a conversation, their generated responses do not acknowledge the prior turns. This is due to the following: whereas current methods are trained with two contexts, new factual content and conversational history, the responses generated by chatbots are not simultaneously specific to both the content and conversational history. Chatbots lack a specificity relatively to conversational history most of times.

Although deep-learning (DP) models outperform baseline methods in most cases, there are several major dialogue management problems with logical consistency that cannot yet be handled adequately. An end-to-end model sufficiently represents a context and response on a semantic level, but pays little attention to logical consistency. This leads to several bad cases in most corpora. For example, in the conversation history, one of the speakers may state that he thinks the item on eBay is fake, and the expected response might be to ask why he dislikes the fake shoes. However, most neural models select a response along the lines of "It is not a fake. I just worry about the date of manufacture.". This response is inconsistent with the context in terms of logic, as it claims that the running shoes are not fake, which is contradictory to the context. The reason behind this is that most neural models only handle semantics of context-response pairs. Logic, attitude, and sentiment are not taken into account in response selection. While most popular approaches for filtering candidates are based on words at a syntactic and semantic level, the disclosed techniques perform filtering at the level of the overall logical flow, discourse level. This, in part enables responses to be selected that are consistent with the previous utterances in the conversation.

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

"Communicative discourse trees" or "CDTs" include discourse trees that are supplemented with communicative actions. A communicative action is a cooperative action undertaken by individuals based on mutual deliberation and argumentation.

As used herein, "communicative verb" is a verb that indicates communication. For example, the verb "deny" is a communicative verb.

As used herein, "communicative action" describes an action performed by one or more agents and the subjects of the agents.

FIG. 1 depicts an exemplary dialogue classification environment in accordance with an aspect. FIG. 1 depicts computing device 101, computing device 103, and dialogue 130. Computing devices 101 and 103 may be any suitable computing devices such as a mobile phone, smart phone, tablet, laptop, smart watch, and the like. Computing devices 101 and 103 may communicates via a data network including any public or private network, wired or wireless network, Wide Area Network, Local Area Network, Cellular Network, the Internet, or the like. In some embodiments, a user can provide an utterance or text at computing device 103 and receive a response from computing device 101. Computing device 101 includes one or more of application 102, dialogue discourse tree (DDT) generator 104, DDT processing module 106, answer database 105, rhetoric agreement classifier 120, dialogue classifier 122, and training data 125. In some embodiments, application 102 may be an example of a chatbot. Examples of computing devices include devices 3402, 3404, 3406, and 3408 and cloud infrastructure system 3502 and client devices 3504, 3506, 3506 depicted in FIGS. 34 and 35, respectively.

In an example, application 102 may invoke the functionality of dialogue discourse tree (DDT) generator 104 which generates a discourse tree from dialogue 130. Dialogue 130 may include any suitable number of utterances of a conversation (e.g., a chatbot conversation in which a user and the chatbot have exchanges utterances). DDT generator 104 may analyze the discourse tree and generate a semantic representation such as an abstract meaning representation (AMR) graph. AMR is a semantic representation language. AMR graphs are rooted, labeled, directed, acyclic graphs (DAGs), including whole sentences. From the AMR graph, using the techniques disclosed herein, DDT generator 104 generates a DDT, which can in turn, be used to perform dialogue discourse analysis. An example of a process for creating a DDT is discussed with respect to FIGS. 24-30. DDT processing module 106 may identify a number of candidate utterances to be added to the dialogue from the answer database 105. DDT processing module 106 may iterate though the candidate utterances, invoking the functionality of the DDT generator 104 to generate a DDT for each candidate that includes the dialogue 130 and the candidate utterance. Each DDT corresponding to the candidate utterances may be classified or otherwise scored. The application 102 may response with the candidate utterance selected based on the classifications or scores.

In another example, application 102 answers a question received via a chat session. Dialogue 130 can be stream of questions and answers. In some embodiments, DDT generator 104 creates a DDT from dialogue 130 and selects one or more candidate answers from answer database 105. Any suitable portion of dialogue 130 can be generated by any mobile device such as a mobile phone, smart phone, tablet, laptop, smart watch, and the like. A mobile device can communicate via a data network to computing device 101. In this manner, a mobile device can provide a question (e.g., from a user) to computing device 101.

Continuing the example, from the candidate answers, DDT processing module 106 determines the most suitable answer. Different methods can be used. In an aspect, DDT processing module 106 can create a DDT for each candidate answer that includes dialogue 130 and the candidate answer. DDT processing module 106 may identify a best candidate answer (e.g., answer 132) corresponding to the DDT that indicates that candidate most successfully maintain rhetorical flow with respect to the previous utterances provided within dialogue 130. Application 102 then sends text associated with the selected candidate answer (e.g., answer 132) to a mobile device.

In another example, DDT processing module 106 causes DDT generator 104 to select a candidate answer (e.g., answer 132). Using a trained rhetoric agreement classifier 120, DDT processing module 106 determines whether the pairing of the candidate answer (e.g., answer 132) to the pervious utterances of dialogue 130 is above a threshold score indicating a degree to which the candidate answer is topically relevant. If the candidate answer (e.g., answer 132) is deemed topically relevant, DDT processing module 106 may generate a DDT for the candidate answer. The DDT may include the dialogue 130 and the candidate answer (e.g., answer 132). DDT processing module 106 provides the candidate answer to a predictive model such as dialogue classifier 122. In some embodiments, the first answer (e.g., answer 132) identified which corresponds to a DDT having a score that exceeds the threshold score may be selected. If the first answer does not correspond to a DDT with an adequate score, the DDT processing module 106 may continue to analyze additional pairs that include the question and a different candidate answer until a suitable answer is found. In other embodiments, multiple candidate answers may be used. Corresponding DDTs for those candidate answers may be scored and a highest scored DDT may be selected. The application 102 may then provide the selected answer corresponding to the highest scored DDT (e.g., answer 132) to computing device 103 as part of the dialogue 130.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, twenty possible relations are provided below. Other numbers of relations are possible.

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |

-continued

| Relation Name | Nucleus | Satellite |
| --- | --- | --- |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
| --- | --- | --- |
| Contrast | One alternate (unconstrained) | The other alternate (unconstrained) |
| Joint | | |
| List | An item | A next item |
| Sequence | An item | A next item |

Figure 2:
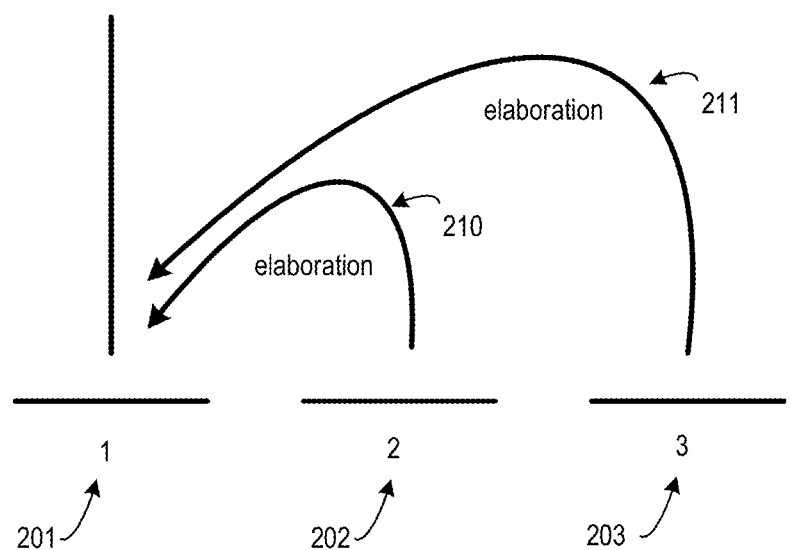
FIG. 2 depicts an example of a discourse tree in accordance with an aspect.

FIG. 2 depicts an example of a discourse tree, in accordance with an aspect. FIG. 2 includes discourse tree 200. Discourse tree includes text span 201, text span 202, text span 203, relation 210 and relation 228. The numbers in FIG. 2 correspond to the three text spans. FIG. 3 corresponds to the following example text with three text spans numbered 1, 2, 3:

1. Honolulu, Hawaii will be site of the 2017 Conference on Hawaiian History

2. It is expected that 200 historians from the U.S. and Asia will attend

3. The conference will be concerned with how the Polynesians sailed to Hawaii

For example, relation 210, or elaboration, describes the relationship between text span 201 and text span 202. Relation 228 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 361 and 362, text spans 365-307, relation 310 and relation 328. Relation 310 depicts the relationship 310, enablement, between components 366 and 365, and 367, and 365. FIG. 3 refers to the following text spans:

1. The new Tech Report abstracts are now in the journal area of the library near the abridged dictionary.

2. Please sign your name by any means that you would be interested in seeing.

3. Last day for sign-ups is 31 May.

As can be seen, relation 328 depicts the relationship between entity 367 and 366, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
  (a) Unit size may vary, depending on the goals of the analysis
  (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
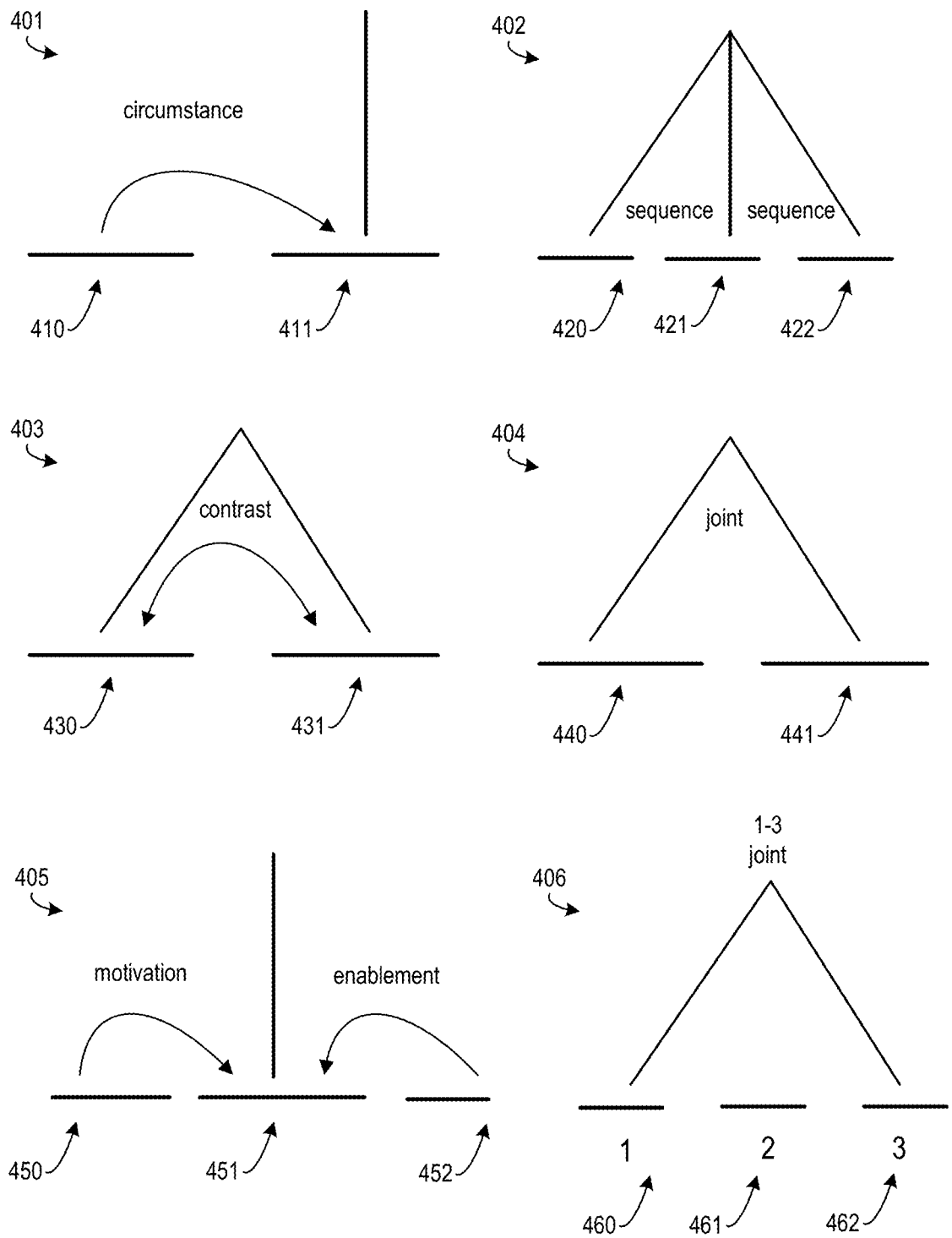
FIG. 4 depicts illustrative schemas, in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application.

RST asserts that the structure of every coherent discourse can be described by a single rhetorical structure tree, whose top schema creates a span encompassing the whole discourse.

FIG. 4 depicts illustrative schemas, in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 422. Schema 403 depicts a contrast relation between text spans 430 and 431. Schema 404 depicts a joint relationship between text spans 250 and 251. Schema 405 depicts a motivation relationship between 260 and 261, and an enablement relationship between 262 and 261. Schema 406 depicts joint relationship between text spans 270 and 272. An example of a joint scheme is shown in FIG. 4 for the three text spans below:
1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
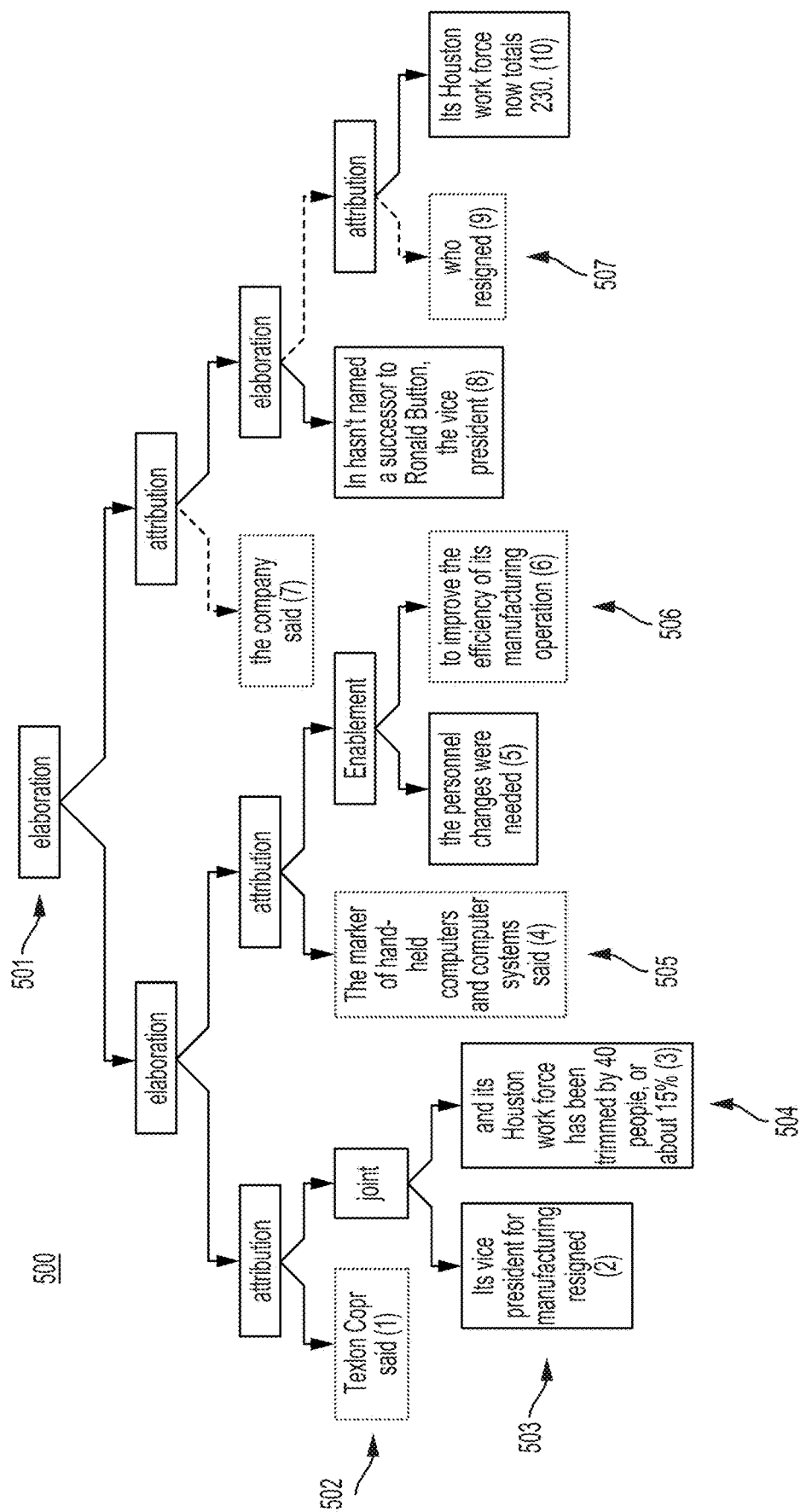
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. Discourse analysis in RST involves two sub-tasks: discourse segmentation is the task of identifying the EDUs, and discourse parsing is the task of linking the discourse units into a labeled tree. Combining intra-sentential and multi-sentential rhetorical parsing for document-level discourse analysis.

Figure 6:
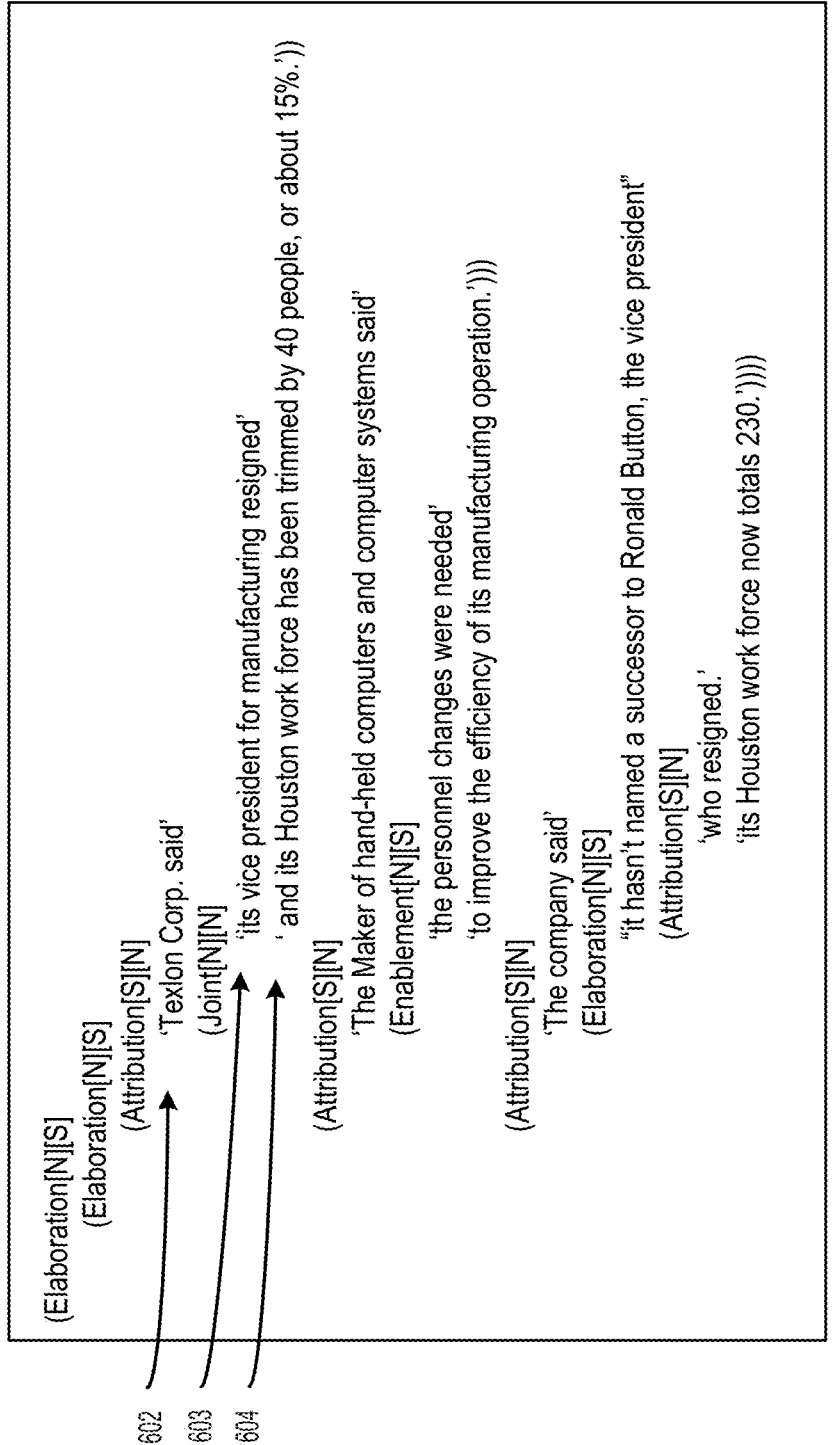
FIG. 6 depicts an exemplary indented text encoding of the representation in FIG. 5 in accordance with an aspect.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG. 6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers may be used: CoreNLPProcessor, which relies on constituent syntax, and FastNLPProcessor which uses dependency syntax.

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus, unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry where experimentation is needed to determine what combinations will give you the desired results).

In order to objectively determine how good a Discourse analysis is, a series of metrics are used. Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is $5/8$ while its recall is $5/12$. When a search engine returns 36 pages only 20 of which were relevant while failing to return 40 additional relevant pages, its precision is $20/30=2/3$ while its recall is $20/60=1/3$. Therefore, in this case, precision is 'how useful the search results are', and recall is 'how complete the results are.'" The F1 score (also F-score or F-measure) is a measure of a test's accuracy. It considers both the precision and the recall of the test to compute the score: $F1=2\times((precision \times recall)/(precision+recall))$ and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as Face- Book® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. Application 102 of FIG. 1 may be an example of a chatbot. An example ultimate goal is that human A cannot tell whether B is a human or a machine. Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work (e.g., to check a balance, transfer money and track spending). A chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publicly/privately available data sources.

Communicative Discourse Trees and the Rhetoric Classifier

Aspects of the present disclosure build communicative discourse trees and use communicative discourse trees to analyze whether the rhetorical structure of a request or question agrees with an answer. More specifically, aspects described herein create representations of discourse candidates, learns the representations, and relates the potential candidates as valid or invalid. In this manner, an autonomous agent can receive a question from a user, process the question, for example, by searching for multiple answers, determine the best answer from the answers, and provide the answer to the user. The best answer may be select not only because it is topically relevant, but because it is rhetorically consistent with the previous discourse.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined. Conventional discourse representation may be extended towards a dialogue so that the entire discourse representation may be classified into valid, cohesive dialogue with a proper rhetorical flow vs an invalid, incohesive one with illogical flow.

Analyzing Request and Response Pairs

Figure 7:
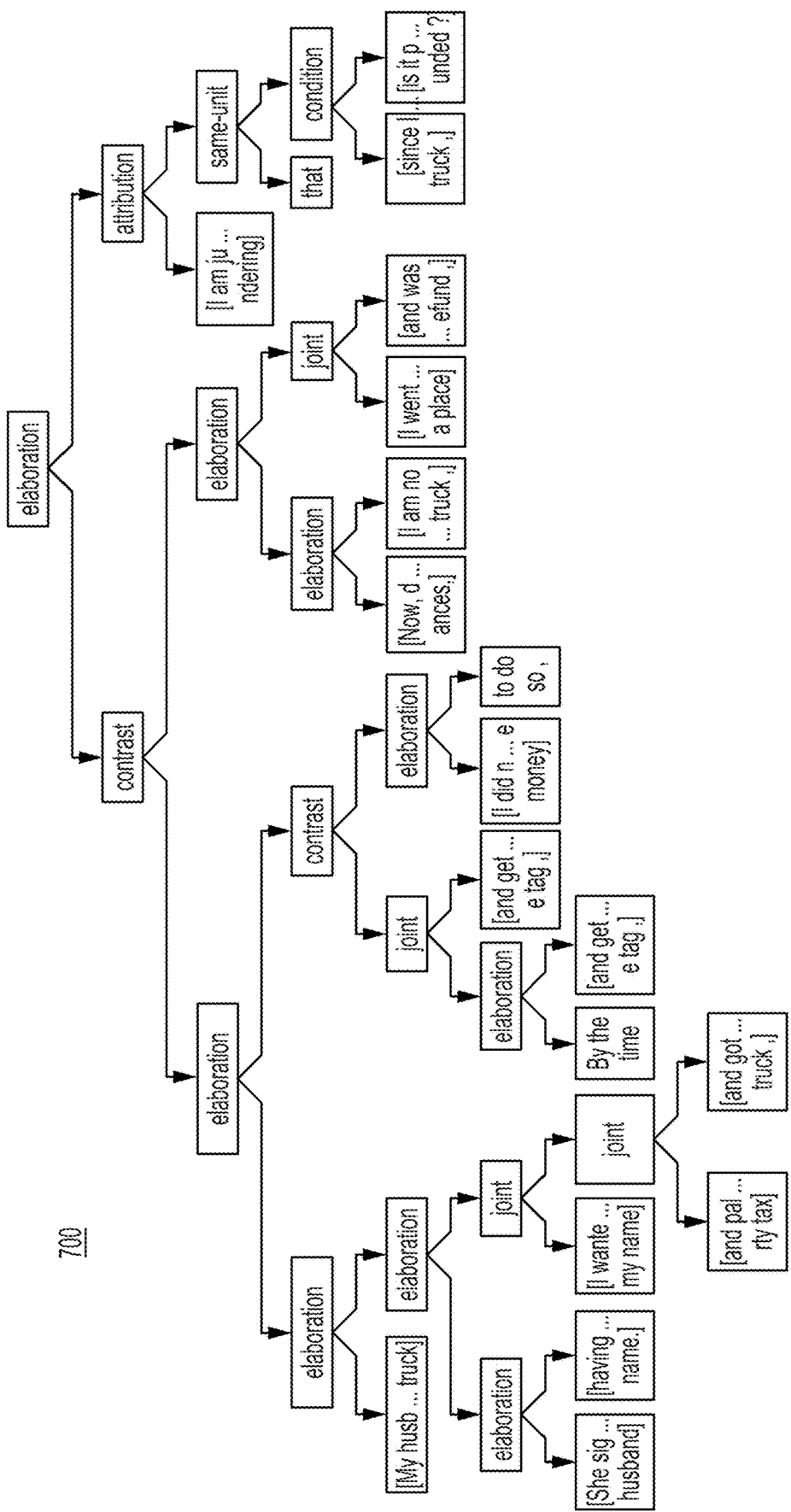
FIG. 7 depicts an exemplary DT for an example request about property tax in accordance with an aspect.

FIG. 7 depicts an exemplary DT for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by: "I didn't have the money" elaborated by "to do so" contrasted with "by the time" elaborated by "it came to sending off the title" "and getting the tag." "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place" "and was refused a refund."

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?" "I am just wondering" has attribution to "that" is the same unit as "is it possible to get the property tax refunded?" which has condition "since I am not going to have a tag on this truck"

As can be seen, the main subject of the topic is "property tax on a car". The question includes the contradiction: on one hand, all properties are taxable, and on the other hand, the ownership is somewhat incomplete. A good response has to address both the topic of the question and clarify the inconsistency. To do that, the responder is making even stronger claim concerning the necessity to pay tax on whatever is owned irrespectively of the registration status. This example is a member of positive training set from an answers evaluation domain (e.g., Yahoo! Answers). The main subject of the topic is "property tax on a car". The question includes the contradiction: on one hand, all properties are taxable, and on the other hand, the ownership is somewhat incomplete. A good answer/response must address both topic of the question and clarify the inconsistency. The reader can observe that since the question includes rhetoric relation of contrast, the answer must match it with a similar relation to be convincing. Otherwise, this answer would look incomplete even to those who are not domain experts.

Figure 8:
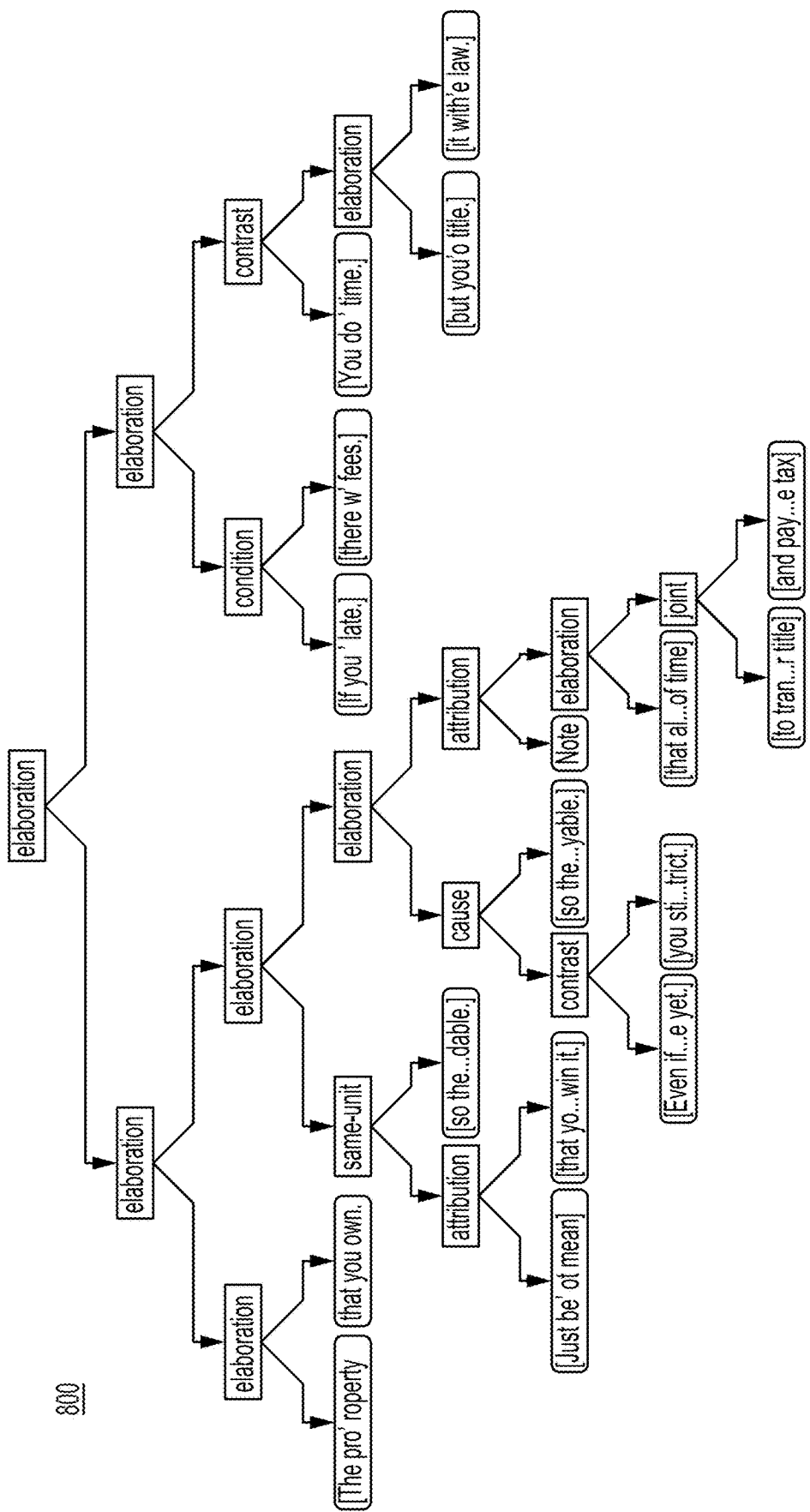
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time.".

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
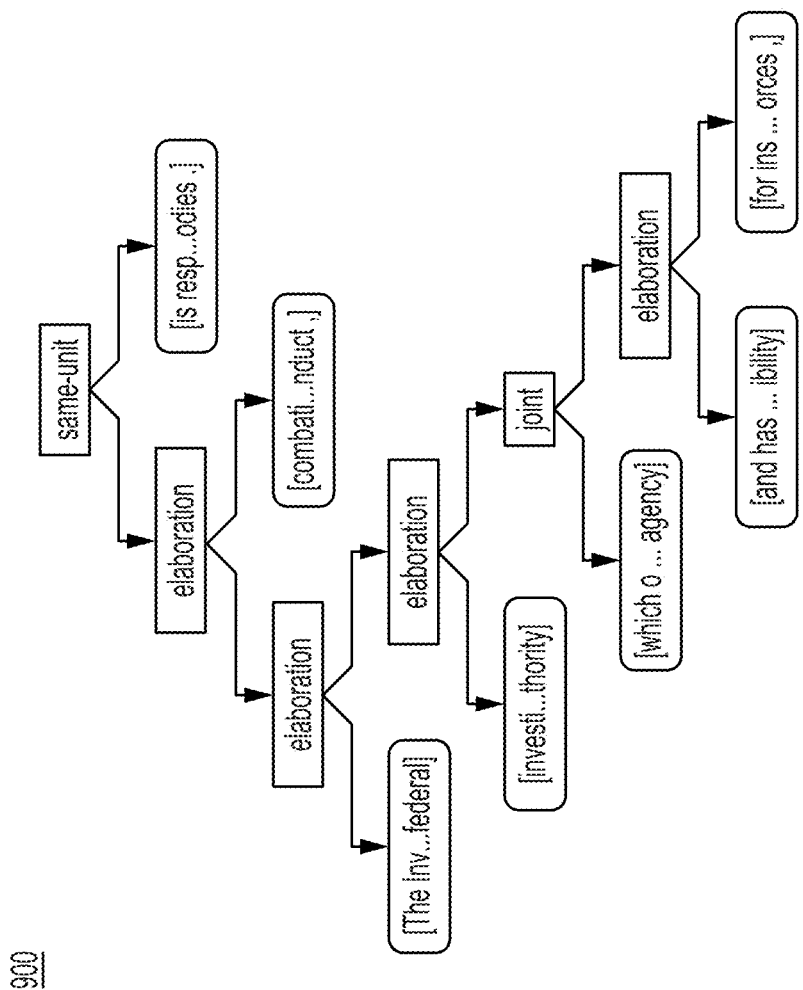
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
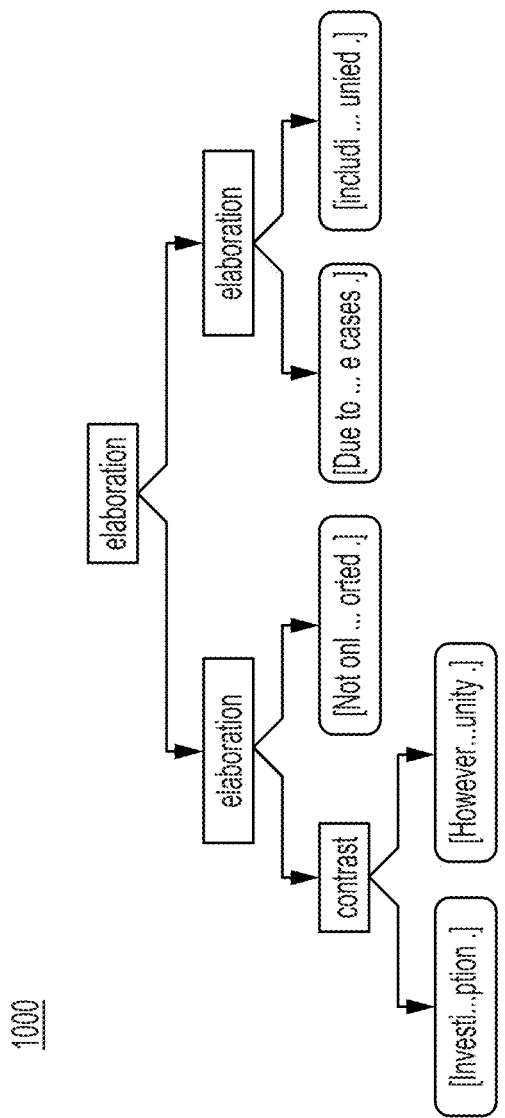
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers. (See FIG. 9 and FIG. 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Classification of Request-Response Pairs

Application 102 can determine whether a given answer or response, such as an answer obtained from answer database 105 or a public database, is responsive to a given question, or request. More specifically, application 102 analyzes whether a request and response pair is correct or incorrect by determining one or both of (i) relevance or (ii) rhetoric agreement between the request and the response. Rhetoric agreement can be analyzed without taking into account relevance, which can be treated orthogonally.

Application 102 can determine similarity between question-answer pairs using different methods. For example, application 102 can determine level of similarity between an individual question and an individual answer. Alternatively, application 102 can determine a measure of similarity between a first pair including a question and an answer, and a second pair including a question and answer.

For example, application 102 uses rhetoric agreement classifier 120 trained to predict matching or non-matching answers. Application 102 can process two pairs at a time, for example <q1, a1> and <q2, a2>. Application 102 can compare q1 with q2 and a1 with a1, producing a combined similarity score. Such a comparison allows a determination of whether an unknown question/answer pair contains a correct answer or not by assessing a distance from another question/answer pair with a known label. In particular, an unlabeled pair <q2, a2> can be processed so that rather than "guessing" correctness based on words or structures shared by q2 and a2, both q2 and a2 can be compared with their corresponding components q1 and a2 of the labeled pair <q2, a2> on the grounds of such words or structures. Because this approach targets a domain-independent classification of an answer, only the structural cohesiveness between a question and answer can be leveraged, not 'meanings' of answers.

In an aspect, application 102 uses training data 125 to train rhetoric agreement classifier 120. In this manner, rhetoric agreement classifier 120 is trained to determine a similarity between pairs of questions and answers. This is a classification problem. Training data 125 can include a positive training set and a negative training set. Training data 125 includes matching request-response pairs in a positive dataset and arbitrary or lower relevance or appropriateness request-response pairs in a negative dataset. For the positive dataset, various domains with distinct acceptance criteria are selected that indicate whether an answer or response is suitable for the question.

Each training data set includes a set of training pairs. Each training set includes a question communicative discourse tree that represents a question and an answer communicative discourse tree that represents an answer and an expected level of complementarity between the question and answer. By using an iterative process, application 102 provides a training pair to rhetoric agreement classifier 120 and receives, from the model, a level of complementarity. Application 102 calculates a loss function by determining a difference between the determined level of complementarity and an expected level of complementarity for the particular training pair. Based on the loss function, application 102 adjusts internal parameters of the classification model to minimize the loss function.

Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

Communicative Discourse Trees (CDTs)

Application 102 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. A parse thicket refers to a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
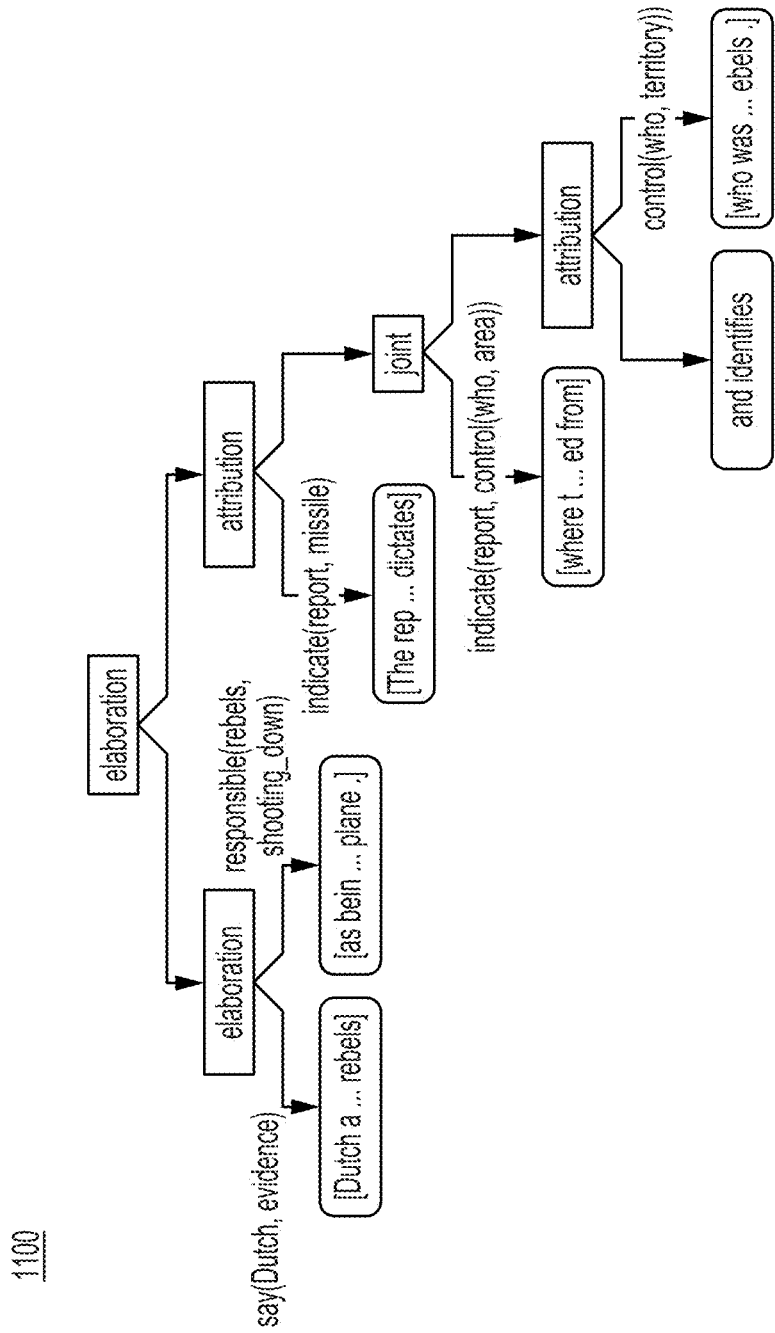
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of MH17 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible(rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet.

Figure 12:
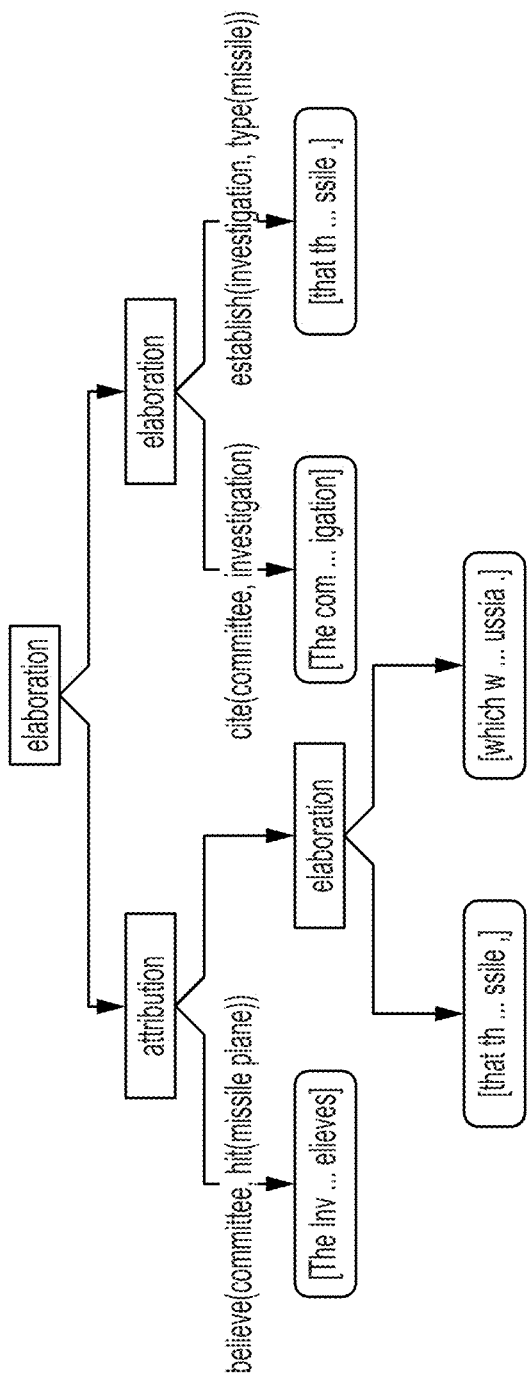
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1200, which represents the following text: "The Investigative Committee of the Russian Federation believes that the plane was hit by a missile, which was not produced in Russia. The committee cites an investigation that established the type of the missile."

Figure 13:
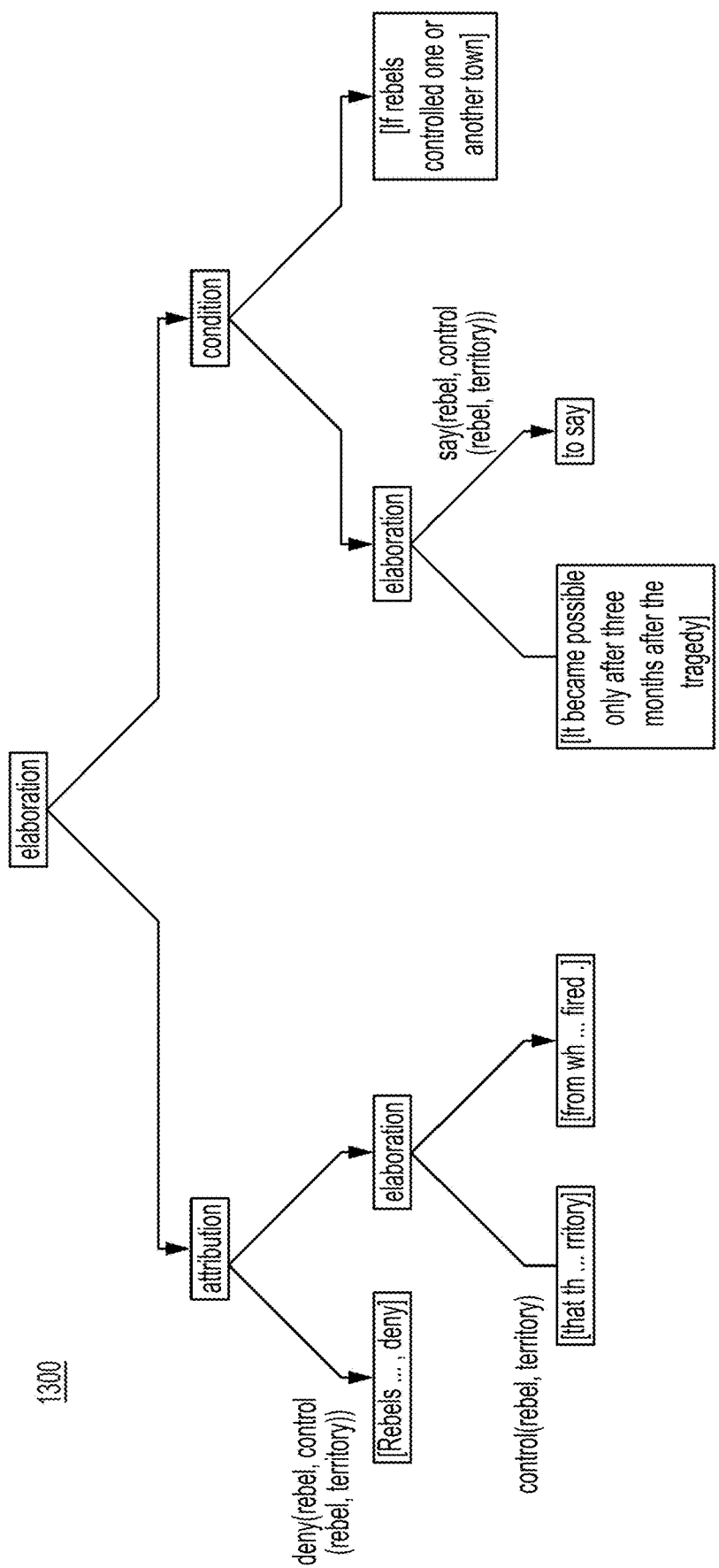
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1200 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event and project the syntactic structures that encode that information. Verbs, and in particular communicative action verbs, can be highly variable and can display a rich range of semantic behaviors. In response, verb classification helps a learning system to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional state(result(E), Emotion, Experiencer).

NP V ADV-Middle. Example: "Small children amuse quickly." Syntax: Experiencer V ADV. Clause: amuse(Experiencer, Prop):-, property(Experiencer, Prop), adv(Prop).

NP V NP-PRO-ARB. Example "The teacher amused." Syntax Stimulus V. amuse(Stimulus, E, Emotion, Experiencer): cause(Stimulus, E), emotional state(result(E), Emotion, Experiencer).

NP.cause V NP. Example "The teacher's dolls amused the children." syntax Stimulus <+genitive>('s) V Experiencer. amuse(Stimulus, E, Emotion, Experiencer): cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E), emotional_state(result(E), Emotion, Experiencer), Pred(result(E), Experiencer).

Communicative actions can be characterized into clusters, for example: Verbs with Predicative Complements (Appoint, characterize, dub, declare, conjecture, masquerade, orphan, captain, consider, classify), Verbs of Perception (See, sight, peer). Verbs of Psychological State (Amuse, admire, marvel, appeal), Verbs of Desire (Want, long). Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner(speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Representing Request-Response Pairs

Representing request-response pairs facilitates classification-based operations based on a pair. In an example, request-response pairs can be represented as parse thickets. A parse thicket is a representation of parse trees for two or more sentences with discourse-level relationships between words and parts of the sentence in one graph. Topical similarity between question and answer can expressed as common sub-graphs of parse thickets. The higher the number of common graph nodes, the higher the similarity.

Figure 14:
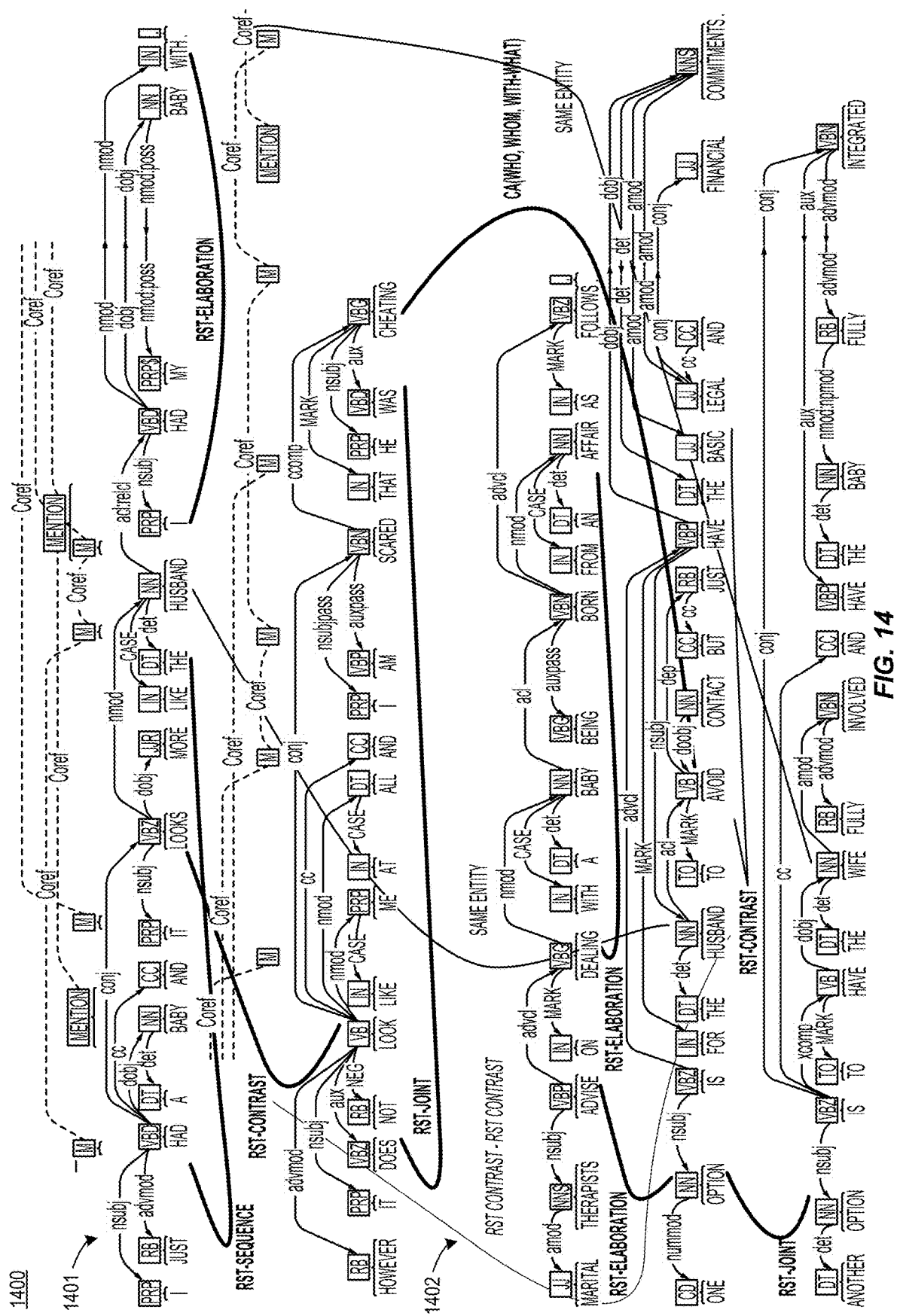
FIG. 14 illustrates parse thickets in accordance with an aspect.

FIG. 14 illustrates parse thickets in accordance with an aspect. FIG. 14 depicts parse thicket 1400 including a parse tree for a request 1401, and a parse tree for a corresponding response 1402.

Parse tree 1401 represents the question "I just had a baby and it looks more like the husband I had my baby with. However, it does not look like me at all and I am scared that he was cheating on me with another lady and I had her kid.

This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree^disagree=verb(Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree^explain=verb(Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogues can be compared against other such sequences of similar dialogs. In this manner, the meaning of an individual communicative action as well as the dynamic discourse structure of a dialogue (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket G=(V, A), where V={$action_1$, $action_2$ . . . $action_n$} is a finite set of vertices corresponding to communicative actions, and A is a finite set of labeled arcs (ordered pairs of vertices), classified as follows:

Each arc $action_i$, $action_j \in A_{sequence}$ corresponds to a temporal precedence of two actions $v_i$, $ag_i$, $s_i$, $c_i$ and $v_j$, $ag_j$, $s_j$, $c_j$ that refer to the same subject, e.g., $s_j=s_j$ or different subjects. Each arc $action_i$, $action_j \in A_{cause}$ corresponds to an attack relationship between $action_i$ and $action_j$ indicating that the cause of $action_i$ in conflict with the subject or cause of $action_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for $A_{sequence}$ arcs, at most one incoming and only one outgoing arc are admissible, and (3) for $A_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. As can be seen in the example discussed with respect to FIG. 14, one communicative action from T1, cheating(husband, wife, another lady) can be compared with a second from T2, avoid(husband, contact (husband, another lady)). A generalization results in communicative_action(husband, *) which introduces a constraint on A in the form that if a given agent (=husband) is mentioned as a subject of CA in Q, he(she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as:

$$rst1(N1, S1, W1, R1)\ rst2(N2, S2, W2, R2) =$$
$$(rst1\^{}rst2)(N1\^{}N2, S1\^{}S2, W1\^{}W2, R1\^{}R2).$$

The texts in N1, S1, W1, R1 are subject to generalization as phrases. For example, rst1^rst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1)^sentence(N2, S2, W2, R2).

For example, the meaning of rst–background^rst–enablement=(S increases the ability of R to comprehend an element in N)^(R comprehending S increases the ability of R to perform the action in N)=increase -VB the -DT ability -NN of -IN R-NN to -IN.

Because the relations rst–background^rst–enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not be similar to the verb phrase of the question, but the rhetoric structure of the question and answer are similar. Not all phrases in the answer must match phrases in question. For example, the phrases that do not match have certain rhetoric relations with the phrases in the answer which are relevant to phrases in question.

Building a Communicative Discourse Tree

Figure 15:
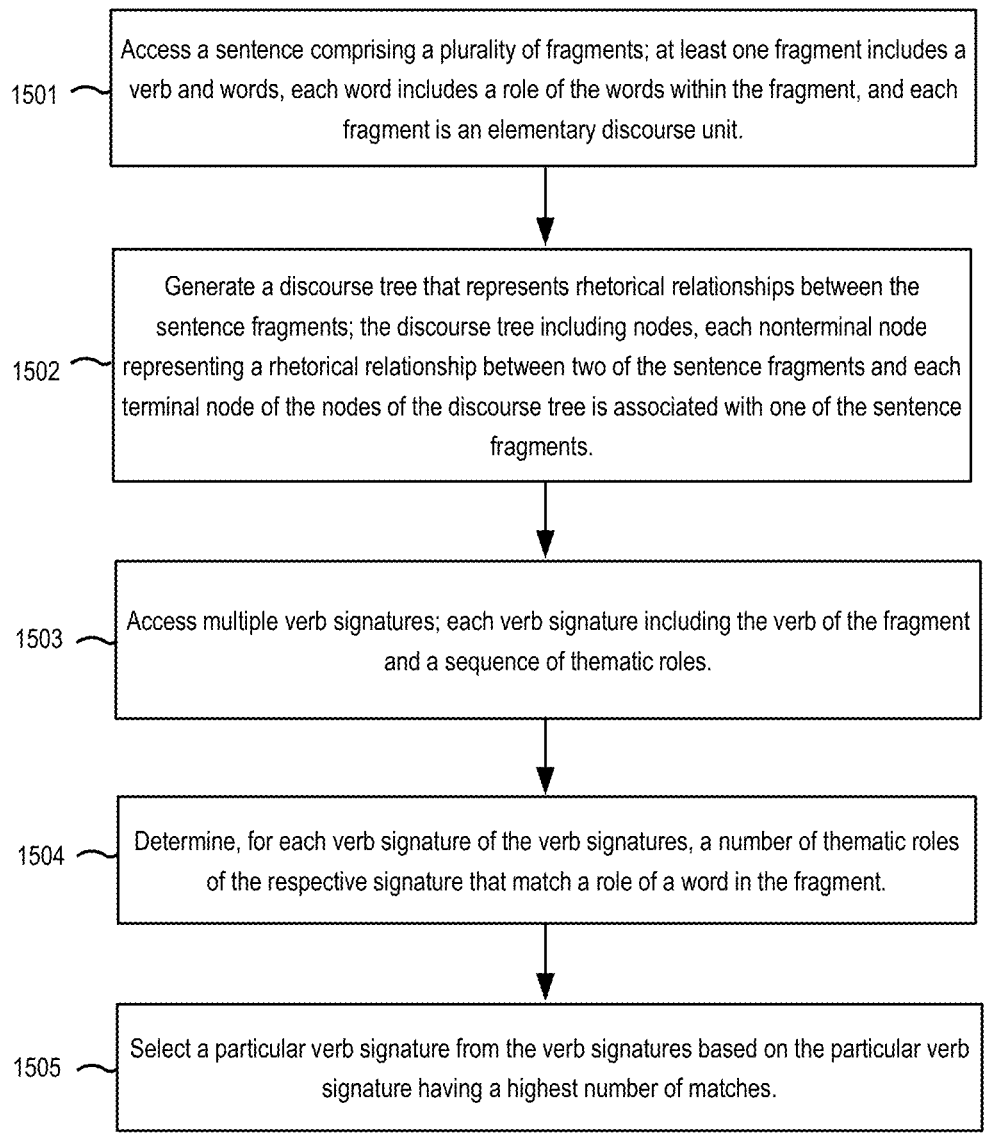
FIG. 15 illustrates an exemplary process for building a communicative discourse tree in accordance with an aspect.

FIG. 15 illustrates an exemplary process for building a communicative discourse tree in accordance with an aspect. Application 102 can implement process 1500 (e.g., utilizing dialogue discourse tree generator 104). As discussed, communicative discourse trees enable improved search engine results.

At block 1501, process 1500 involves accessing a sentence comprising fragments. At least one fragment includes a verb and words and each word includes a role of the words within the fragment, and each fragment is an elementary discourse unit. For example, application 102 accesses a sentence such as "Rebels, the self-proclaimed Donetsk People's Republic, deny that they controlled the territory from which the missile was allegedly fired" as described with respect to FIG. 13.

Continuing the example, application 102 determines that the sentence includes several fragments. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

At block 1502, process 1500 involves generating (e.g., by application 102) a discourse tree that represents rhetorical relationships between the sentence fragments. The discourse tree including nodes, each nonterminal node representing a rhetorical relationship between two of the sentence fragments and each terminal node of the nodes of the discourse tree is associated with one of the sentence fragments.

Continuing the example, application 102 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

At block 1503, process 1500 involves accessing (e.g., by application 102) multiple verb signatures. For example, application 102 accesses a list of verbs (e.g., from VerbNet). Each verb matches or is related to the verb of the fragment. For example, the for the first fragment, the verb is "deny." Accordingly, application 102 accesses a list of verb signatures that relate to the verb deny.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example, "the teacher amused the children" has a different signature from "small children amuse quickly." For the first fragment, the verb "deny," application 102 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. Application 102 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

At block 1504, process 1500 involves determining, for each verb signature of the verb signatures, a number of thematic roles of the respective signature that match a role of a word in the fragment. For the first fragment, application 102 determines that the verb "deny" has only three roles, "agent", "verb" and "theme."

At block 1505, process 1500 involves selecting (e.g., by application 102) a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny(rebel, control(rebel, territory))."

Representing a Request-Response

Request-response pairs can be analyzed alone or as pairs. In an example, request-response pairs can be chained together. In a chain, rhetoric agreement is expected to hold not only between consecutive members but also triples and four-tuples. A discourse tree can be constructed for a text expressing a sequence of request-response pairs. For example, in the domain of customer complaints, request and response are present in the same text, from the viewpoint of a complainant. Customer complaint text may be split into request and response text portions and then form the positive and negative dataset of pairs. In an example, all text for the proponent and all text for the opponent is combined. The first sentence of each paragraph below will form the Request part (which will include three sentences) and second sentence of each paragraph will form the Response part (which will also include three sentences in this example).

Figure 16:
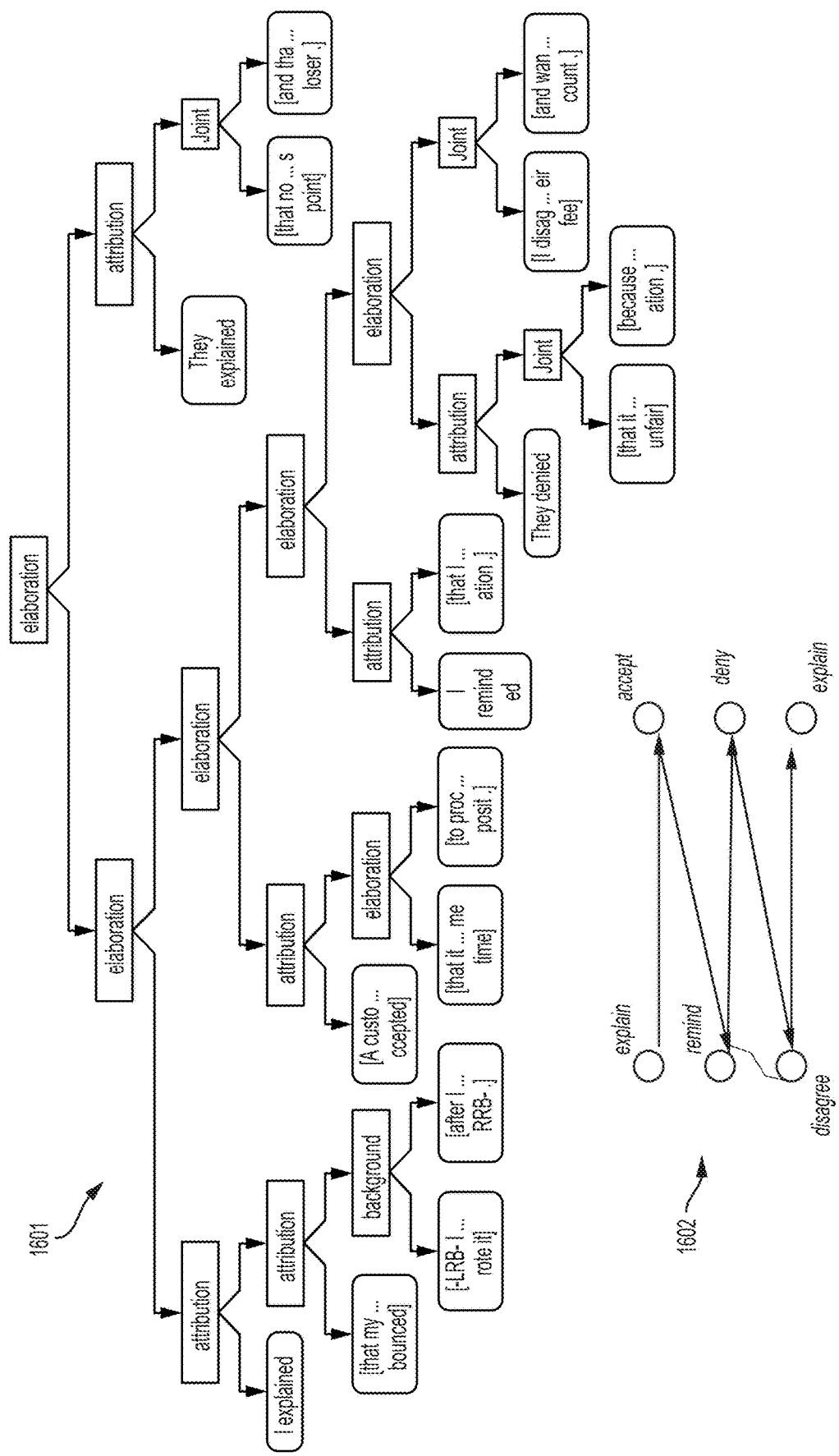
FIG. 16 illustrates a discourse tree and scenario graph in accordance with an aspect.

FIG. 16 illustrates a discourse tree and scenario graph in accordance with an aspect. FIG. 16 depicts discourse tree 1601 and scenario graph 1602. Discourse tree 1601 corresponds to the following three sentences:

(1) I explained that my check bounced (I wrote it after I made a deposit). A customer service representative accepted that it usually takes some time to process the deposit.

(2) I reminded that I was unfairly charged an overdraft fee a month ago in a similar situation. They denied that it was unfair because the overdraft fee was disclosed in my account information.

(3) I disagreed with their fee and wanted this fee deposited back to my account. They explained that nothing can be done at this point and that I need to look into the account rules closer.

As can be seen by the discourse tree in FIG. 16, determining whether the text represents an interaction, or a description, can be hard to judge. Hence, by analyzing the arcs of communicative actions of a parse thicket, implicit similarities between texts can be found. For example, in general terms:

(1) one communicative action with its subject from a first tree against another communicative action with its subject from a second tree (communicative action arc is not used).

(2) a pair of communicative actions with their subjects from a first tree against another pair of communicative actions from a second tree (communicative action arcs are used).

For example, in the previous example, the generalization of cheating(husband, wife, another lady)^avoid(husband, contact(husband, another lady)) provides us communicative_action(husband, *) which introduces a constraint on A in the form that if a given agent (=husband) is mentioned as a subject of CA in Q, he(she) should also be a subject of (possibly, another) CA in A.

To handle meaning of words expressing the subjects of CAs, a word can be applied to a vector model such as the "word2vector" model. More specifically, to compute generalization between the subjects of communicative actions, the following rule can be used: if subject1=subject2, subject1^subject2=<subject1, POS(subject1), 1>. Here, the subject remains and the score is 1. Otherwise, if the subjects have the same part-of-speech (POS), then subject1^subject2=<*, POS(subject1), word2vecDistance (subject1^subject2)>. '*' denotes that lemma is a placeholder, and the score is a word2vec distance between these words. If POS is different, generalization is an empty tuple and may not be further generalized.

Classification settings for Request-Response Pairs

In a conventional search, as a baseline, the match between request response pairs can be measured in terms of keyword statistics such as short for term frequency-inverse document frequency (TF*IDF). To improve search relevance, this score is augmented by item popularity, item location or taxonomy-based score. Search can also be formulated as a passage re-ranking problem in machine learning framework. The feature space includes request-response pairs as elements, and a separation hyper-plane splits this feature space into correct and incorrect pairs. Hence a search problem can be formulated in a local way, as similarity between request and response, or in a global, learning way, via similarity between request-response pairs.

Other methods are possible for determining a match between request and response. In a first example, application 102 extracts features for request and response and compares the features as a count, introducing a scoring function such that a score would indicate a class (low score for incorrect pairs, high score for correct ones).

In a second example, application 102 compares representations for request and response against each other and assigns a score for the comparison result. Analogously, the score will indicate a class.

In a third example, application 102 builds a representation for a pair request and response, <Req, Resp> as elements of training set. Application 102 then performs learning in the feature space of all such elements <Req, Resp>.

Figure 17:
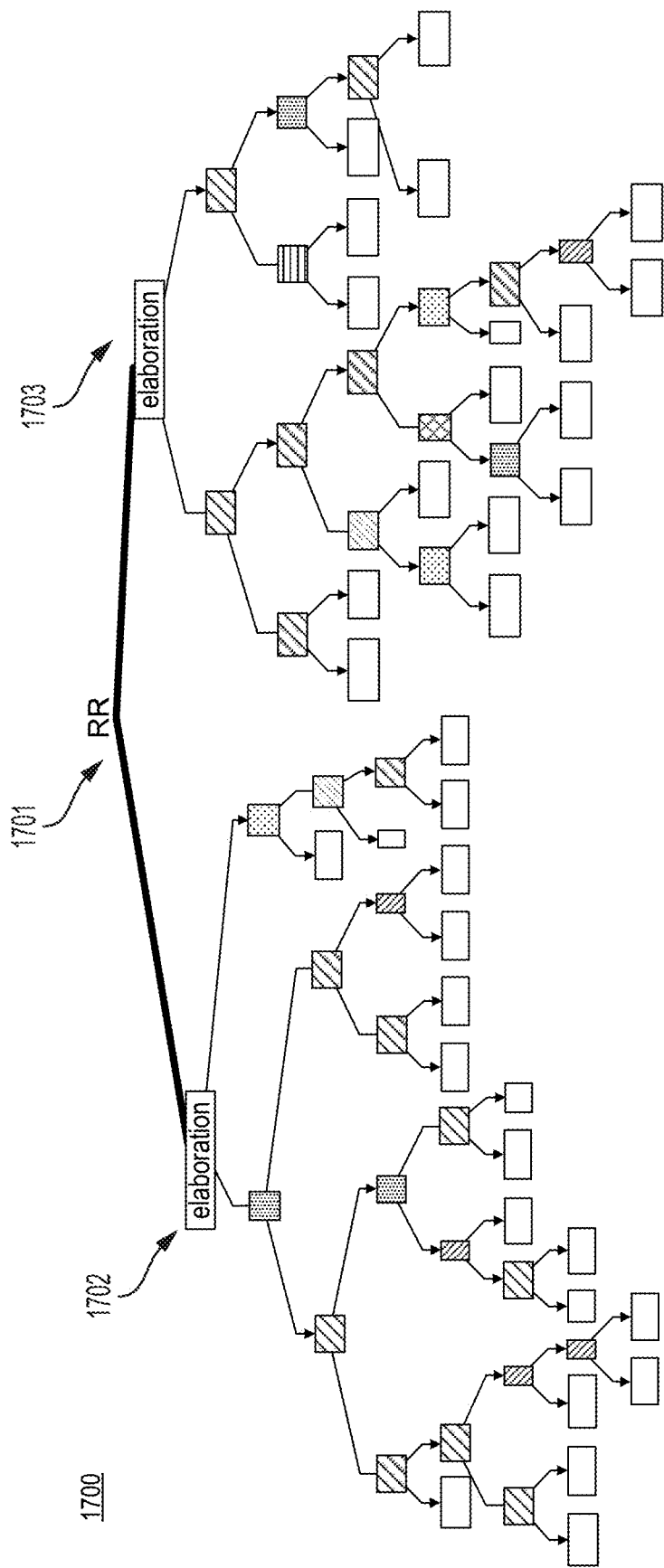
FIG. 17 illustrates forming a request-response pair in accordance with an aspect.

FIG. 17 illustrates forming a request-response pair in accordance with an aspect. FIG. 17 depicts request-response pair 1701, request tree (or object) 1702, and response tree 1703. To form a <Req, Resp> object, the application 102 combines the discourse tree for the request and the discourse tree for the response into a single tree with the root RR. The application 102 then classifies the objects into correct (with high agreement) and incorrect (with low agreement) categories.

Nearest Neighbor Graph-Based Classification

Once a CDT is built, in order to identify an argument in text, application 102 computes the similarity compared to CDTs for the positive class and verifies that it is lower to the set of CDTs for its negative class. Similarity between CDT is defined by means of maximal common sub-CDTs.

In an example, an ordered set G of CDTs(V,E) with vertex- and edge-labels from the sets $(A_\mathcal{V}, \leq)$ and $(A_E, \leq)$ is constructed. A labeled CDT $\Gamma$ from G is a pair of pairs of the form ((V,l),(E,b)), where V is a set of vertices, E is a set of edges, l: $V \to A_\mathcal{V}$ is a function assigning labels to vertices, and b: $E \to A_E$ is a function assigning labels to edges. Isomorphic trees with identical labeling are not distinguished.

The order is defined as follows: For two CDTs $\Gamma_1:=((V_1, l_1),(E_1,b_1))$ and $\Gamma_2:=((V_2,l_2),(E_2,b_2))$ from G, then that $\Gamma_1$ dominates $\Gamma_2$ or $\Gamma_2 \leq \Gamma_1$ (or $\Gamma_2$ is a sub-CDT of $\Gamma_1$) if there exists a one-to-one mapping $\varphi: V_2 \to V_1$ such that it (1) respects edges: $(v,w) \in E_2 \Rightarrow (\varphi(v), \varphi(w)) \in E_1$, and (2) fits under labels: $l_2(v) \leq l_1(\varphi(v))$, $(v,w) \in E_2 \Rightarrow b_2(v,w) \leq b_1(\varphi(v), \varphi(w))$.

This definition takes into account the calculation of similarity ("weakening") of labels of matched vertices when passing from the "larger" CDT $G_1$ to "smaller" CDT $G_2$.

Now, similarity CDT Z of a pair of CDTs X and Y, denoted by X^Y=Z, is the set of all inclusion-maximal common sub-CDTs of X and Y, each of them satisfying the following additional conditions (1) to be matched, two vertices from CDTs X and Y must denote the same RST relation; and (2) each common sub-CDT from Z contains at least one communicative action with the same VerbNet signature as in X and Y.

This definition is easily extended to finding generalizations of several graphs. The subsumption order μ on pairs of graph sets X and Y is naturally defined as XμY:=X*Y=X.

Figure 18:
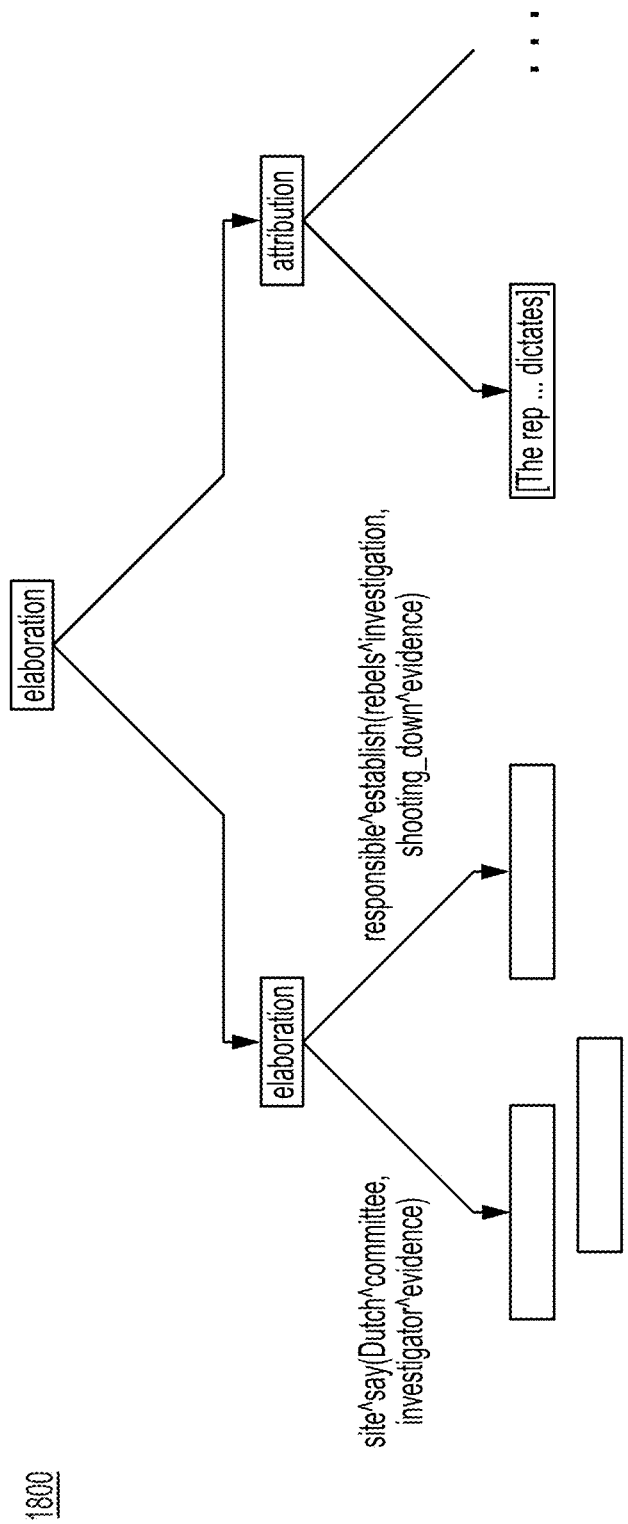
FIG. 18 illustrates a maximal common sub-communicative discourse tree in accordance with an aspect.

FIG. 18 illustrates a maximal common sub-communicative discourse tree in accordance with an aspect. Notice that the tree is inverted and the labels of arcs are generalized: Communicative action site( ) is generalized with communicative action say( ). The first (agent) argument of the former CA committee is generalized with the first argument of the latter CA Dutch. The same operation is applied to the second arguments for this pair of CAs: investigator^evidence.

CDT U belongs to a positive class such that (1) U is similar to (has a nonempty common sub-CDT) with a positive example R⁺ and (2) for any negative example R⁻, if U is similar to R⁻ (i.e., U*R⁻≠∅) then U*R⁺μ*R⁺.

This condition introduces the measure of similarity and says that to be assigned to a class, the similarity between the unknown CDT U and the closest CDT from the positive class should be higher than the similarity between U and each negative example. Condition 2 implies that there is a positive example R⁺ such that for no R⁻ one has U*R⁺μR⁻, i.e., there is no counterexample to this generalization of positive examples.

Thicket Kernel Learning for CDT

Tree Kernel learning for strings, parse trees and parse thickets is a well-established research area these days. The parse tree kernel counts the number of common sub-trees as the discourse similarity measure between two instances. A thicket kernel is defined for a CDT by augmenting a DT kernel by the information on communicative actions.

A CDT can be represented by a vector V of integer counts of each sub-tree type (without taking into account its ancestors): V (T)=(# of subtrees of type 1, . . . , # of subtrees of type I, . . . , # of subtrees of type n). This results in a very high dimensionality since the number of different sub-trees is exponential in its size. Thus, it is computational infeasible to directly use the feature vector Ø(T). To solve the computational issue, a tree kernel function is introduced to calculate the dot product between the above high dimensional vectors efficiently. Given two tree segments CDT1 and CDT2, the tree kernel function is defined:

$$K = (CDT1, CDT2) = \langle V(CDT1), V(CDT2) \rangle = \Sigma iV(CDT1)[i],$$

$$V(CDT2)[i] = \Sigma n1 \Sigma n2 \Sigma iIi(n1) * Ii(n2)$$

where n1∈N1, n2∈N2 where N1 and N2 are the sets of all nodes in CDT1 and CDT2, respectively; Ii (n) is the indicator function. Ii (n)={1 iff a subtree of type i occurs with root at node; 0 otherwise}. K (CDT1, CDT2) is an instance of convolution kernels over tree structures (Collins and Duffy, 2002) and can be computed by recursive definitions:

$$\Delta(n1, n2) = \Sigma Ii(n1) * Ii(n2)$$

Δ (n1, n2)=0 if n1 and n2 are assigned the same POS tag or their children are different subtrees.

Otherwise, if both n1 and n2 are POS tags (are pre-terminal nodes) then Δ (n1, n2)=1×λ;

Otherwise, $\Delta(n1, n2) = \lambda \Pi_{j=1}^{nc(n1)}(1+\Delta(ch(n1, j), ch(n2, j)))$ where ch(n,j) is the jth child of node n, nc($n_1$) is the number of the children of $n_1$, and λ (0<λ<1) is the decay factor in order to make the kernel value less variable with respect to the sub-tree sizes. In addition, the third recursive rule holds because given two nodes with the same children, one can construct common sub-trees using these children and common sub-trees of further offspring. The parse tree kernel counts the number of common sub-trees as the syntactic similarity measure between two instances.

Figure 19:
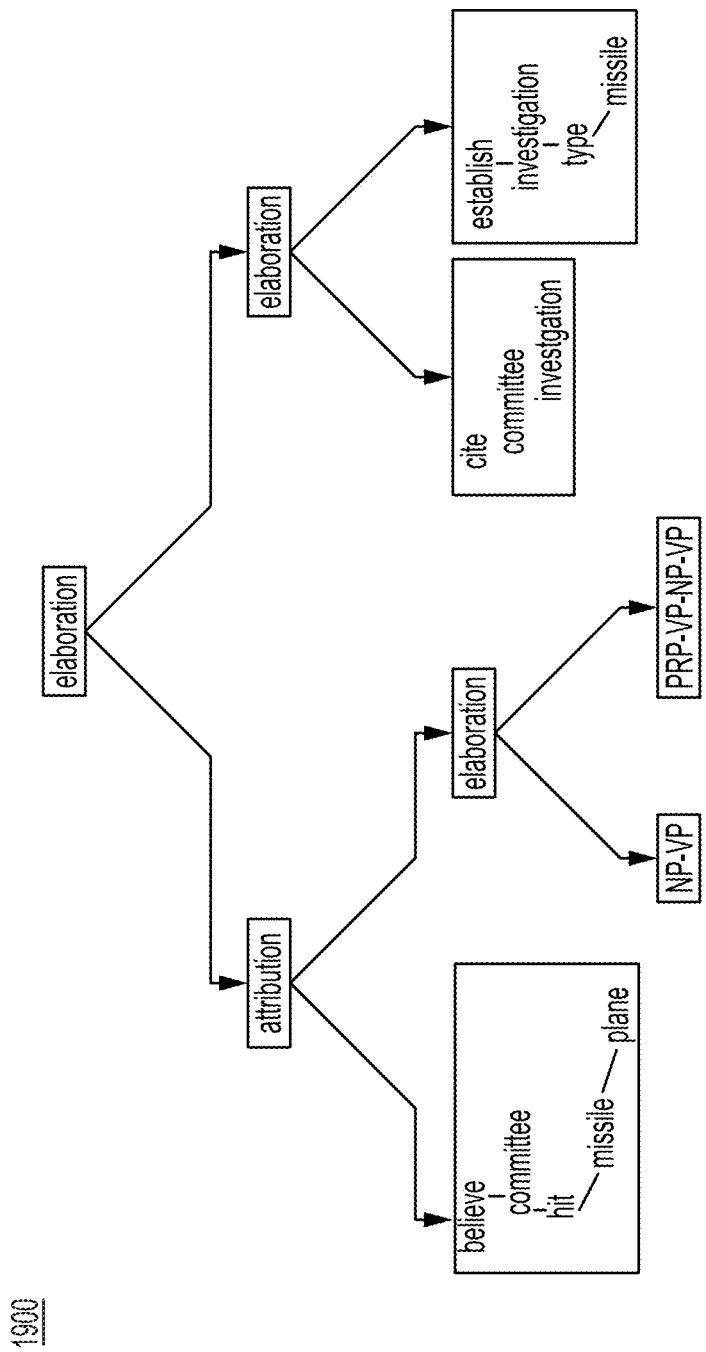
FIG. 19 illustrates a tree in a kernel learning format for a communicative discourse tree in accordance with an aspect.

FIG. 19 illustrates a tree in a kernel learning format for a communicative discourse tree in accordance with an aspect.

The terms for Communicative Actions as labels are converted into trees which are added to respective nodes for RST relations. For texts for EDUs as labels for terminal nodes only the phrase structure is retained. The terminal nodes are labeled with the sequence of phrase types instead of parse tree fragments.

If there is a rhetoric relation arc from a node X to a terminal EDU node Y with label A(B, C(D)), then the subtree A–B→(C–D) is appended to X.

Implementation of the Rhetoric Agreement Classifier

Figure 20:
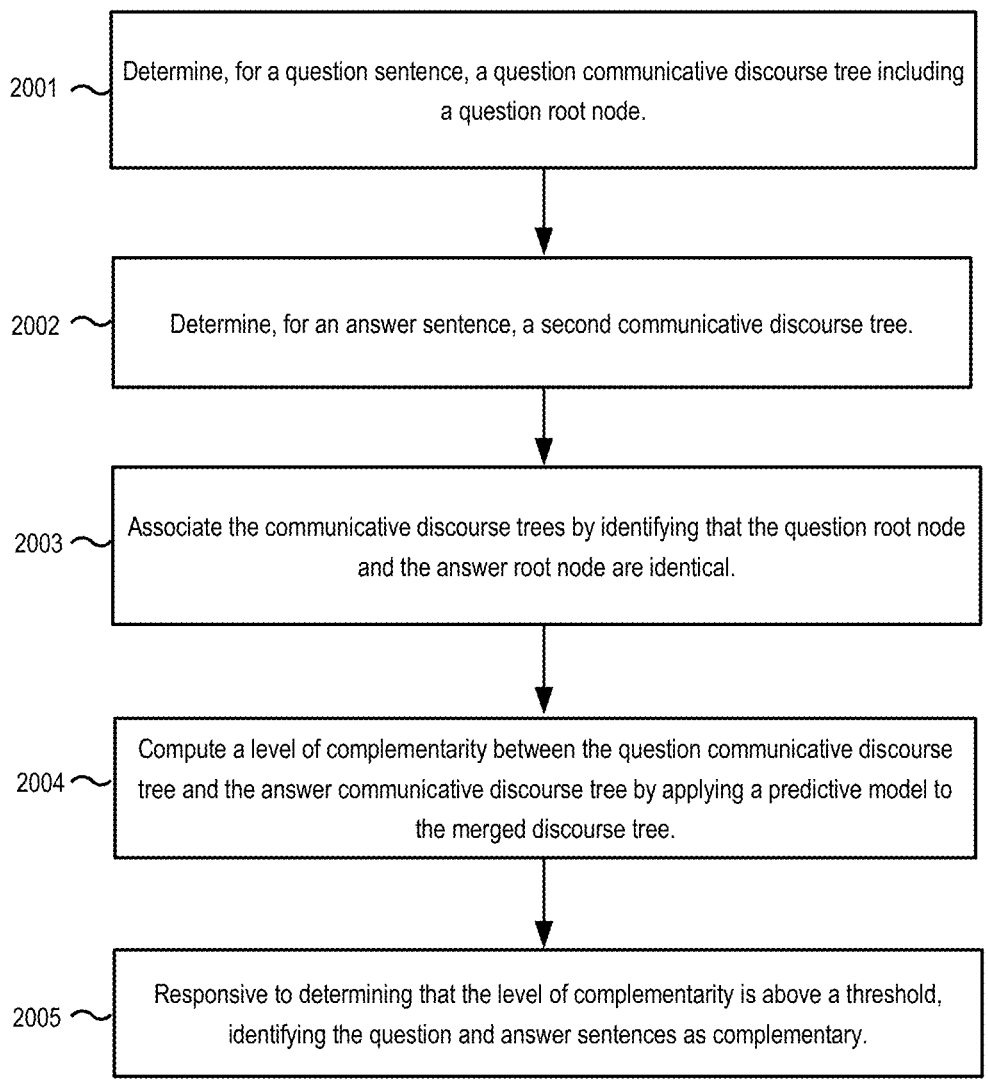
FIG. 20 illustrates an exemplary process used to implement a rhetoric agreement classifier in accordance with an aspect.

Rhetoric agreement classifier 120 can determine the complementarity between two sentences, such as a question and an answer, by using communicative discourse trees. FIG. 20 illustrates an exemplary process used to implement a rhetoric agreement classifier in accordance with an aspect. FIG. 20 depicts process 2000, which can be implemented by application 102. As discussed, rhetoric agreement classifier 120 is trained with training data 125.

Rhetoric agreement classifier 120 can determine a communicative discourse tree for both question and answer. For example, rhetoric agreement classifier 120 constructs a question communicative discourse tree from a question and an answer communicative discourse tree from a candidate answer.

At block 2001, process 2000 involves determining, for a question sentence, a question communicative discourse tree including a question root node. A question sentence can be an explicit question, a request, or a comment. Application 102 creates question communicative discourse tree from a question. Using the example discussed in relation to FIGS. 13 and 15, an example question sentence is "are rebels responsible for the downing of the flight." Application 102 can use process 1500 described with respect to FIG. 15. The example question has a root node of "elaborate."

At block 2002, process 2000 involves determining, for an answer sentence, a second communicative discourse tree, wherein the answer communicative discourse tree includes an answer root node. Continuing the above example, application 102 creates a communicative discourse tree, as depicted in FIG. 13, which also has a root node "elaborate."

At block 2003, process 2000 involves associating the communicative discourse trees by identifying that the question root node and the answer root node are identical.

Application 102 determines that the question communicative discourse tree and answer communicative discourse tree have an identical root node. The resulting associated communicative discourse tree is depicted in FIG. 17 and can be labeled as a "request-response pair."

At block 2004, process 2000 involves computing a level of complementarity between the question communicative discourse tree and the answer communicative discourse tree by applying a predictive model to the merged discourse tree.

The rhetoric agreement classifier uses machine learning techniques. In an aspect, the application 102 trains and uses rhetoric agreement classifier 120. For example, application 102 defines positive and negative classes of request-response pairs. The positive class includes rhetorically correct request-response pairs, and the negative class includes relevant but rhetorically foreign request-response pairs.

For each request-response pair, the application 102 builds a CDT by parsing each sentence and obtaining verb signatures for the sentence fragments.

Application 102 provides the associated communicative discourse tree pair to rhetoric agreement classifier 120. Rhetoric agreement classifier 120 outputs a level of complementarity.

At block 2005, process 2000 involves responsive to determining that the level of complementarity is above a threshold, identifying the question and answer sentences as complementary. Application 102 can use a threshold level of complementarity to determine whether the question-answer pair is sufficiently complementary. For example, if a classification score is greater than a threshold, then application 102 can output the answer. Alternatively, application 102 can discard the answer and access answer database 105 or a public database for another candidate answer and repeat process 2000 as necessary.

In an aspect, the application 102 obtains co-references. In a further aspect, the application 102 obtains entity and sub-entity, or hyponym links. A hyponym is a word of more specific meaning than a general or superordinate term applicable to the word. For example, "spoon" is a hyponym of "cutlery."

In another aspect, application 102 applies thicket kernel learning to the representations. Thicket kernel learning can take place in place of classification-based learning described above, e.g., at block 2004. The application 102 builds a parse thicket pair for the parse tree of the request-response pair. The application 102 applies discourse parsing to obtain a discourse tree pair for the request-response pair. The application 102 aligns elementary discourse units of the discourse tree request-response and the parse tree request-response. The application 102 merges the elementary discourse units of the discourse tree request-response and the parse tree request-response.

In an aspect, application 102 improves the text similarity assessment by word2vector model.

In a further aspect, application 102 sends a sentence that corresponds to the question communicative discourse tree or a sentence that corresponds to the answer communicative discourse tree to a device such as computing device 103. Outputs from application 102 can be used as inputs to search queries, database lookups, or other systems. In this manner, application 102 can integrate with a search engine system.

Additional Rules for RR Agreement and RR Irrationality

The following are the examples of structural rules which introduce constraint to enforce RR agreement: 1) Both request and response have the same sentiment polarity (e.g., if a request is positive the response should be positive as well, and the other way around). 2) Both request and response have a logical argument.

Under rational reasoning, the request and response will fully agree: a rational agent will provide an answer which will be both relevant and match the question rhetoric. However, in the real world not all responses are fully rational. The body of research on Cognitive biases explores human tendencies to think in certain ways that can lead to systematic deviations from a standard of rationality or good judgment.

The correspondence bias is the tendency for people to over-emphasize personality-based explanations for behaviors observed in others, responding to questions. At the same time, those responding queries under-emphasize the role and power of situational influences on the same behavior.

Confirmation bias, the inclination to search for or interpret information in a way that confirms the preconceptions of those answering questions. They may discredit information that does not support their views. The confirmation bias is related to the concept of cognitive dissonance. Whereby, individuals may reduce inconsistency by searching for information which re-confirms their views.

Anchoring leads to relying too heavily, or "anchor", on one trait or piece of information when making decisions.

Availability heuristic makes us overestimate the likelihood of events with greater "availability" in memory, which can be influenced by how recent the memories are or how unusual or emotionally charged they may be.

According to Bandwagon effect, people answer questions believing in things because many other people do (or believe) the same.

Belief bias is an effect where someone's evaluation of the logical strength of an argument is biased by the believability of the conclusion.

Bias blind spot is the tendency to see oneself as less biased than other people, or to be able to identify more cognitive biases in others than in oneself.

Building a Communicative Discourse Tree

Figure 21:
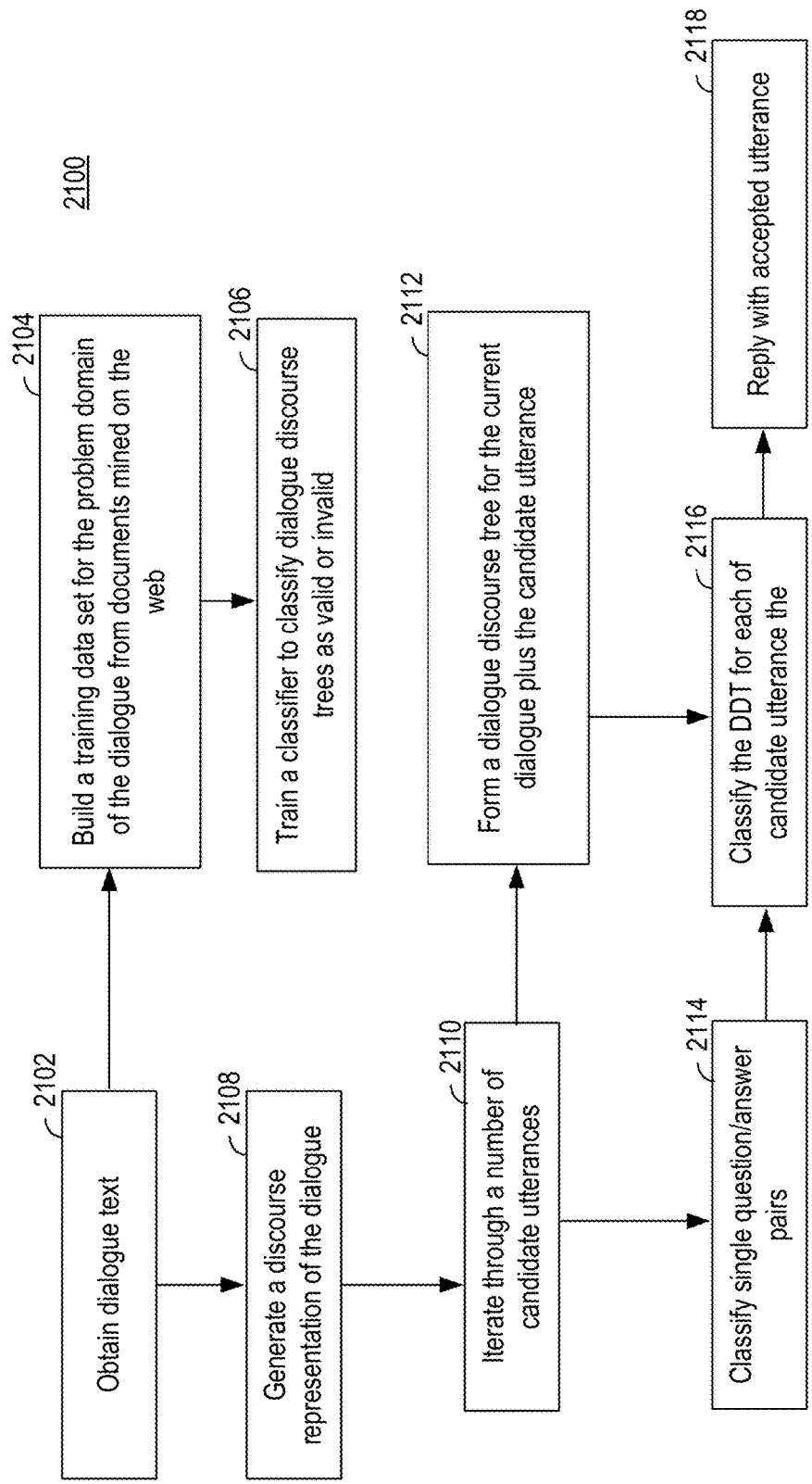
FIG. 21 illustrates an exemplary process for utilizing a dialogue discourse tree (DDT) for dialogue management, in accordance with at least one embodiment.

FIG. 21 illustrates an exemplary process 2100 for utilizing a dialogue discourse tree (DDT) for dialogue management, in accordance with at least one embodiment. Process 2100 may include generating a discourse representation (e.g., a dialogue discourse tree (DDT)) for dialogue. The DDT may be used to classify the dialogue as valid (e.g., cohesive dialogue having proper rhetorical flow) or invalid (e.g., incohesive dialogue having illogical flow).

A key step in response selection is measuring a matching degree between an input (e.g., text 128) and response candidates (of which answer 132 of FIG. 1 is an example). Different from single-turn conversation, in which the input is a single utterance (i.e., the message), multi-turn conversation requires context-response matching where both the current message and the utterances in its previous turns should be taken into consideration. The challenges of the task include:

1) how to extract information (words, phrases, and sentences) from the context and leverage the information in matching;
2) how to model relationships and dependencies among the utterances in the context.

Text 128 of FIG. 1 may be used as an example to illustrate the challenges. To find a proper response for the context (e.g., answer 132), the chatbot must know that 'have a swimming class' and 'swim' are important points. Without them, it may return a response relevant to the message but inappropriate in the context (e.g., "What lessons do you want?"). On the other hand, the mention of Prague and Vyšehrad can be less useful and even noisy to response selection. The responses from the chatbot may drift to the topic of Prague if the chatbot pays significant attention to these words. Therefore, it is crucial, yet non-trivial to let the dialog manager (e.g., application 102 of FIG. 1) understand the important points in the context and leverage them in matching and at the same time circumvent noise.

A number of candidate response may include: 1) What lessons do you want? 2) Do you want me to teach you swimming? 3) Do you want to do something else besides swimming? And 4) Have you ever swam using the butterfly stroke before? The first three response are topically correct but break the logical flow of a conversation. The fourth response is topically relevant and does not break the logical flow of the conversation. Therefore, the fourth response ought to be selected by the chatbot as answer 132 and provided next in the dialogue 130. Process 2100 provides operations for selecting an appropriate response (e.g., response 4 above) from a number of candidate responses (e.g., responses 1-4 above).

The process 2100 may begin at 2102, where dialogue may be obtained. By way of example, text 128 of FIG. 1, an example dialogue, may be obtained. Text 128 may include a multi-turned conversation between a chatbot and a user where multiple utterances (e.g., question or answers) have already been provided. In some embodiments, text 128 may be obtained by merging individual utterances of the dialogue 130.

At 2104, a training set for the problem domain of the dialogue may be built from documents mined from the web.
Constructing Dialogue Training Data from Text Dialogue Systems continue to experience a bottleneck in obtaining training data. In most problem domains, designers of chatbots are unable to obtain training dialogue datasets of desired quality and quantity and therefore attempt to find alternative, lower quality datasets and techniques such as transfer learning. As a result, the relevance and dialogue cohesiveness are frequently unsatisfactory.

A paragraph of text of various styles and genres may be converted into dialogue form and used as an example in a training data set.

Figure 22:
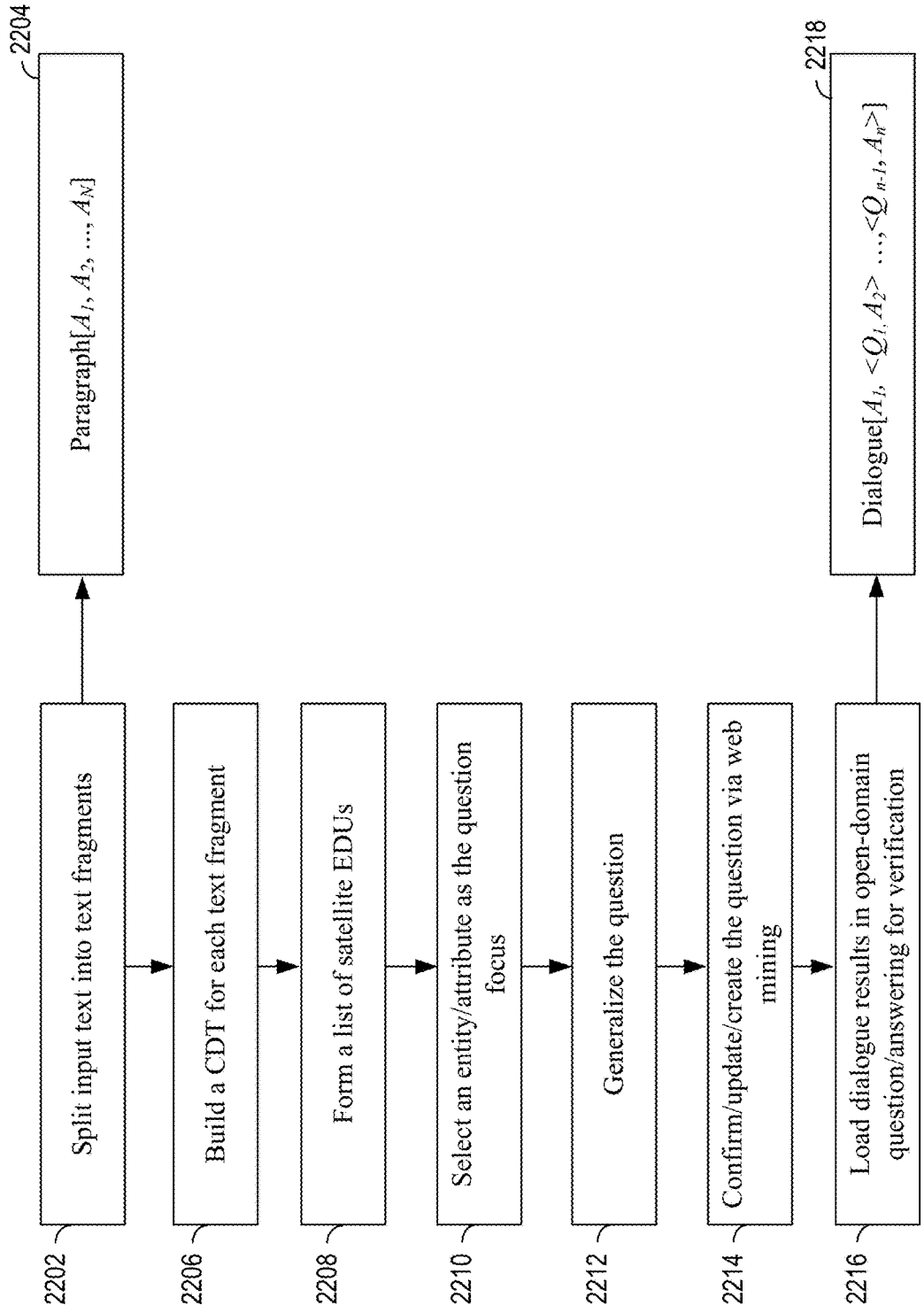
FIG. 22 illustrates an exemplary process for generating an instance of dialogue, in accordance with at least one embodiment.

FIG. 22 illustrates an exemplary process 2200 for generating an instance of dialogue, in accordance with at least one embodiment. In process 2200, a paragraph of text (e.g., a document) can be split into text fragments serving as a set of answers $[A_1, A_2, \ldots, A_N]$ and questions may be automatically formed from some of these text fragments. The problem of building dialogue from text T (e.g., paragraph$[A_1, A_2, \ldots, A_N]$) is formulated as splitting it into a sequence of answers $A=[A_1 \ldots A_n]$ to form a dialogue $[A_1, <Q_1, A_2>, \ldots, <Q_{n-1}, A_n>]$, where $A_i$ answers $A_{i-1}$ and possibly a previous question, and $\cup A_i = T$. $Q_{i-1}$ needs to be derived from the whole or a part of $A_i$ by linguistic means and generalization, Some adjusting may be useful to make these questions sound natural. To achieve this, a semantically similar phrase may be found on the web and merged with the candidate question.

Question generation has gained increased interest branching from the general Q/A problem. The task is to generate a natural language (NL) question conditioned on an answer and the corresponding document. Among its many applications, question generation has been used to improve Q/A systems.

A dialogue may be formed from text by the following rule: once a nucleus EDU is finished, and before a satellite EDU starts, questions against this satellite EDU may be inserted. In terms of a dialogue flow between a text author and a person asking question, the latter "interrupts" the author to ask him this question such that the satellite EDU and possibly consecutive text would be an answer to this question. This question is supposed to be about the entity from the nucleus, but this nucleus does not contain an answer to this question. The person asking questions only interrupts the text author when his question sounds suitable; it does not have to be asked for all nucleus-satellite transitions.

As an example, process 2200 may be used to build dialogue from a document. At 2202, input text (e.g., the document) may be split into text fragments (e.g., paragraphs of which text fragment 2204 is an example).

At 2206, a CDT for each text fragment (e.g., paragraph) may be built. By way of example, the process 1500 may be executed (e.g., by the DDT generate 104 of FIG. 1) to build a CDT for each text fragment.

At 2208, a list of satellite EDUs may be obtained. By way of example, each satellite EDU may be identified from the CDTs build at 2206. The process 2200 may include inserting a querying utterance before each of these satellite EDUs. To do that, we consider each such satellite EDU as an answer and attempt to formulate a question for it, generalizing it.

At 2210, an entity/attribute of the satellite EDU may be selected as the question focus based at least in part on a set of predefined rules. For example, CDT nodes for nouns, verbs, and adjectives may be selected. A set of one or more questions can be generated based on the nouns, verbs, and/or adjectives selected. For example, for every selected node, form a reduction of a parse tree by removing this node and build a question for that reduction by substituting a "Wh" word (e.g., who, what, where, when, or why) for the removed node. A Wh word may be selected for the missing following the rules: if the node corresponds to a noun, select "Who" or "What." If the node corresponds to a verb, select "What . . . do," If the node corresponds to an adjective, select "Which . . . " or "How is."

At 2212, a predefined rule set may be utilized to achieve a proper level of generalization for the question. If the question is too broad or too specific, the fixed answer (the satellite EDU) would look unnatural.

At 2214, the question may be provided as a query to the web to turn it into a question other people asked in some situations, assumed to be similar to the one described by the current paragraph. In other words, the question can be confirmed, updated, or created from submitting the question as a query and mining the web results. This confirmed/updated/created question may be inserted after the previous nucleus EDU and before the current satellite EDU.

A specific example is provided below.
Building Dialogue from a Discourse Tree

Consider a paragraph from a controversial domain of Theranos investigation " . . . But Theranos has struggled behind the scenes to turn the excitement over its technology into reality. At the end of 2014, the lab instrument developed as the linchpin of its strategy handled just a small fraction of the tests then sold to consumers, according to four former employees."

To convert this paragraph into a dialogue, a CDT for the paragraph may be built and used to form a question for each satellite:

But Theranos has struggled behind the scenes . . . .
(Question) Struggled for what?
. . . to turn the excitement over its technology into reality.
At the end of 2014, the lab instrument developed as . . . .
(Question) What is the role of instrument development?

... the linchpin of its strategy handled just a small fraction of the tests then sold to consumers, ....

(Question) Who said that?

... according to four former employees."

Figure 23:
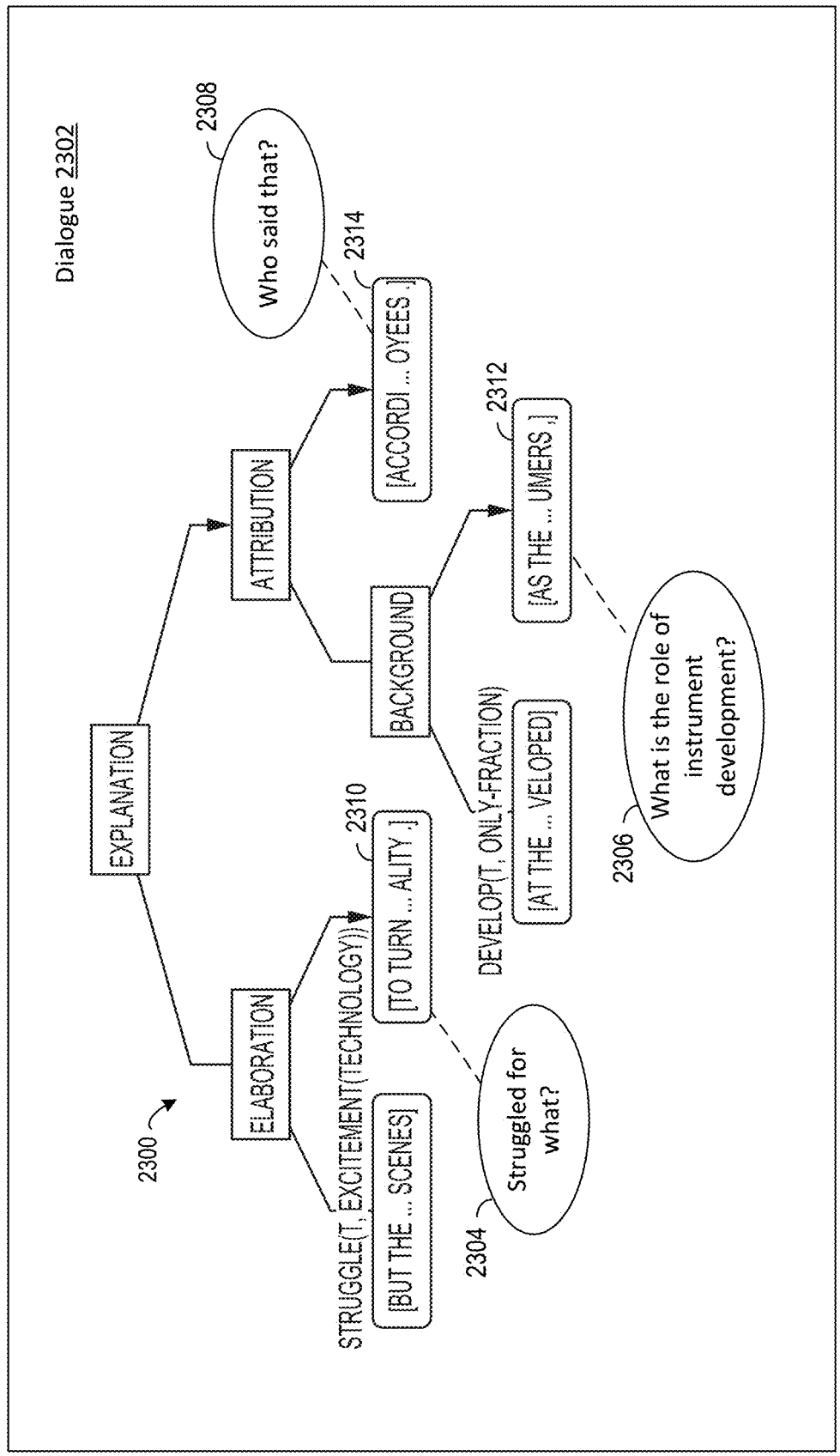
FIG. 23 illustrates a communicative discourse tree (CDT) from which a DDT may be generated, in accordance with at least one embodiment.

FIG. 23 illustrates a communicative discourse tree (CDT) 2300 from which a dialogue instance may be generated, in accordance with at least one embodiment. CDT 2300 may represent the text "... But Theranos has struggled behind the scenes to turn the excitement over its technology into reality. At the end of 2014, the lab instrument developed as the linchpin of its strategy handled just a small fraction of the tests then sold to consumers, according to four former employees." CDT 2300 may be generated (e.g., by the DDT generator 104 of FIG. 1) using process 1500 of FIG. 15. Once the text is split into EDUs, the satellites of certain relations may be used to form questions. Elaboration rhetorical relations may be identified and used to form a What-question from a verb phrase. Background relations may be used to form additional What-questions for the corresponding satellites '... as <predicate>-<subject>'. Finally, Attribution relations may be used to form "What/who is source" questions from the corresponding satellites.

A trivial approach to question generation would be to just convert each satellite EDU into a question. But this approach would make it too specific and unnatural, such as 'the linchpin of its strategy handled just a small fraction of the tests then sold to whom?' Instead, a natural dialogue should be formed with more general questions like What does its strategy handle?' Communicative actions help to formulate questions for satellite EDUs as well. For struggle(T, excitement(technology)) attached to the relation of Elaboration, the question formed can be 'Was there an excitement about [Theranos] technology?', and for develop(T, small-fraction) the question formed could be 'Does Theranos only perform a small fraction of tests?'

Constructing Questions

A candidate question may be subject to reduction to avoid being too specific. For example, 'What is a British rock band that formed in London in 1970 and received Grammy Hall of Fame Award in 2004?' would be too specific and should be reduced, for instance, to 'What is a British rock band that formed in London'. To achieve a proper level of generalization for questions in accordance with the operations at 2212, an extended set of questions may be obtained (e.g., such as Stanford Q/A database (SQuAD)) and a pair-wise syntactic generalization may be performed to obtain a set of most frequent question templates. The SQuAD corpus is a machine comprehension dataset consisting of over 100,000 crowd-sourced question-answer pairs on five hundred Wikipedia articles. For example, generalizing 'What is the purpose of life on Earth' and 'Tell me the purpose of complex numbers' results 'the -DT purpose -NN of -PRP*-NP' where the part-of-speech tags are retained. The most frequent generalization results (question templates) may be collected.

Phrase-reduction rules may be applied at both individual phrase and sentence level. As a result, we want to obtain a question from an original satellite EDU expression that is as close to a question template as possible. Therefore, for every satellite EDU expression we iterate through the templates and find the most similar one. In terms of syntactic generalization, the most similar template is the template which delivers a maximal common sub-parse tree with this expression. For the sentence "[I built a bridge]$_{nucleus}$ [with the purpose of fast access to the forest]$_{satellite}$", the satellite EDU is better covered by the template from our previous paragraph than, for example, by 'access-NN to-TO forest-NN' or 'access-NN to-TO NP' in terms of the number of common terms (parse tree nodes) of the generalization result.

To improve the meaningfulness, interestingness and diversity of a formed and generalized question, information mined from the web may be utilized. A web search query may be formed from the question by the DDT generator 104. The DDT generator 104 may identify a expression from a web document as close to this question as possible and also from a reputable or popular source (e.g., from a predefined set of sources). DDT generator 104 may iterate through the web search results score document titles, snippet sentences, and other expressions found in the web documents based on identifying a degree of semantic similarity to the query. Semantic similarity is assessed based on generating a syntactic generalization score between the candidate query and a search result. If such expression from the document is found, its entities need to be substituted by the ones from the original question. As a result, a candidate question will look more popular, mature and in more common terms.

To verify that the formed and modified question obtained from a satellite EDU text has this text as a good answer, the DDT generator 104 may utilize the whole original text and the formed question, and verify that the answer is the EDU from which this question was formed and that the answer does not correspond to another EDU. A wrong text fragment can appear as an answer if the question was substantially distorted by generalization or web mining.

The DDT generator 104 may insert nodes in the CDT 2300 to represent the candidate questions. A node that represents a question may be inserted after the previous nucleus EDU and before the current satellite EDU from which that question was formed. Nodes 2304, 2306, and 2308 are each and example of a node that has been inserted in CDT 2300 to represent the questions generated from corresponding satellite EDUs (corresponding to nodes 2310, 2312, and 2314, respectively. Thereafter, a dialogue discourse tree may be generated from dialogue 2302 in the manner described below in connection with FIGS. 24-30.

Returning to FIG. 21, the operations discussed with respect to FIGS. 22 and 23 may be performed any suitable number of times, for any suitable corpus of documents in order to generated the training data set discussed at 2104. The training data set may include any suitable number of DDTs, each DDT representing an instance of dialogue. Each of the generated DDTs may be associate with a label indicating the DDT is valid. At 2106, the training data set generated in the manner discussed with respect to FIGS. 22 and 23 may be utilized to train dialogue classifier 122 of FIG. 1, using any suitable supervised or unsupervised machine-learning algorithms to classify a DDT representing an instance of dialogue as valid or invalid. Although the operations of 2104 and 2106 are depicted as being executed after obtaining dialogue text at 2102, these operations can be alternatively performed as a preprocessing effort in advance of executing process 2100.

At 2108, a discourse representation of dialogue (e.g., text 128) may be generated. A discourse representation of an instance of dialogue may include a dialogue discourse tree (DDT). An instance of dialogue may be generated by merging any suitable number of utterances between two parties. By way of example, the utterances between the chatbot and the user of text 128 may be merged to form an instance of dialogue.

FIG. 24 illustrates an exemplary discourse tree 2400 generated from the text 128 (e.g., an instance of dialogue, dialogue formed by merging multiple utterances between a chatbot and a user), in accordance with at least one embodiment. Here, the discourse tree 2400 may include default rhetorical relations generated by a discourse parser. The discourse tree 2400 may be generated using a conventional discourse parser as described above in connection with FIGS. 2-7.

To express a dialogue via a DT, specific relations between utterances may be added. To link utterances in a dialogue, rhetorical relations and communicative actions may be both used, as both kinds regulate an agreement between a request and response (a question and an answer, a sharing intent and its acceptance, etc.).

Figure 25:
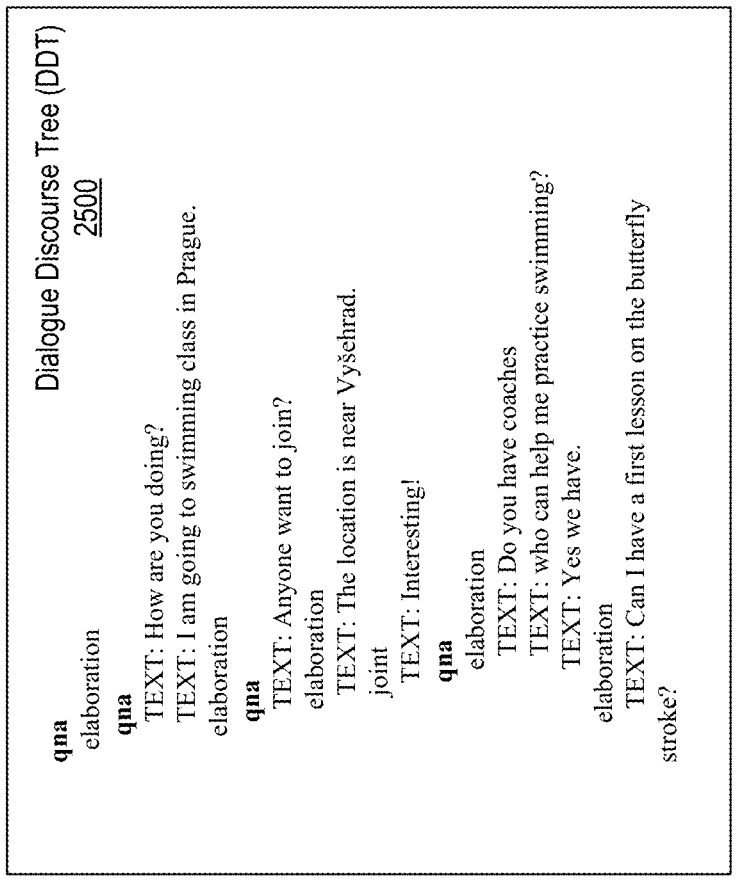
FIG. 25 illustrates an exemplary dialogue discourse tree generated from the discourse tree of FIG. 24, in accordance with at least one embodiment.

FIG. 25 illustrates an exemplary dialogue discourse tree 2500 generated from the discourse tree 2400 of FIG. 24, in accordance with at least one embodiment. In some embodiments, a rhetorical relation specific to dialogue may be utilized to identify relationships between questions and answers. In some embodiments, the DDT generator 104 may be configured to parse the discourse tree 2400 to identify, based at least in part on a predefined set of rules, particular relations to be replaced with discourse specific rhetorical relations. These discourse specific rhetorical relations may express dialogue turns between utterances, while the remaining rhetorical relations originally provided by the discourse tree 2400 may express relations between EDUs of an utterance. An utterance containing multiple phrases may be split into elementary discourse units (EDUs). Representing dialogue as a tree helps to establish a logical flow of this dialogue and encode abrupt changes in it. Default dialogue flow may be encoded by Elaboration and Joint similarly to a regular text, not a dialogue: Elaboration means that in the course of dialogue, the recipient gets further information. Joint means just a concatenation of two utterances.

Speech Acts and Communicative Actions

There are more epistemic states in a dialogue than just QnA. A number of dialogue specific rhetorical relations and speech acts linking utterances are provided below.

| Dialogue Specific Rhetorical Relation or Speech act | Description |
| --- | --- |
| QnA | Relation between a question and an answer |
| Request | Terminates the interaction with the system. |
| Disbelief/rejection/ disagreement/denial | Relation between a statement and a corresponding denying statement |
| Sharing/acknowledgment/ acceptance | Relation between an utterance with information being shared and an utterance with acknowledgement |
| Repeating/insisting | Relation between the first and the second utterances confirming/insisting a claim |
| Confirmation/agreement | Relation between a statement and a corresponding accepting statement |
| Explanation | Relation between a current utterance and a pair of two utterances: one that takes a statement from one utterance, one that expresses a doubt from another utterance, and attempts to address this doubt |
| Explanation request/ doubt | Relation between an actual explanation (Why-question) and explanation request |

For a regular text, it is important to incorporate speech acts in its discourse representation. It is done via communicative DTs (CDTs) where communicative actions are labels for the terminal DT arcs. The role of CDT extension of DT by means of communicative actions is even more significant for representing dialogues. In DDTs there are communicative actions within utterances, encoded via labels, and communicative actions between utterances that form additional dialogue-specific relations between utterances. The latter can be viewed as meta-communicative actions with respect to the former object-level communicative actions.

The DT for the dialogue may be augmented with a number of communicative actions mentioned in utterances.

Figure 26:
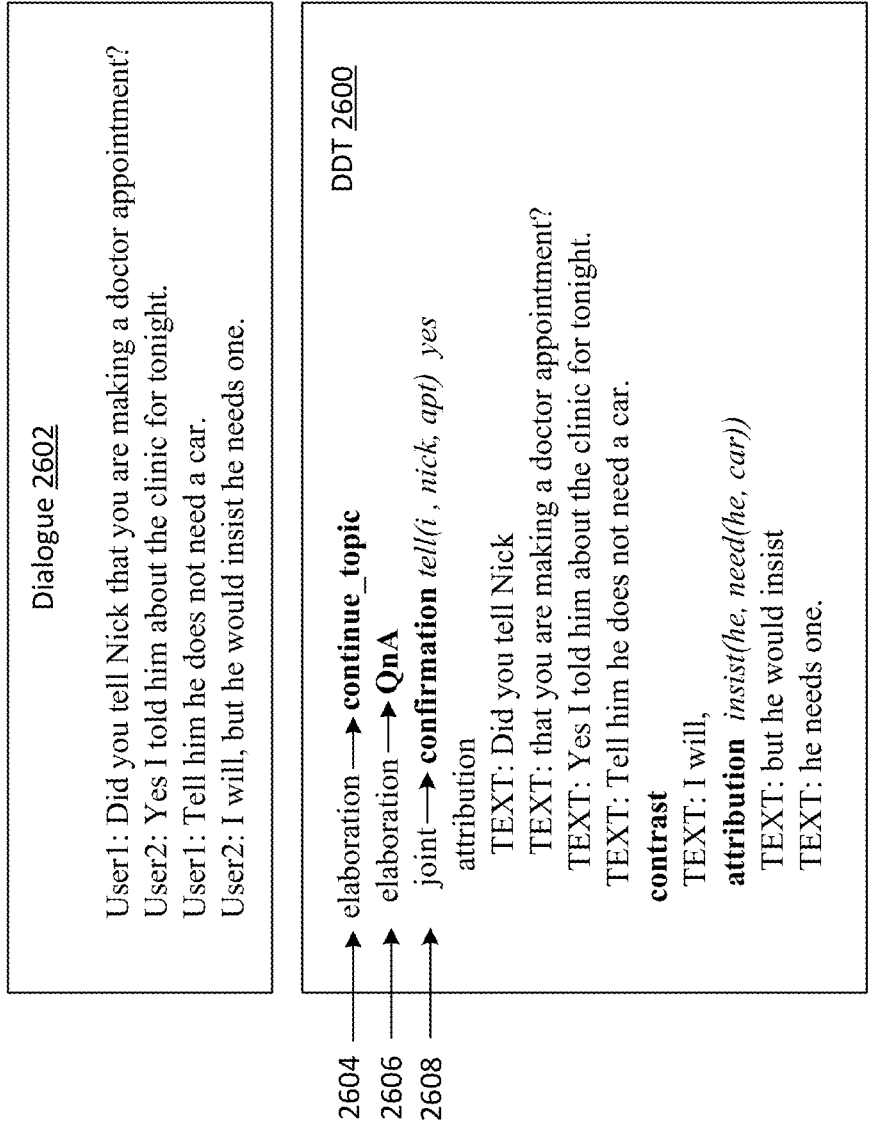
FIG. 26 illustrates an exemplary dialogue discourse tree generated for a dialogue, in accordance with at least one embodiment.

FIG. 26 illustrates an exemplary dialogue discourse tree (DDT) 2600 generated for the dialogue 2602, in accordance with at least one embodiment. A discourse tree may be generated for the dialogue 2602 using a conventional discourse parser. A DDT may be generated from that discourse tree based at least in part on identifying particular rhetorical relations within the discourse tree (e.g., elaboration and joint, etc.). By way of example, root and higher level relations Elaboration, Elaboration, and Joint of the DT as presented at 2604, 2606, and 2608, respectively may be identified. Once identified, a corresponding dialogue-specific rhetoric relation may be identified. In this example, Elaboration, Elaboration, and Joint of the DT as presented at 2604, 2606, and 2608 may be modified to Continue_topic, QnA, and Confirmation, respectively. This may be performed to differentiate between a set of utterances as a plain text and a "structurized" set of utterances as a dialogue. Continue_topic, QnA, and Confirmation outline a dialogue structure and its overall logic.

Communicative actions in this dialogue may be identified between the utterances Continue_topic and Confirmation, as well as inside the utterances, as indicated in the italics of FIG. 26 that follow a relation. The former group constitutes meta-level communicative actions relative to the latter, object-level ones.

Dialogue with Doubt

We consider a simple dialogue where the answer recipient A does not accept the answer from Q and expresses a doubt (disagreement, disbelief denial):

Q: What does the Investigative Committee of Russian Federation do?

A: Performs law enforcement duties and investigation. [default answer]

Q: Really?

A: Indeed, it frequently manages organized crime groups.

The resultant DDT includes relations of Disbelief, specific to a dialogue, and Qna, the default dialogue rhetorical relation.

disbelief
  qna
    TEXT: What does the Investigative Committee of Russian Federation do?
    TEXT: It performs law enforcement duties and investigations.
  concession believes(A, not believe(Q), qna(A
    TEXT: Really?
    TEXT: Indeed, it manages organized crime groups.

Three utterance candidates which maintain the proper entity and sentiment but break the rhetorical flow are provided below. Comments are provided in square brackets:

1. It also maintains law and order [does not address the doubt]
2. It does a great job of fighting the crime [does not address the doubt and uses unexpected positive sentiment]
3. It participates in maintaining order at elections [different entity, so inappropriate entity flow]

Correct alternative utterances would be:
1. Well, not always law enforcement duties [attenuation of first answer]
2. There are other duties [attenuation of first answer]
3. You are right. It is totally corrupt [confirmation of the doubt]

Further Extending Rhetorical Relations Towards Dialogue

Task-oriented dialogue is a complex behavior, involving two participants, each with their own beliefs and intentions, in a collaborative effort to interact to solve some problem. There is a whole set of behaviors related to maintaining the collaboration and synchronizing beliefs that does not arise in monolog. These include answering questions, agreeing to proposals, and simply acknowledging that the other participant has spoken. An example of such a dialogue is provided below.

User—"We have to send ambulance to the emergency area 1."
User—"There are people there to evacuate."
Bot—"How many are we sending?"
User—"Three."
Bot—"OK"
Bot—"So 1 ambulance to the emergency area E1 and 2 ambulances to the emergency area E2?"

Additional dialogue-specific relations are provided below:

| Speech Act | Description |
| --- | --- |
| Summary | Relationship between a few utterances and their summary |
| Make-plan | Relation between the expected result utterance and a set of utterances for a plan to get to this result |
| Stance | Returns the current stance of the user |
| Exit | Terminates the interaction with the system. |
| Level-up | Changes the current state and switches to the according parent node (one level up). |
| Why(argument) | Provides information about the current argument by exploring its child nodes |
| Prefer(argument) | User prefers the referenced argument component over the others |
| Reject(argument) | User disagrees with an argument component |

Improved Dialogue Discourse Parsers

Certain aspects relate to improved discourse parsers. Prediction of a rhetorical relation between two sentences is the goal of discourse parsing, along with text segmentation (splitting sentences into elementary discourse units). While documents can be analyzed as sequences of hierarchical discourse structures, an issue in discourse coherence is how rhetorical relations are signaled by the source text (and can be identified by a parser). For example, rhetorical relations are often signaled by discourse markers such as and, because, however and while, and relations are sometimes classified as explicit relations if they contain such markers. Discourse markers are reliable signals of coherence relations.

But existing discourse parsers use machine learning approaches and data sets which can be difficult and time-consuming to expand. The task of discourse relation prediction, already complex, is compounded by the time-consuming nature of expanding these annotated data sets. As such, many available discourse parsers assign Elaboration and Joint relations in cases where other, more descriptive rhetorical relations are more suitable. As such the recall of establishing other, more specific rhetorical relation can be relatively low.

But existing discourse parsers can be improved by performing additional analysis of the discourse tree, for example, semantic analysis, and adjusting the discourse tree accordingly. In the examples discussed below, a discourse parser is applied to text and any resulting Elaboration or Joint rhetorical relations can be replaced with a more suitable rhetorical relation obtained by using semantic analysis (e.g., Abstract Meaning Representation) patterns if available. In general, this approach is applied to intra-sentence rhetorical relations. The techniques described in connection with FIGS. 25 and 26 may be applied similarly to DDT generated from dialogue.

Figure 27:
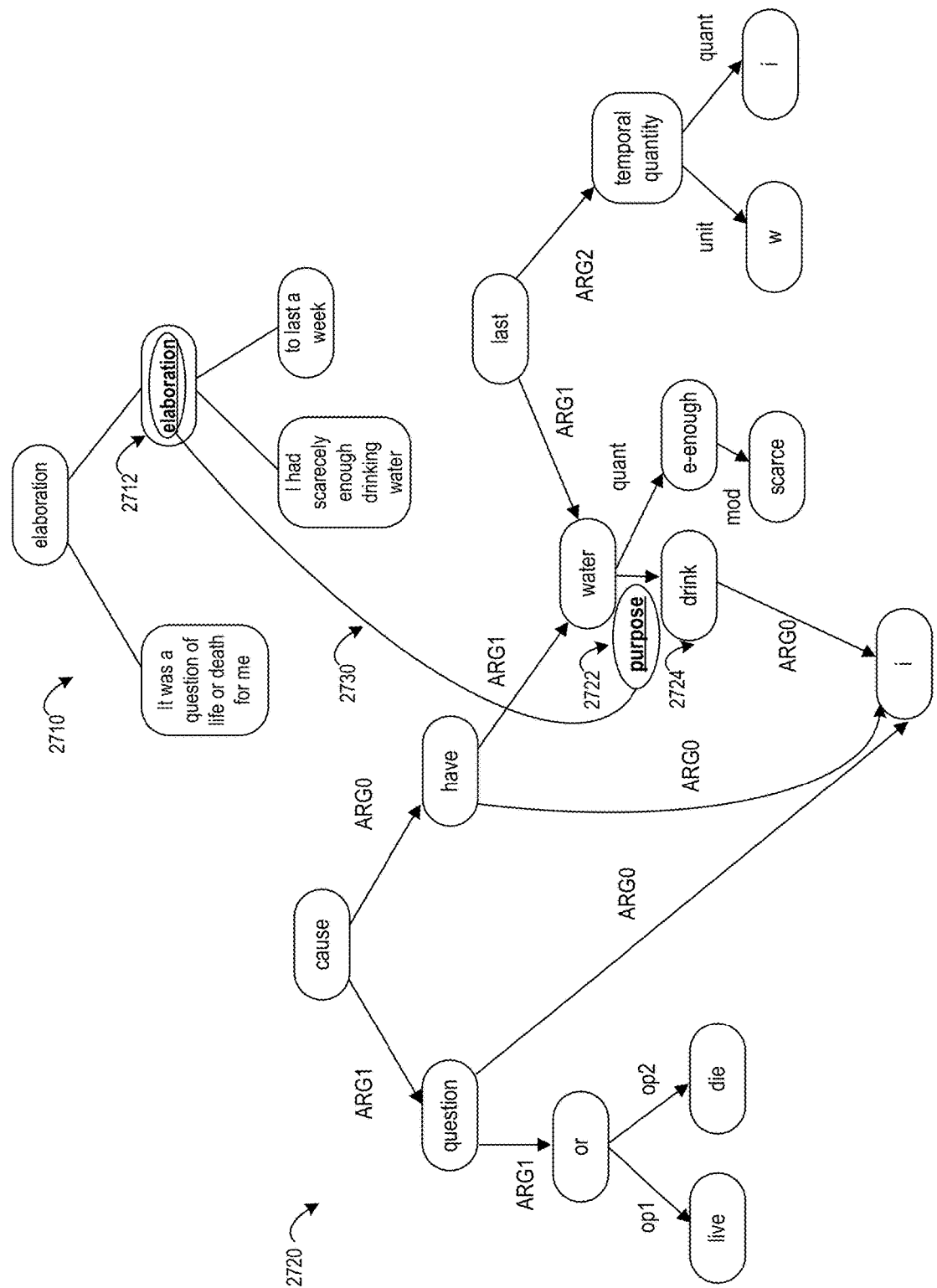
FIG. 27 depicts a discourse tree and a semantic tree, in accordance with an aspect.

FIG. 27 depicts a discourse tree and a semantic tree, in accordance with an aspect. FIG. 27 depicts discourse tree 2700 and semantic tree 2710.

Discourse tree 2700 and semantic tree 2710 each represent the following text: "It was a question of life or death for me: I had scarcely enough drinking water to last a week."

Discourse tree 2710 is represented in text-based form as follows (indentation refers to level of nesting in the tree):

elaboration
   TEXT: It was a question of life or death for me:
elaboration
   TEXT: I had scarcely enough drinking water
   TEXT: to last a week.

As can be seen from discourse tree 2710, the second Elaboration relation 2712, generated by a discourse parser, relating "I had scarcely enough drinking water" and "to last a week," is not as accurate as possible with respect to the text, because "to last a week" is more than simply an elaboration of "I had scarcely enough drinking water." This be improved upon by leveraging an AMR relation (e.g., a semantic relation) in semantic tree 2720. Semantic tree 2710 is also shown below in text-based form:

```
(q / question
    :ARG0 i
    :ARG1 (o / or
        :op1 (l / live-01)
        :op2 (d / die-01))
    :ARG1-of (c / cause
        :ARG0 (h / have
            :ARG0 (i / i)
            :ARG1 (w / water
                :purpose (d2 / drink
                    :ARG0 i)
                :quant (e / enough
                    :mod (s / scarce))
                :ARG1-of (l2 / last
                    :ARG2 (t / temporal-quantity :quant 1
                        :unit (w2 / week))
                    :ARG3 i)))))
```

As can be seen in semantic tree 2720, the semantic relation purpose, identified as relation 2722, has a semantic role and is related to the verb drink, identified as role 2724. A nucleus EDU ("I had scarcely enough drinking water") that has drink in discourse tree 2700 can be identified because discourse tree 2710 and semantic tree 2720 have a common entity (e.g., both include the verb "drink").

The higher the number of common entities between a discourse tree and a semantic tree template, the better the match for improving rhetorical relations. Continuing the example, a satellite EDU ("to last a week") is identified and linked with the rhetorical relation Elaboration. Finally, the Elaboration is substituted with Purpose for a more accurate discourse tree. The link between Elaboration and Purpose is shown as link 2730.

Leveraging semantic information improves dialogue discourse trees in certain circumstances such as when there is a lack of discourse markers, discourse markers are ambiguous or misleading, or a deeper semantic representation of a sentence such as AMR implies a specific rhetorical relation. Once syntactic similarity between a text being parsed and an AMR pattern is established, the semantic role from the AMR verb can be interpreted at the discourse level as a respective rhetorical relation. This mapping between a semantic relation in AMR and a specific rhetorical relation is established irrespectively of how, with which connective, nucleus and satellite EDUs are connected.

A mapping between semantic relations (of an AMR) and rhetorical relations is developed as a result of manual generalization of available AMR annotations are shown in the table below. The table provided blow illustrates examples of semantic roles and corresponding rhetorical relations. The first column of the table enumerates the rhetorical relation to be detected. The second column represents the AMR semantic relations being mapped to the rhetorical relation. The third column provides the example sentence that is going to be matched again a sentence being rhetorically parsed. The fourth column shows the AMR parsing for the templates.

To create this mapping of rhetorical relation to semantic roles, which can be performed offline (e.g., prior to runtime), a list of rhetorical relations is considered. For each rhetorical relation, a collection of AMR annotations of specific semantic relations may be determined. Once a systematic correlation is identified, a corresponding mapping, represented by an entry in the table blow is created. The table below illustrates rhetorical relations which are thoroughly represented by an AMR example.

| Rhetorical Relation | Semantic Role of a Verb | Template (e.g., an example sentence) | AMR representation |
|---|---|---|---|
| Contrast | contrast-XX | But he receives the explorers in his study. | (c / contrast-01<br>　:ARG2 (r / receive-01<br>　　:ARG0 (h / he)<br>　　:ARG1 (p / person<br>　　　:ARG0-of (e / explore-01))<br>　　:location (s / study<br>　　　:poss h))) |
| Purpose | :purpose( ) | It was a question of life or death for me: I had scarcely enough drinking water to last a week. | (q / question-01<br>　:ARG0 i<br>　:ARG1 (o / or<br>　　:op1 (l / live-01)<br>　　:op2 (d / die-01))<br>　:ARG1-of (c / cause-01<br>　　:ARG0 (h / have-03<br>　　　:ARG0 (i / i)<br>　　　:ARG1 (w / water<br>　　　　:purpose (d2 / drink-01<br>　　　　　:ARG0 i)<br>　　　　:quant (e / enough<br>　　　　　:mod (s / scarce))<br>　　　　:ARG1-of (l2 / last-03<br>　　　　　:ARG2 (t / temporal-quantity<br>　　　　　　:quant 1<br>　　　　　　:unit (w2 / week))<br>　　　　　:ARG3 i))))) |
| Comparison | :compared-to( ) | I was more isolated than a shipwrecked sailor on a raft in the middle of the ocean | (i / isolate-01<br>　:ARG1 (i2 / i)<br>　:degree (m / more)<br>　:compared-to (p / person<br>　　:ARG0-of (s / sail-01)<br>　　:ARG1-of (s2 / shipwreck-01)<br>　　:location (r / raft<br>　　　:location (o / ocean<br>　　　　:part (m2 / middle))))) |
| Cause | cause-XX | That is why, at the age of six, I gave up what might have been a magnificent career as a painter. | (c2 / cause-01<br>　:ARG0 (t2 / that)<br>　:ARG1 (g / give-up-07<br>　　:ARG0 (i / i)<br>　　:ARG1 (c / career<br>　　　:mod (m / magnificent)<br>　　　:topic (p / person<br>　　　　:ARG0-of (p2 / paint-02)))<br>　　:time (a / age-01<br>　　　:ARG1 i<br>　　　:ARG2 (t / temporal-quantity<br>　　　　:quant 6<br>　　　　:unit (y / year))))) |
| Condition | :condition( ), :have-condition( ), condition-of | If one gets lost in the night, such knowledge is valuable | (v / value-02<br>　:ARG1 (k / knowledge<br>　　:mod (s / such))<br>　:condition (g / get-03<br>　　:ARG1 (o / one)<br>　　:ARG2 (l / lost<br>　　　:time (d / date-entity :dayperiod (n / night))))) |

-continued

| Rhetorical Relation | Semantic Role of a Verb | Template (e.g., an example sentence) | AMR representation |
|---|---|---|---|
| Manner | :manner | It was from words dropped by chance that, little by little, everything was revealed to me | (r / reveal-01 :ARG0 (w / word :ARG1-of (d / drop-06 :ARG1-of (c / chance-02))) :ARG1 (e / everything) :ARG2 (i / i) :manner (l / little-by-little)) | manner (LeftToRight)
  elaboration (LeftToRight)
    TEXT:It was from words
    TEXT:dropped by chance
  TEXT:that , little by little,
everything was revealed to
me The table below provides examples of a refined discourse tree where Elaboration is turned into a more specific relation. A template is built and refined. The template shows the detected rhetorical relation manner in bold. The second example shows actual refinement where the Elaboration is turned into Concession by applying the template from the second row from the bottom. Syntactic generalization between this template and the sentence is also shown.

describes the rhetorical relation precisely. In an absence of sufficient AMR pattern data and extensive mapping into rhetorical relations data, formal learning of such a mapping is difficult. Therefore, this threshold for a similarity score is used.

Figure 28:
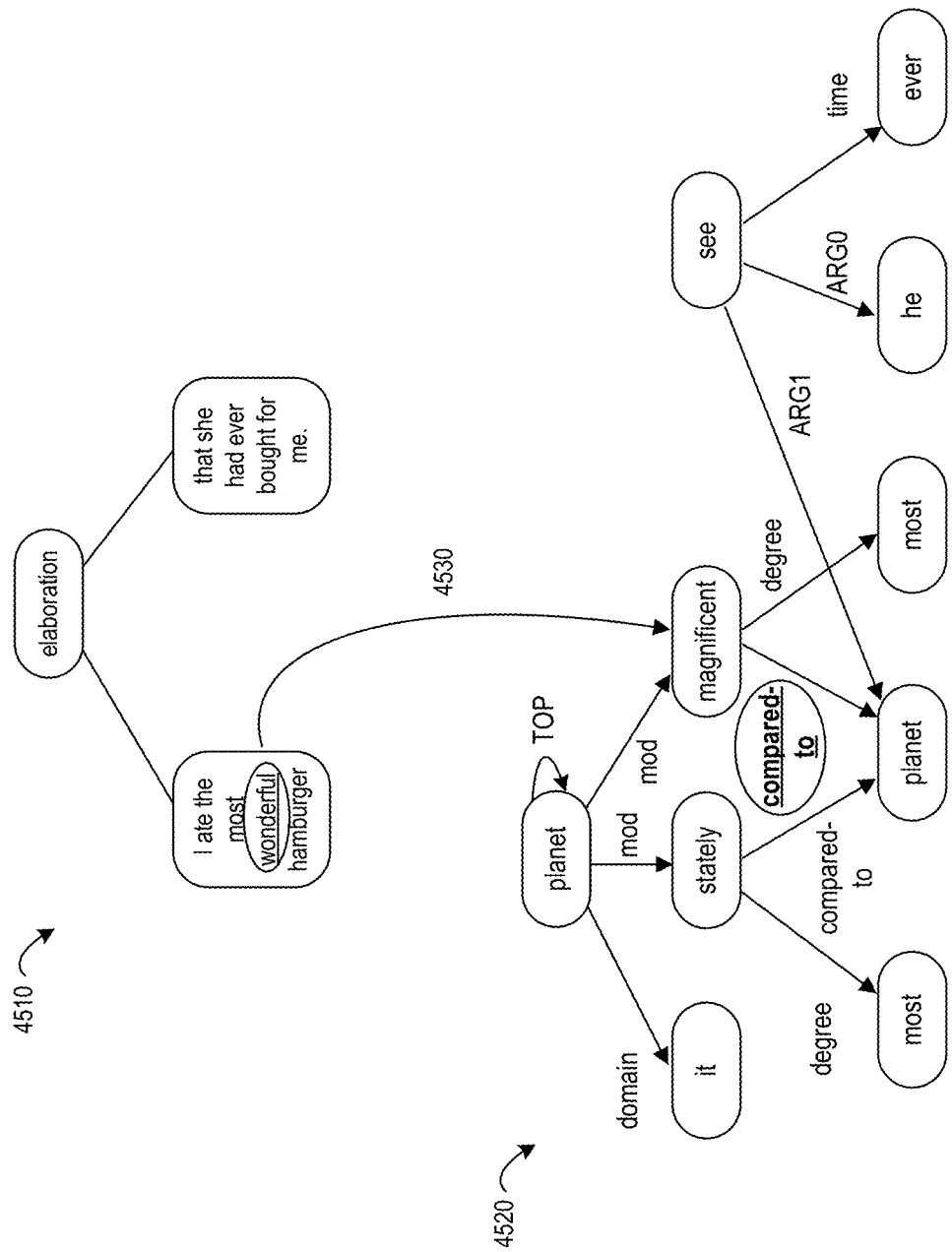
FIG. 28 depicts a discourse tree and a semantic tree, in accordance with an aspect.

Another example of using semantic relations and roles to improve rhetorical relations is shown in FIG. 28.

| Rhetorical relation | Semantic role of a verb | Template (e.g., a sample sentence) | AMR representation |
|---|---|---|---|
| Concession | :concession( ), :have-concession( ) | The little prince looked everywhere to find a place to sit down; but the entire planet was crammed and obstructed by the king's magnificent ermine robe | (a / and :op1 (c / cram-01 :ARG1 (r2 / robe :mod (e2 / ermine) :mod (m / magnificent) :poss (k / king)) :ARG2 (p3 / planet :extent (e3 / entire))) :op2 (o / obstruct-01 :ARG0 r2 :ARG1 p3) :concession (l / look-01 :ARG0 (p / prince :mod (l2 / little)) :ARG1 (p2 / place :purpose (s / sit-down-02 :ARG1 p)) :location (e / everywhere))) |
| elaboration TEXT:A designer trying to fit the power unit into the processor box, elaboration (LeftToRight) TEXT:but there was not enough space TEXT:to accommodate the cooling fan. | | A designer trying to fit the power unit into the processor box, and there was not enough space to accommodate the cooling fan. | [VP [VB-* NN-* IN-into], VP [VB-* VB-* NN-* NN-* NN-*], VP [VB-* IN-* DT-the NN-*], VP [VB-was DT-the NN-*], VP [TO-to VB-* DT-* NN-*]]] concession TEXT: A designer trying to fit the power unit into the processor box, elaboration TEXT: but there was not enough space TEXT: to accommodate the cooling fan. |

To replace the rhetorical relation of Elaboration with the one obtained from AMR, a syntactic similarity is established between the nucleus and the satellite elementary discourse units for this Elaboration and a semantic tree of a template (also referred to herein as a "template" for brevity). If such similarity is high (e.g., as determined through syntactic similarity scores generated via syntactic generalization), then Elaboration can be overwritten with a high confidence. The higher the syntactic similarity score, the higher is the confidence that the semantic role obtained from the pattern FIG. 28 depicts a discourse tree and a semantic tree, in accordance with an aspect. FIG. 28 depicts discourse tree 2810 and semantic tree 2820. Discourse tree 2810 represents the text "I ate the most wonderful hamburger that she had ever bought for me." Semantic tree 2820 does not represent the same text as discourse tree 2810. Rather, semantic tree 2820 represents text of a template that is a suitable match with the text of discourse tree 2810 and can be used to improve discourse tree 2810.

Discourse tree 2810 is represented in text form as:
elaboration
TEXT: I ate the most wonderful hamburger
TEXT: that she had ever bought for me.

As can be seen from discourse tree 2810, the two elementary discourse units "I ate the most wonderful hamburger" and "that she had ever bought for me" are connected by rhetorical relation "elaboration." Accordingly, discourse tree 2810 is a good candidate for improvement as the "elaboration" may not be the most accurate rhetorical relation.

The AMR semantic role of compared-to is mapped to rhetorical relation of Comparison. The default discourse parsing provides the Elaboration that can be turned into a more accurate rhetorical relation, if the EDU pair with a default rhetorical relation is semantically similar with a template (an AMR representation of predefined text) that has a specific semantic relation that can be mapped into a rhetorical relation. To establish an accurate rhetorical relationship between EDUs in the sentence, a match against a template found in a set of templates (e.g., AMR repository) is attempted. The matched template is for the sentence "It was the most magnificent and stately planet that he had ever seen."

To match an EDU pair being parsed with a template, the EDU and the template may be aligned and generalized. In this case, the syntactic generalization between the EDU pair and the template is as follows: [VB-* DT-the RBS-most JJ-(wonderful^magnificent) IN-that PRP-she VB-had RB-ever VB-*] so that there is a significant evidence that the sentence being parsed and the pattern share the common syntactic structure. For instance, wonderful^magnificent produces an abstract adjective with the meaning of what is common between these adjectives. Connection 2630 shows a correspondence between the adjective magnificent in the AMR representation and adjective wonderful the original DT.

Accordingly, the elaboration in discourse tree 2800 is replaced with a rhetorical relation of type "comparison." The corrected discourse tree is as follows:
comparison
TEXT: I ate the most wonderful hamburger
TEXT: that she had ever bought for me.

Building on the examples above, a process of improving discourse trees is further described.

Figure 29:
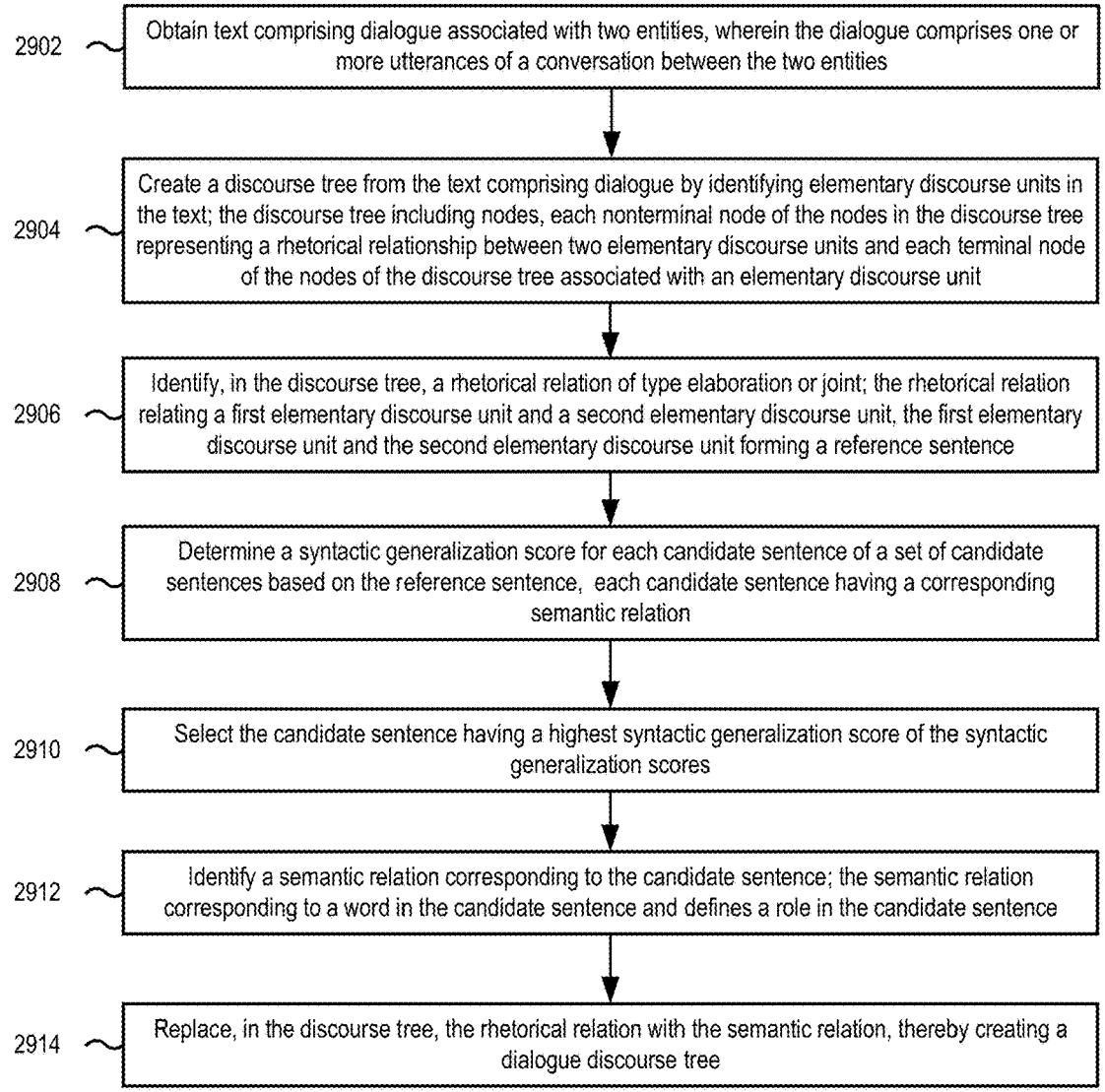
FIG. 29 is a flowchart of an exemplary process for generating a dialogue discourse tree, in accordance with an aspect.

FIG. 29 is a flowchart of an exemplary process 2900 for generating a dialogue discourse tree, in accordance with an aspect. It will be appreciated that in some cases, one or more operations in process 2900 may not be performed. Process 2900 can be performed by the DDT generator 104 of FIG. 1.

At 2902, process 2900 can include obtaining text comprising a dialogue. The dialogue may include any one or more utterances of a conversation between two parties (e.g., a user and a chatbot, for example). In some embodiments, the dialogue may be formed based on merging a number of utterances of a conversation.

At block 2904, process 2900 involves creating a discourse tree (e.g., the discourse tree 2400 of FIG. 24) from text (e.g., text 128) by identifying elementary discourse units in the text. At block 2904, process 2900 involves substantially similar operations as block 1502 of process 1500. The determined discourse tree (e.g., discourse tree 2400) includes nodes. Each nonterminal node of the nodes represents a rhetorical relationship between two elementary discourse units and each terminal node of the nodes of the discourse tree is associated with an elementary discourse unit.

At block 2906, process 2900 involves identifying, in the discourse tree, a rhetorical relation of type elaboration or joint. The rhetorical relation relates two elementary discourse units, e.g., a first elementary discourse unit and a second elementary discourse unit (rather than relating two other rhetorical relations or one rhetorical relation and one elementary discourse unit).

Together, the first elementary discourse unit and the second elementary discourse unit form a reference sentence. For example, referring back to FIG. 28, a first EDU is "I ate the most wonderful hamburger" and a second EDU is "that she had ever bought for me" and the rhetorical relation (prior to updating) is "elaboration."

At block 2908, process 2900 involves determining a syntactic generalization score for each candidate sentence of a set of candidate sentences. As described above, each candidate sentence has a corresponding semantic relation (e.g., AMR representation). In a simplified example, a syntactic generalization score is a number of common entities between the reference sentence of the DT and the candidate sentence. Each of the common entities share a common part of speech between the candidate sentence and the reference sentence. But the syntactic generalization score can be calculated differently in other aspects, as described below.

The purpose of an abstract generalization is to find commonality between portions of text at various semantic levels. Generalization can be performed on the paragraph, sentence, EDU, phrase, and individual word levels. With the exception of at the word level, the result of generalization of two expressions is a set of expressions. In such the set, for each pair of expressions so that one is less general than another, the latter is eliminated. Generalization of two sets of expressions is a set of sets of expressions which are the results of pair-wise generalization of these expressions. For example, FIG. 29 is discussed with respect to FIG. 30, which illustrates generalization, and FIG. 31, which illustrates alignment.

Figure 30:
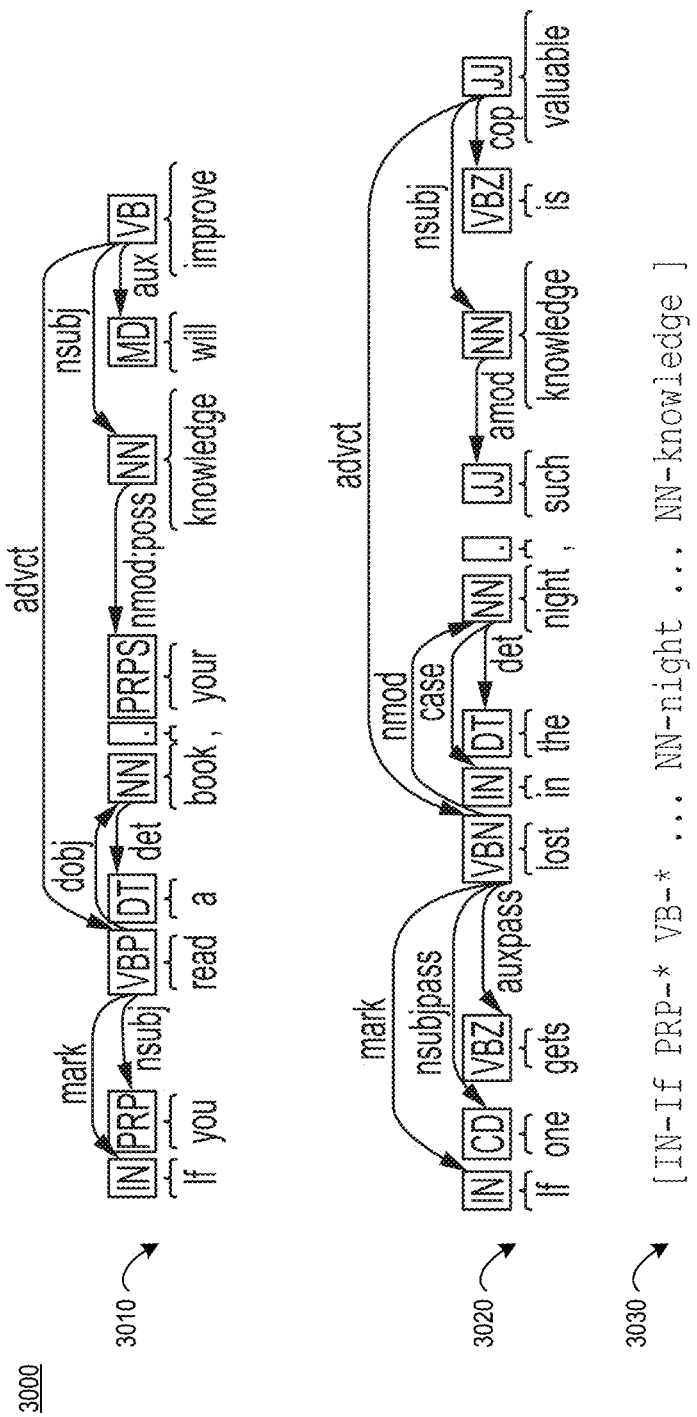
FIG. 30 depicts a generalization of a sentence and a template with known semantic relations, in accordance with an aspect.

FIG. 30 depicts a generalization of a sentence and a template with known semantic relation, in accordance with an aspect. FIG. 30 shows the generalization of sentence 3010, which is "If you read a book at night, your knowledge will improve" and a template 3020, which is "If one gets lost in the night, such knowledge is valuable". The resulting generalization 3030 is as follows:

$$[IN-If\ PRP-^*\ VB-^*\ \ldots\ NN-\text{night}\ \ldots\ NN-\text{knowledge}]$$

Although in this template IN-If PRP-* VB-* is a signature of a semantic relation of :condition( ) and also the discourse relation of Condition, there are happen to be more common words such as "NN-night . . . NN-knowledge" which might or might not be used to establish a similarity between the sentence and the template.

To determine how to calculate an appropriate generalization score, the problem may be formulated as finding optimal weights for nouns, adjectives, verbs and their forms (such as gerund and past tense) such that the resultant search relevance is maximized. Search relevance may be measured as a deviation in the order of search results from the best one for a given query; the current search order may be determined based on the score of generalization for the given set of POS weights (having other generalization parameters fixed). As a result of this optimization performed $W_{NN}=1.0$, $W_{JJ}=0.32$, $W_{RB}=0.71$, $W_{CD}=0.64$, $W_{VB}=0.83$, $W_{PRP}=0.35$ are obtained, excluding common frequent verbs like get, take, set, and put for which $W_{VBcommon}=0.57$. $W_{<POS,*>}$ is set to 0.2 (different words but the same POS), and $W_{<*,word>}=<*,word>=0.3$ (the same word but occurs as different POSs in two sentences). $W_{\{and,\ as,\ but,\ while,\ however,\ because\}}$ is calculated as a default value of 1 normalized.

A generalization score between the reference sentence (ref_sentence) and the candidate template (Template) then can be expressed as sum through phrases of the weighted sum through words $Wword_{ref\_sentence}$ and $word_{template}$:

$$\text{score(ref\_sentence, template)} = \sum \{NP, VP, \ldots\}$$
$$\sum W_{POS}\ \text{word\_generalization}(word_{ref\_sentence}, word_{template}).$$

The maximal generalization can then be defined as the one with the highest score.

At the phrase level, generalization starts with finding an alignment between two phrases (a correspondence of as many words as possible between two phrases). The alignment operation is performed such that phrase integrity is retained. For instance, two phrases can be aligned only if the correspondence between their head nouns is established. There is a similar integrity constraint for aligning verb, prepositional and other types of phrases.

Figure 31:
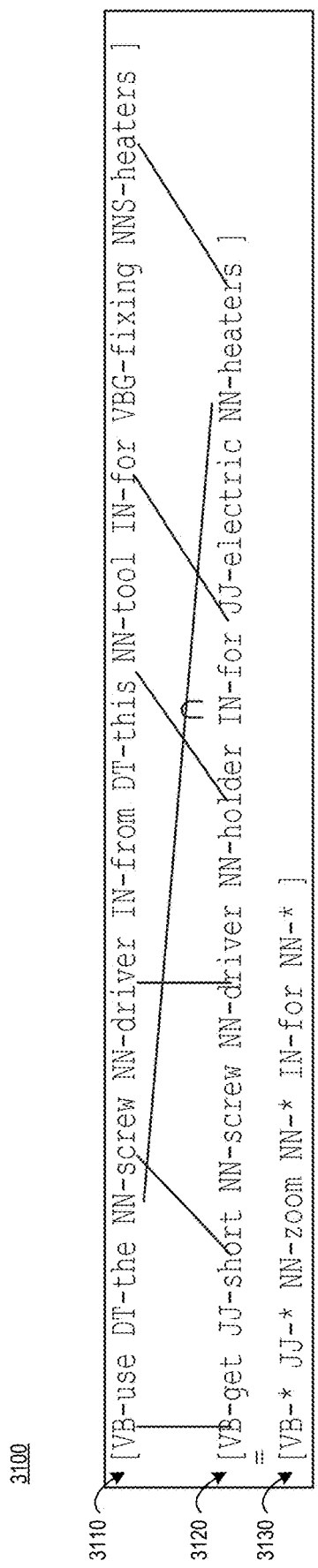
FIG. 31 depicts alignment between two sentences, in accordance with an aspect.

FIG. 31 depicts alignment between two sentences, in accordance with an aspect. FIG. 31 depicts an alignment between sentence 3110, which reads "use the screw driver from this tool for fixing heaters," and sentence 3120, which reads "get short screw driver holder for electric heaters." The resulting alignment 3130 is as follows:

$$VB-^*\ JJ-^*\ NN-\text{zoom}\ NN-^*\ IN-\text{for}\ NN-^*$$

In an aspect, dialogue discourse trees can be generated using separate generalization of the nucleus and the satellite. For instance, a discourse tree is created as in block 2904 of process 2900. From the discourse tree, a rhetorical relation is identified. Suitable rhetorical relations are identified. Examples of suitable rhetorical relations include innermost relations of Elaboration and Joint, and also the nested ones (Elaboration over another Elaboration [over another Elaboration]).

The nucleus EDU and the satellite EDUs are identified. If they are too complicated or long, these EDUs can be reduced in size and/or complexity. The nucleus EDU is generalized with each template from the table of templates provided above. A candidate sentence with a highest generalization score is selected. If the score is above a threshold, then the satellite EDU corresponding to the rhetorical relation is generalized with the template. If the generalization score of the satellite EDU is above a threshold, then the rhetorical relation is used to replace the rhetorical relation in the reference sentence.

Returning to FIG. 29, at block 2910, process 2900 involves selecting a candidate sentence having a highest syntactic generalization score of the syntactic generalization scores.

In an aspect, a match is not found. For instance, DDT generator 104 searches the abstract meaning representation (AMR) dataset to identify that the identified semantic relation is not in the AMR dataset and then substitutes, in the discourse tree (e.g., discourse tree 2400), the rhetorical relation with an additional semantic relation that is in the AMR dataset.

At block 2912, process 2900 involves identifying a semantic relation corresponding to the candidate sentence. The semantic relation corresponds to a word in the candidate sentence and defines a role in the candidate sentence.

At block 2914, process 2900 involves replacing, in the discourse tree 2400, the rhetorical relation with an updated rhetorical relation that corresponds to the semantic relation, thereby creating a dialogue discourse tree (e.g., the dialogue discourse tree 2500 of FIG. 25). A rhetorical relation that matches the identified semantic relation in block 2912 is identified. The identified rhetorical relation is inserted in the discourse tree in place of the rhetorical relation identified at block 2906.

Returning to FIG. 21. At 2110, process 2100 involves iterating through a number of candidate utterances. Candidate utterances can be identified by the DDT processing module 106 from answer database 105 of FIG. 1. By way of example, answer 132 of FIG. 1 may be an example of a candidate utterance that may be identified based at least in part on the text 128 of FIG. 1.

At 2112, a dialogue discourse tree may be generated for each candidate utterance. The DDT may represent the current dialogue (e.g., text 128) plus the candidate utterance (e.g., answer 132).

Figure 32:
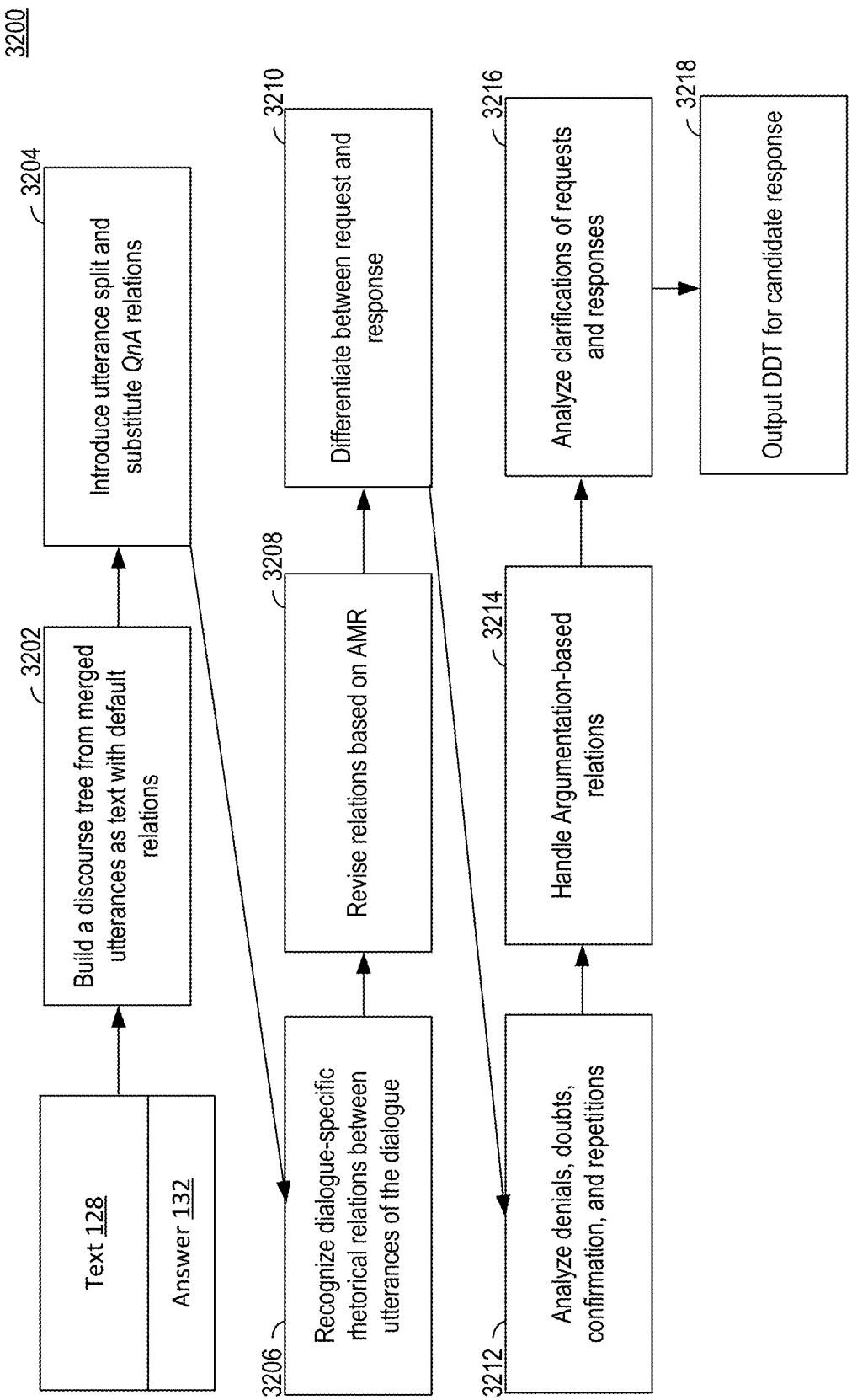
FIG. 32 is a flowchart depicting an exemplary process for generating a dialogue discourse tree corresponding to a candidate response, in accordance with at least one embodiment.

FIG. 32 is a flowchart depicting an exemplary process 3200 for generating a dialogue discourse tree corresponding to a candidate response (e.g., answer 132 of FIG. 1), in accordance with at least one embodiment. The process 3200 may be performed by the DDT generator 104 of FIG. 1.

Process 3200 may begin at 3202, where a discourse tree (e.g., discourse tree 2400) may be built from a dialogue, such as a dialogue generated from merging utterances (e.g., text 128 and answer 132) as text with default relations.

At 3204, utterances of the discourse tree (e.g., discourse tree 2400) may be split and dialogue specific rhetorical relations (e.g., QnA may be substituted for at least one of the rhetorical relations of discourse tree 2400) as discussed in connection with FIG. 25.

At 3206, dialogue-specific rhetorical relations may be recognized between utterances of the dialogue. Identifying dialogue-specific rhetorical relations may be performed as described above in connection with FIGS. 25 and 26.

At 3208, dialogue-specific rhetorical relations may be revised based on AMR templates. These revisions may be performed in the manner described in connection with FIGS. 26-31.

At 3210, the request and response portions of the dialogue may be identified within the dialogue. Request and/or response rhetorical relations may be identified in the discourse tree at 3210.

At 3212, dialogue-specific rhetorical relations corresponding to denials, doubts, confirmation, and repetitions may be identified and labeled within the discourse tree.

At 3214, the DDT generator 104 may clarify any requests and/or responses.

At 3216, a DDT for the candidate response (e.g., answer 132) may be output.

Returning to FIG. 21, at 2114, a question/answer pair obtained from a question of the text 128 and candidate answer may be assessed for rhetorical agreement.

A sub-problem of the discourse-driven dialogue management problem of how to coordinate a single question-answer pair. These considerations also cover the case of an arbitrary response with an arbitrary request concerning appropriateness that goes beyond a topic relevance, typical for a question-answer pair. Argumentation patterns in a question need to be reflected in the argumentation patterns in the answer: the latter may contain an argumentation defeat or support. Irony in a question should be addressed by irony or sarcasm in the answer. Doubt in a question should be answered by rejection or confirmation. A knowledge-sharing intent in an utterance needs to be followed by an acceptance or rejection of this knowledge in the answer. Certain thought patterns expressed in a question may be responded with matching thought patterns in an answer to be accepted by social norms. A request can have an arbitrary rhetorical structure as long as the subject of this request or a question is clear to its recipient. A response on its own can have an arbitrary rhetorical structure. However, these structures should be correlated when the response is appropriate to the request. A computational measure may be employed to assess how logical, rhetorical structure of a request or question is in agreement with that of a response, or an answer.

When answering a question formulated as a phrase or a sentence, the answer must address the topic of this question. When a question is formulated implicitly, via a seed text of a message, its answer is expected not only to maintain a topic, but also to match the epistemic state of this seed. For example, when a person is looking to sell an item with certain features, the search result should not only contain these features but also indicate an intent to buy. When a person is looking to share knowledge about an item, the search result should contain an intent to receive a recommendation. When a person asking for an opinion about a subject, the response should be sharing an opinion about this subject, not another request for an opinion. Modern dialogue management systems and automated email answering have achieved good accuracy maintaining the topic, but maintaining the communication discourse is a much more difficult problem. This measure of rhetorical agreement needs to be learned from data since it is hard to come up with explicit rules for coordinated rhetorical structures.

To assess the rhetorical agreement of the question/answer pair obtained from a question of text 128 and a candidate answer (e.g., answer 132), the pair can be provided to the rhetorical agreement classifier 120 of FIG. 1. Using a trained rhetoric agreement classifier 120, DDT processing module 106 determines whether the pairing of the candidate answer (e.g., answer 132, "Sure, have you ever swam using the butterfly stroke before?") to a question of text 128 (e.g., "Can my first lesson be on the butterfly stroke?") is above a threshold score indicating a degree to which the candidate answer is topically relevant. If the candidate answer (e.g., answer 132) is deemed topically relevant, DDT processing module 106 may proceed to 2116. If the candidate answer is not deemed topically relevant to the question. The candidate answer may be rejected, and the DDT processing module 106 may proceed to 2110 of process 2100 to process the next candidate utterance.

At 2116, process 2100 involves classifying the DDTs generated for each of the candidate utterances. In some embodiments, the DDT processing module 106 may classify a question/answer pair for a candidate response as topically relevant, and if so, proceed to classify the DDT corresponding to the candidate response if the candidate. In some embodiments, the DDT may classify various question/answer pairs for a number of candidate responses. For those identified as topically relevant, corresponding DDTs may be classified. To classify a DDT, the DDT processing module 106 may provide the DDT generated (e.g., by the DDT generator 104) for each candidate response (in some cases, for each topically relevant candidate response) to the dialogue classifier 122 of FIG. 1. Dialogue classifier 122 may be trained in the manner discussed in connection with FIGS. 22 and 23 to classify a DDT as being valid (e.g., maintains proper rhetorical flow between utterances) or invalid (e.g., break proper rhetorical flow between utterances).

If the candidate response is deemed topically relevant at 2114 and the corresponding DDT is deemed valid at 2116, the application 102 of FIG. 1 may accept the candidate utterance may respond with the accepted utterance at 2118. That is, the accepted utterance (e.g., answer 132) may be provided as a response and added to dialogue 130 of FIG. 1.

Figure 33:
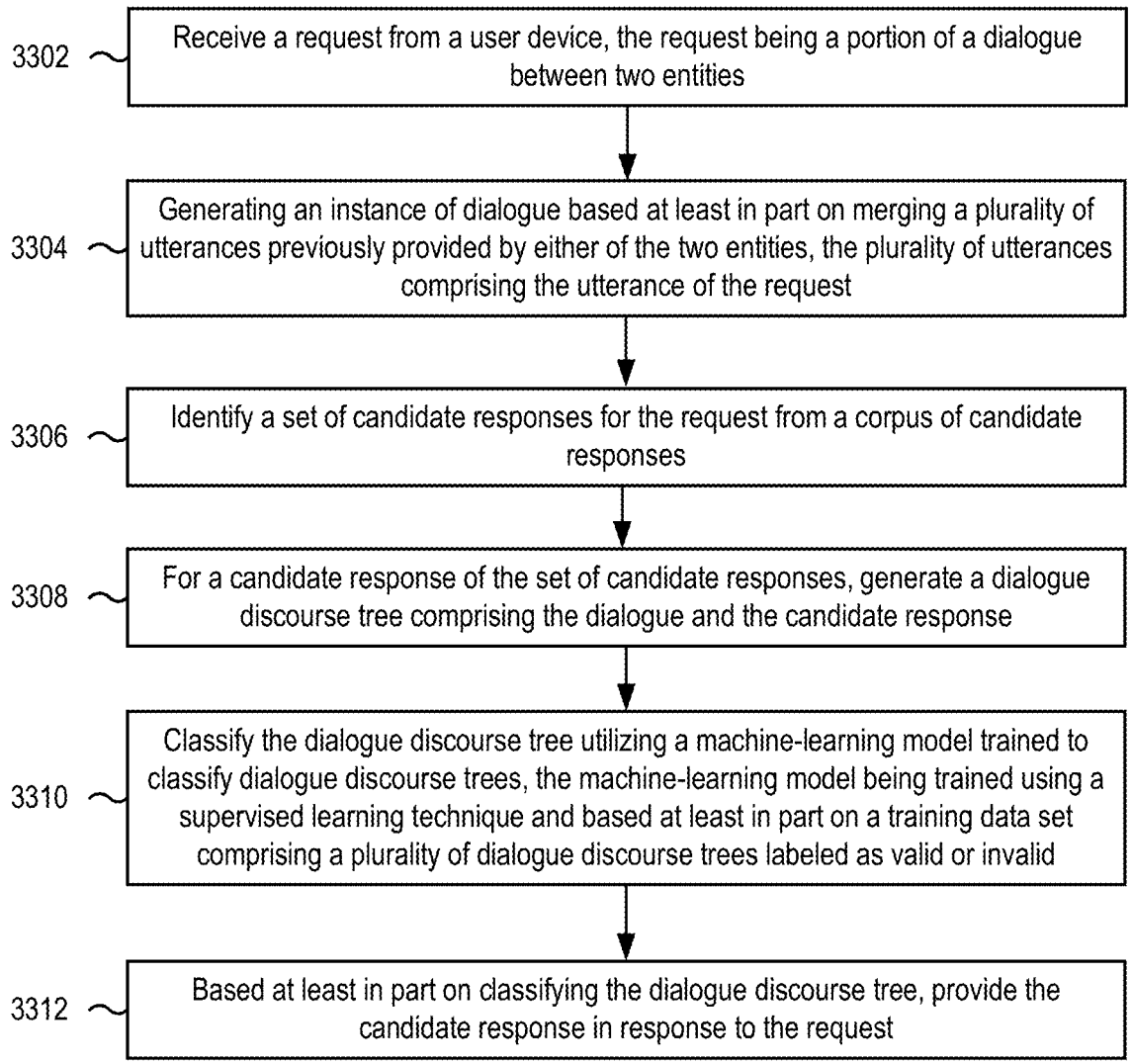
FIG. 33 is a flowchart depicting an exemplary process for utilizing a dialogue discourse tree (DDT) for dialog management, in accordance with at least one embodiment.

FIG. 33 is a flowchart depicting an exemplary process 3300 for utilizing a DDT to manage dialog, in accordance with at least one embodiment. In some embodiments, the method 3300 may be performed by the computing device 101 of FIG. 1 (e.g., application 102 DDT generator 104, DDT processing module 106, etc.). The operations of method 3300 may be performed in any suitable order. In some embodiments, the method 3300 may include more operations than those depicted in FIG. 33, or fewer operations than those depicted in FIG. 33.

The method 3300 may begin at 3302, where a request from a user device, the request comprising an utterance of dialogue between two entities. By way of example, the utterance "Can my first lesson be on the butterfly stroke?" depicted in dialogue 130 may be received from computing device 103 of FIG. 1.

At 3304, an instance of dialogue may be generated based at least in part on merging a plurality of utterances previously provided by either of the two entities. In some embodiments, the plurality of utterances comprises the utterance of the request. As a non-limiting example, the utterances of dialogue 130 which have been receive may be merged to form text 128 of FIG. 1.

At 3306, a set of candidate responses for the utterance of the request may be identified from a corpus of candidate responses. In some embodiments, the corpus may be stored within answer database 105 of FIG. 1. Identifying these candidate response may be performed in any suitable manner as discussed in the above figures with respect to matching a question to an answer and/or matching a request to a reply.

At 3308, a dialogue discourse tree for the instance of dialogue and the candidate response may be generated. In some embodiments, the dialogue discourse tree includes nodes corresponding to elementary discourse units representing text fragments of the plurality of utterances and the candidate response. At least one non-terminal node of the nodes in the dialogue discourse tree may represent a rhetorical relationship between two elementary discourse units, and each terminal node of the nodes of the dialogue discourse tree may be associated with an elementary discourse unit. In some embodiments, the dialogue discourse tree comprises at least one node representing a dialogue-specific rhetorical relationship between two utterances of the instance of dialogue. FIGS. 25 and 26 individually depict an example dialogue discourse tree.

At 3310, the dialogue discourse tree for the candidate response may be classified (e.g., as valid or invalid) utilizing a first machine-learning model. In some embodiments, the first machine-learning model may previously trained using a supervised learning technique and a training data set comprising a plurality of dialogue discourse trees previously labeled as valid or invalid.

At 3312, based at least in part on classifying the dialogue discourse tree for the candidate response, the candidate response may be provided in response to the request. By way of example, if the dialogue discourse tree for the candidate response is classified as being valid (e.g., maintains proper rhetorical flow between utterances), the candidate response may be provided in response to the request.

Exemplary Systems

Figure 34:
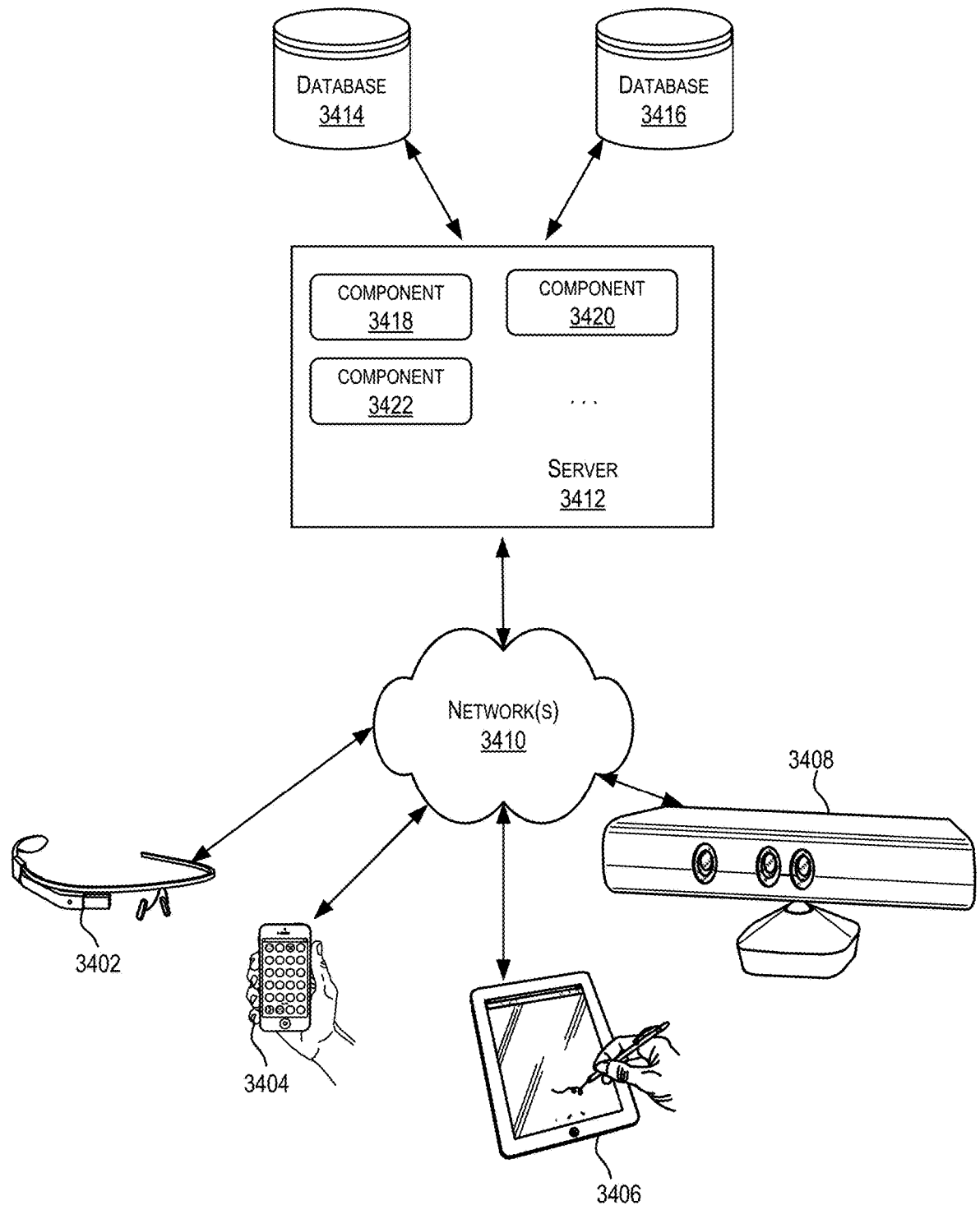
FIG. 34 depicts a simplified diagram of a distributed system for implementing one of the aspects.

FIG. 34 depicts a simplified diagram of a distributed system 3400 for implementing one of the aspects. In the illustrated aspect, distributed system 3400 includes one or more client computing devices 3402, 3404, 3406, and 3408, which are configured to execute and operate a client application such as a web browser, proprietary client (e.g., Oracle Forms), or the like over one or more network(s) 3410. Server 3412 may be communicatively coupled with remote client computing devices 3402, 3404, 3406, and 3408 via network 3410.

In various aspects, server 3412 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 3402, 3404, 3406, and/or 3408. Users operating client computing devices 3402, 3404, 3406, and/or 3408 may in turn utilize one or more client applications to interact with server 3412 to utilize the services provided by these components.

In the configuration depicted in the figure, the software components 3418, 3420 and 3422 of system 3400 are shown as being implemented on server 812. In other aspects, one or more of the components of system 3400 and/or the services provided by these components may also be implemented by one or more of the client computing devices 3402, 3404, 3406, and/or 3408. Users operating the client computing devices may then utilize one or more client applications to use the services provided by these components. These components may be implemented in hardware, firmware, software, or combinations thereof. It should be appreciated that various different system configurations are possible, which may be different from distributed system 3400. The aspect shown in the figure is thus one example of a distributed system for implementing an aspect system and is not intended to be limiting.

Client computing devices 3402, 3404, 3406, and/or 3408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 3402, 3404, 3406, and 3408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 3410.

Although exemplary distributed system 3400 is shown with four client computing devices, any number of client computing devices may be supported. Other devices, such as devices with sensors, etc., may interact with server 3412.

Network(s) 3410 in distributed system 3400 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 3410 can be a local area network (LAN), such as one based on Ethernet, Token-Ring and/or the like. Network(s) 3410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.28 suite of protocols, Bluetooth®, and/or any other wireless protocol); and/or any combination of these and/or other networks.

Server 3412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 3412 can include one or more virtual machines running virtual operating systems, or other computing architectures involving virtualization. One or more flexible pools of logical storage devices can be virtualized to maintain virtual storage devices for the server. Virtual networks can be controlled by server 3412 using software defined networking. In various aspects, server 3412 may be adapted to run one or more services or software applications described in the foregoing disclosure. For example, server 3412 may correspond to a server for performing processing described above according to an aspect of the present disclosure.

Server 3412 may run an operating system including any of those discussed above, as well as any commercially available server operating system. Server 3412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 3412 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 3412 may also include one or more applications to display the data feeds and/or real-time events via one or more display devices of client computing devices 3402, 3404, 3406, and 3408.

Distributed system 3400 may also include one or more databases 3414 and 3416. Databases 3414 and 3416 may reside in a variety of locations. By way of example, one or more of databases 3414 and 3416 may reside on a non-transitory storage medium local to (and/or resident in) server 3412. Alternatively, databases 3414 and 3416 may be remote from server 3412 and in communication with server 3412 via a network-based or dedicated connection. In one set of aspects, databases 3414 and 3416 may reside in a storage-area network (SAN). Similarly, any necessary files for performing the functions attributed to server 3412 may be stored locally on server 3412 and/or remotely, as appropriate. In one set of aspects, databases 3414 and 3416 may include relational databases, such as databases provided by Oracle, that are adapted to store, update, and retrieve data in response to SQL-formatted commands.

Figure 35:
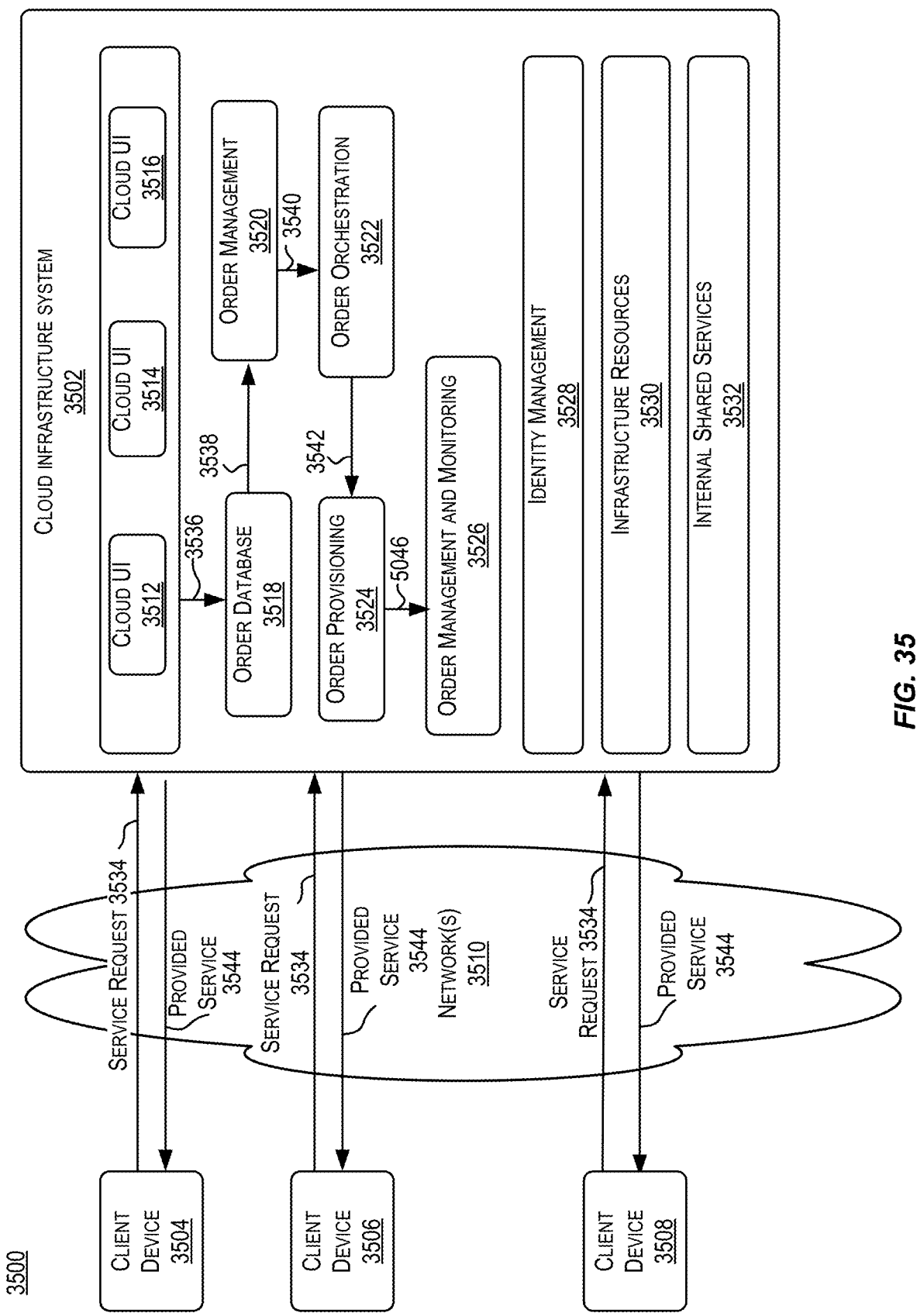
FIG. 35 is a simplified block diagram of components of a system environment by which services provided by the components of an aspect system may be offered as cloud services in accordance with an aspect.

FIG. 35 is a simplified block diagram of one or more components of a system environment 3500 by which services provided by one or more components of an aspect system may be offered as cloud services, in accordance with an aspect of the present disclosure. In the illustrated aspect, system environment 3500 includes one or more client computing devices 3504, 3506, and 3508 that may be used by users to interact with a cloud infrastructure system 3502 that provides cloud services. The client computing devices may be configured to operate a client application such as a web browser, a proprietary client application (e.g., Oracle Forms), or some other application, which may be used by a user of the client computing device to interact with cloud infrastructure system 3502 to use services provided by cloud infrastructure system 3502.

It should be appreciated that cloud infrastructure system 3502 depicted in the figure may have other components than those depicted. Further, the aspect shown in the figure is only one example of a cloud infrastructure system that may incorporate an aspect of the invention. In some other aspects, cloud infrastructure system 3502 may have more or fewer components than shown in the figure, may combine two or more components, or may have a different configuration or arrangement of components.

Client computing devices 3504, 3506, and 3508 may be devices similar to those described above for 3402, 3404, 3406, and 3408.

Although exemplary system environment 3500 is shown with three client computing devices, any number of client computing devices may be supported. Other devices such as devices with sensors, etc. may interact with cloud infrastructure system 3502.

Network(s) 3510 may facilitate communications and exchange of data between clients 3504, 3506, and 3508 and cloud infrastructure system 3502. Each network may be any type of network familiar to those skilled in the art that can support data communications using any of a variety of commercially-available protocols, including those described above for network(s) 3410.

Cloud infrastructure system 3502 may comprise one or more computers and/or servers that may include those described above for server 3429.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 3502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 3502 may be adapted to automatically provision, manage and track a customer's subscription to services offered by cloud infrastructure system 3502. Cloud infrastructure system 3502 may provide the cloud services via different deployment models. For example, services may be provided under a public cloud model in which cloud infrastructure system 3502 is owned by an organization selling cloud services (e.g., owned by Oracle) and the services are made available to the general public or different industry enterprises. As another example, services may be provided under a private cloud model in which cloud infrastructure system 3502 is operated solely for a single organization and may provide services for one or more entities within the organization. The cloud services may also be provided under a community cloud model in which cloud infrastructure system 3502 and the services provided by cloud infrastructure system 3502 are shared by several organizations in a related community. The cloud services may also be provided under a hybrid cloud model, which is a combination of two or more different models.

In some aspects, the services provided by cloud infrastructure system 3502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 3502. Cloud infrastructure system 3502 then performs processing to provide the services in the customer's subscription order.

In some aspects, the services provided by cloud infrastructure system 3502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 3502 may also include infrastructure resources 3530 for providing the resources used to provide various services to customers of the cloud infrastructure system. In one aspect, infrastructure resources 3530 may include pre-integrated and optimized combinations of hardware, such as servers, storage, and networking resources to execute the services provided by the PaaS platform and the SaaS platform.

In some aspects, resources in cloud infrastructure system 3502 may be shared by multiple users and dynamically re-allocated per demand. Additionally, resources may be allocated to users in different time zones. For example, cloud infrastructure system 3530 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 3532 may be provided that are shared by different components or modules of cloud infrastructure system 3502 and by the services provided by cloud infrastructure system 3502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 3502 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 3502, and the like.

In one aspect, as depicted in the figure, cloud management functionality may be provided by one or more modules, such as an order management module 3520, an order orchestration module 3522, an order provisioning module 3524, an order management and monitoring module 3526, and an identity management module 3528. These modules may include or be provided using one or more computers and/or servers, which may be general purpose computers, specialized server computers, server farms, server clusters, or any other appropriate arrangement and/or combination.

In exemplary operation 3534, a customer using a client device, such as client device 3504, 3506 or 3508, may interact with cloud infrastructure system 3502 by requesting one or more services provided by cloud infrastructure system 3502 and placing an order for a subscription for one or more services offered by cloud infrastructure system 3502. In certain aspects, the customer may access a cloud User Interface (UI), cloud UI 3529, cloud UI 3514 and/or cloud UI 3516 and place a subscription order via these UIs. The order information received by cloud infrastructure system 3502 in response to the customer placing an order may include information identifying the customer and one or more services offered by the cloud infrastructure system 3502 that the customer intends to subscribe to.

After an order has been placed by the customer, the order information is received via the cloud UIs, 3529, 3514 and/or 3516.

At operation 3536, the order is stored in order database 3518. Order database 3518 can be one of several databases operated by cloud infrastructure system 3518 and operated in conjunction with other system elements.

At operation 3538, the order information is forwarded to an order management module 3520. In some instances, order management module 3520 may be configured to perform billing and accounting functions related to the order, such as verifying the order, and upon verification, booking the order.

At operation 3540, information regarding the order is communicated to an order orchestration module 3522. Order orchestration module 3522 may utilize the order information to orchestrate the provisioning of services and resources for the order placed by the customer. In some instances, order orchestration module 3522 may orchestrate the provisioning of resources to support the subscribed services using the services of order provisioning module 3524.

In certain aspects, order orchestration module 3522 enables the management of business processes associated with each order and applies business logic to determine whether an order should proceed to provisioning. At operation 3542, upon receiving an order for a new subscription, order orchestration module 3522 sends a request to order provisioning module 3524 to allocate resources and configure those resources needed to fulfill the subscription order. Order provisioning module 3524 enables the allocation of resources for the services ordered by the customer. Order provisioning module 3524 provides a level of abstraction between the cloud services provided by cloud infrastructure system 3500 and the physical implementation layer that is used to provision the resources for providing the requested services. Order orchestration module 3522 may thus be isolated from implementation details, such as whether or not services and resources are actually provisioned on the fly or pre-provisioned and only allocated/assigned upon request.

At operation 3544, once the services and resources are provisioned, a notification of the provided service may be sent to customers on client devices 3504, 3506 and/or 3508 by order provisioning module 3524 of cloud infrastructure system 3502.

At operation 3546, the customer's subscription order may be managed and tracked by an order management and monitoring module 3526. In some instances, order management and monitoring module 3526 may be configured to collect usage statistics for the services in the subscription order, such as the amount of storage used, the amount data transferred, the number of users, and the amount of system up time and system down time.

In certain aspects, cloud infrastructure system 3500 may include an identity management module 3528. Identity management module 3528 may be configured to provide identity services, such as access management and authorization services in cloud infrastructure system 3500. In some aspects, identity management module 3528 may control information about customers who wish to utilize the services provided by cloud infrastructure system 3502. Such information can include information that authenticates the identities of such customers and information that describes which actions those customers are authorized to perform relative to various system resources (e.g., files, directories, applications, communication ports, memory segments, etc.)

Identity management module 3528 may also include the management of descriptive information about each customer and about how and by whom that descriptive information can be accessed and modified.

Figure 36:
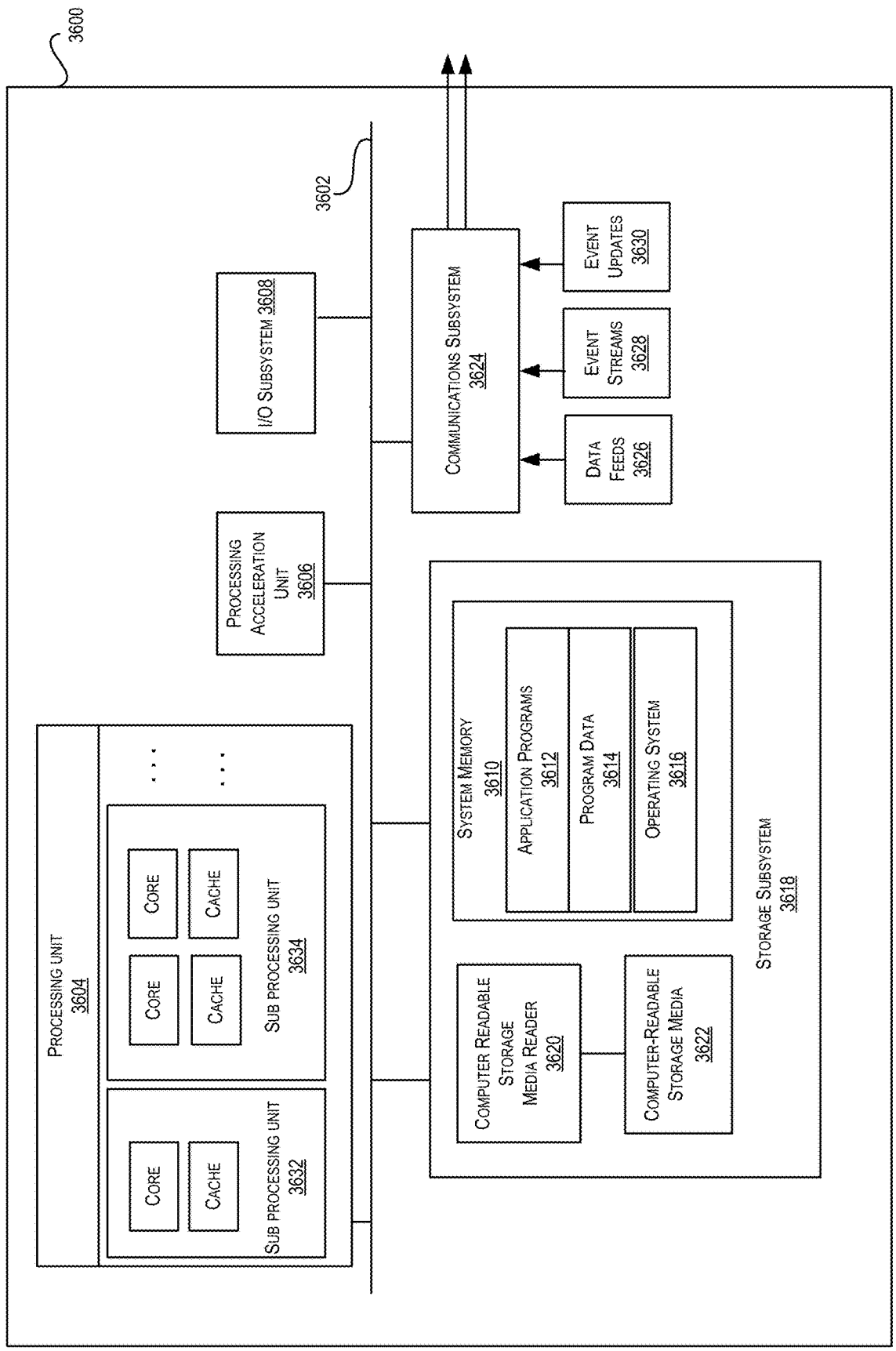
FIG. 36 illustrates an exemplary computer system, in which various aspects of the present invention may be implemented.

FIG. 36 illustrates an exemplary computer system 3600, in which various aspects of the present invention may be implemented. The system 3600 may be used to implement any of the computer systems described above. As shown in the figure, computer system 3600 includes a processing unit 3604 that communicates with a number of peripheral subsystems via a bus subsystem 3602. These peripheral subsystems may include a processing acceleration unit 3606, an I/O subsystem 3608, a storage subsystem 3618 and a communications subsystem 3624. Storage subsystem 3618 includes tangible computer-readable storage media 3622 and a system memory 3610.

Bus subsystem 3602 provides a mechanism for letting the various components and subsystems of computer system 3600 communicate with each other as intended. Although bus subsystem 3602 is shown schematically as a single bus, alternative aspects of the bus subsystem may utilize multiple buses. Bus subsystem 3602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P3086.1 standard.

Processing unit 3604, which can be implemented as one or more integrated circuits (e.g., a conventional microprocessor or microcontroller), controls the operation of computer system 3600. One or more processors may be included in processing unit 3604. These processors may include single core or multicore processors. In certain aspects, processing unit 3604 may be implemented as one or more independent processing units 3632 and/or 3634 with single or multicore processors included in each processing unit. In other aspects, processing unit 3604 may also be implemented as a quad-core processing unit formed by integrating two dual-core processors into a single chip.

In various aspects, processing unit 3604 can execute a variety of programs in response to program code and can maintain multiple concurrently executing programs or processes. At any given time, some or all of the program code to be executed can be resident in processor(s) 3604 and/or in storage subsystem 3618. Through suitable programming, processor(s) 3604 can provide various functionalities described above. Computer system 3600 may additionally include a processing acceleration unit 3606, which can include a digital signal processor (DSP), a special-purpose processor, and/or the like.

I/O subsystem 3608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 3600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 3600 may comprise a storage subsystem 3618 that comprises software elements, shown as being currently located within a system memory 3610. System memory 3610 may store program instructions that are loadable and executable on processing unit 3604, as well as data generated during the execution of these programs.

Depending on the configuration and type of computer system 3600, system memory 3610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 3604. In some implementations, system memory 3610 may include multiple different types of memory, such as static random access memory (SRAM) or dynamic random access memory (DRAM). In some implementations, a basic input/output system (BIOS), containing the basic routines that help to transfer information between elements within computer system 3600, such as during start-up, may typically be stored in the ROM. By way of example, and not limitation, system memory 3610 also illustrates application programs 3612, which may include client applications, Web browsers, mid-tier applications, relational database management systems (RDBMS), etc., program data 3614, and an operating system 3616. By way of example, operating system 3616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 3618 may also provide a tangible computer-readable storage medium for storing the basic programming and data constructs that provide the functionality of some aspects. Software (programs, code modules, instructions) that when executed by a processor provide the functionality described above may be stored in storage subsystem 3618. These software modules or instructions may be executed by processing unit 3604. Storage subsystem 3618 may also provide a repository for storing data used in accordance with the present invention.

Storage subsystem 3600 may also include a computer-readable storage media reader 3620 that can further be connected to computer-readable storage media 3622. Together and, optionally, in combination with system memory 3610, computer-readable storage media 3622 may comprehensively represent remote, local, fixed, and/or removable storage devices plus storage media for temporarily and/or more permanently containing, storing, transmitting, and retrieving computer-readable information.

Computer-readable storage media 3622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 3600.

By way of example, computer-readable storage media 3622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 3622 may include, but is not limited to, Zip® drives, flash memory cards, universal serial bus (USB) flash drives, secure digital (SD) cards, DVD disks, digital video tape, and the like. Computer-readable storage media 3622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 3600.

Communications subsystem 3624 provides an interface to other computer systems and networks. Communications subsystem 3624 serves as an interface for receiving data from and transmitting data to other systems from computer system 3600. For example, communications subsystem 3624 may enable computer system 3600 to connect to one or more devices via the Internet. In some aspects, communications subsystem 3624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 3624 can provide wired network connectivity (e.g., Ethernet) in addition to or instead of a wireless interface.

In some aspects, communications subsystem 3624 may also receive input communication in the form of structured and/or unstructured data feeds 3626, event streams 3628, event updates 3630, and the like on behalf of one or more users who may use computer system 3600.

By way of example, communications subsystem 3624 may be configured to receive unstructured data feeds 3626 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 3624 may also be configured to receive data in the form of continuous data streams, which may include event streams 3628 of real-time events and/or event updates 3630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 3624 may also be configured to output the structured and/or unstructured data feeds 3626, event streams 3628, event updates 3630, and the like to one or more databases that may be in communication with one or more streaming data source computers coupled to computer system 3600.

Computer system 3600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 3600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method for managing dialogue utilizing one or more dialogue discourse trees, the method comprising:
   receiving a request from a user device, the request comprising an utterance of dialogue between two entities;
   generating an instance of dialogue based at least in part on merging a plurality of utterances previously provided by either of the two entities, the plurality of utterances comprising the utterance of the request;
   identifying, from a corpus of candidate responses, a set of candidate responses for the utterance of the request;
   for a candidate response of the set of candidate responses, generating a dialogue discourse tree for the instance of dialogue and the candidate response, the dialogue discourse tree including nodes corresponding to elementary discourse units representing text fragments of the plurality of utterances and the candidate response, at least one non-terminal node of the nodes in the dialogue discourse tree representing a rhetorical relationship between two elementary discourse units and each terminal node of the nodes of the dialogue discourse tree being associated with an elementary discourse unit, the dialogue discourse tree comprising at least one node representing a dialogue-specific rhetorical relationship between two utterances of the instance of dialogue;
   classifying the dialogue discourse tree for the candidate response utilizing a first machine-learning model, the first machine-learning model being previously trained using a supervised learning technique and a training data set comprising a plurality of dialogue discourse trees previously labeled as valid or invalid; and
   based at least in part on the classifying the dialogue discourse tree for the candidate response, providing the candidate response in response to the request.

2. The computer-implemented method of claim 1, wherein identifying the set of candidate responses from the corpus of candidate responses further comprises:
   determining, for the utterance of the request, a first communicative discourse tree comprising a question root node;
   wherein a second communicative discourse tree comprises an answer root node;
   responsive to identifying that the question root node and the answer root node are identical, merging the first and second communicative discourse trees to form a merged communicative discourse tree;

computing a level of complementarity between the first communicative discourse tree and the second communicative discourse tree by providing the merged communicative discourse tree to a second machine-learning model, the second machine-learning model being previous trained to determine a level of complementarity of sub-trees of two communicative discourse trees; and responsive to determining that the level of complementarity is above a threshold, identifying the utterance of the request and the candidate response as complementary.

3. The computer-implemented method of claim 1, wherein classifying the dialogue discourse tree comprises classifying the dialogue discourse tree for the candidate response as being valid or invalid, wherein a valid classification indicates proper rhetorical flow is maintained between the utterances corresponding to the dialogue discourse tree, and wherein an invalid classification indicates proper rhetorical flow is broken between the utterances corresponding to the dialogue discourse tree.

4. The computer-implemented of claim 1, further comprising:

generating the training data set for the first machine-learning model, based at least in part on generating a plurality of dialogue instances from a corpus of documents, wherein generating a dialogue instance from a document further comprises:

splitting input text of the document into a set of text fragments;

building a communicative discourse tree for a given text fragment of the set of text fragments;

identifying a set of satellite elementary discourse units of the communicative discourse tree for the text fragment;

selecting an entity or an attribute from a satellite elementary discourse unit;

generating a query from the entity or the attribute selected from the satellite elementary discourse unit;

executing the query against a knowledge base;

generating a question corresponding to the satellite elementary discourse unit based at least in part on one or more search results obtained from executing the query;

updating the communicative discourse tree based at least in part on inserting the question as a new node, the new node being inserted based at least in part on the satellite elementary discourse unit; and generating the dialogue instance using the updated communicative discourse tree.

5. The computer-implemented of claim 4, further comprising:

generating a second dialogue discourse tree based at least in part on the dialogue instance, the second dialogue discourse tree including second nodes corresponding to second elementary discourse units representing second text fragments of the dialogue instance, each non-terminal node of the nodes in the second dialogue discourse tree representing a corresponding rhetorical relationship between two elementary discourse units and each terminal node of the nodes of the second dialogue discourse tree being associated with a corresponding elementary discourse unit, the second dialogue discourse tree comprising at least one dialogue-specific rhetorical relationship between two utterances of the second dialogue discourse tree;

associating the second dialogue discourse tree with a label indicating the second dialogue discourse tree is valid; and storing the second dialogue discourse tree and the label as part of the training data set utilized to train the first machine-learning model.

6. The computer-implemented method of claim 1, wherein generating the dialogue discourse tree further comprises:

generating a discourse tree for the candidate response, the discourse tree comprising a set of nodes, each non-terminal node of the set of nodes in the discourse tree representing a corresponding rhetorical relationship between two elementary discourse units and each terminal node of the set of nodes of the discourse tree being associated with a particular elementary discourse unit;

identifying, in the discourse tree, a rhetorical relation of type elaboration or joint, wherein the rhetorical relation relates a first elementary discourse unit and a second elementary discourse unit, and wherein the first elementary discourse unit and the second elementary discourse unit form a reference sentence;

identifying an abstract meaning representation of a template based at least in part on identifying one or more common entities between the discourse tree and the abstract meaning representation of the template;

identifying a semantic relation corresponding to the rhetorical relation, wherein the semantic relation corresponds to a word of the template; and replacing, in the discourse tree, the rhetorical relation with an updated rhetorical relation that corresponds to the semantic relation.

7. The computer-implemented method of claim 1, wherein providing the candidate response as part of the dialogue and in response to the request is further based at least in part on determining that the candidate response is topically relevant to utterance of the request.

8. A non-transitory computer-readable medium storing computer-executable program instructions for managing dialogue utilizing one or more dialogue discourse trees, the instructions, when executed, causing a processor to perform operations comprising:

receiving a request from a user device, the request comprising an utterance of dialogue between two entities;

generating an instance of dialogue based at least in part on merging a plurality of utterances previously provided by either of the two entities, the plurality of utterances comprising the utterance of the request;

identifying, from a corpus of candidate responses, a set of candidate responses for the utterance of the request;

for a candidate response of the set of candidate responses, generating a dialogue discourse tree for the instance of dialogue and the candidate response, the dialogue discourse tree including nodes corresponding to elementary discourse units representing text fragments of the plurality of utterances and the candidate response, at least one non-terminal node of the nodes in the dialogue discourse tree representing a rhetorical relationship between two elementary discourse units and each terminal node of the nodes of the dialogue discourse tree being associated with an elementary discourse unit, the dialogue discourse tree comprising at least one node representing a dialogue-specific rhetorical relationship between two utterances of the instance of dialogue;

classifying the dialogue discourse tree for the candidate response utilizing a first machine-learning model, the first machine-learning model being previously trained using a supervised learning technique and a training data set comprising a plurality of dialogue discourse trees previously labeled as valid or invalid; and based at least in part on the classifying the dialogue discourse tree for the candidate response, providing the candidate response in response to the request.

9. The non-transitory computer-readable medium of claim 8,
wherein identifying the set of candidate responses from the corpus of candidate response comprises operations for:
determining, for the utterance of the request, a first communicative discourse tree comprising a question root node;
determining, for the candidate response, a second communicative discourse tree, wherein the second communicative discourse tree comprises an answer root node;
responsive to identifying that the question root node and the answer root node are identical, merging the first and second communicative discourse trees to form a merged communicative discourse tree;
computing a level of complementarity between the first communicative discourse tree and the second communicative discourse tree by providing the merged communicative discourse tree to a second machine-learning model, the second machine-learning model being previous trained to determine a level of complementarity of sub-trees of two communicative discourse trees; and
responsive to determining that the level of complementarity is above a threshold, identifying the utterance of the request and the candidate response as complementary.

10. The non-transitory computer-readable medium of claim 8, wherein classifying the dialogue discourse tree comprises classifying the dialogue discourse tree for the candidate response as being valid or invalid, wherein a valid classification indicates proper rhetorical flow is maintained between the utterances corresponding to the dialogue discourse tree, and wherein an invalid classification indicates proper rhetorical flow is broken between the utterances corresponding to the dialogue discourse tree.

11. The non-transitory computer-readable medium of claim 8, wherein the operations further comprise:
generating the training data set for the first machine-learning model, based at least in part on generating a plurality of dialogue instances from a corpus of documents, wherein generating a dialogue instance from a document further comprises:
splitting input text of the document into a set of text fragments;
building a communicative discourse tree for a text fragment of the set of text fragments;
identifying a set of satellite elementary discourse units of the communicative discourse tree for the text fragment;
selecting an entity or an attribute from a satellite elementary discourse unit;
generating a query from the entity or the attribute selected from the satellite elementary discourse unit;
executing the query against a knowledge base;
generating a question corresponding to the satellite elementary discourse unit based at least in part on one or more search results obtained from executing the query;
updating the communicative discourse tree based at least in part on inserting the question as a new node, the new node being inserted based at least in part on the satellite elementary discourse unit; and
generating the dialogue instance using the updated communicative discourse tree.

12. The non-transitory computer-readable medium of claim 11, wherein the operations further comprise:
generating a second dialogue discourse tree based at least in part on the dialogue instance generated, the second dialogue discourse tree including second nodes corresponding to second elementary discourse units representing second text fragments of the dialogue instance, each nonterminal node of the nodes in the second dialogue discourse tree representing a corresponding rhetorical relationship between two elementary discourse units and each terminal node of the nodes of the second dialogue discourse tree being associated with a corresponding elementary discourse unit, the second dialogue discourse tree comprising at least one dialogue-specific rhetorical relationship between two utterances of the second dialogue discourse tree;
associating the second dialogue discourse tree with a label indicating the second dialogue discourse tree is valid; and
storing the second dialogue discourse tree and the label as part of the training data set utilized to train the first machine-learning model.

13. The non-transitory computer-readable medium of claim 8, wherein generating the dialogue discourse tree comprises further operations comprising:
generating a discourse tree for the candidate response, the discourse tree comprising a set of nodes, each nonterminal node of the set of nodes in the discourse tree representing a corresponding rhetorical relationship between two elementary discourse units and each terminal node of the set of nodes of the discourse tree being associated with a particular elementary discourse unit;
identifying, in the discourse tree, a rhetorical relation of type elaboration or joint, wherein the rhetorical relation relates a first elementary discourse unit and a second elementary discourse unit, and wherein the first elementary discourse unit and the second elementary discourse unit form a reference sentence;
identifying an abstract meaning representation of a template based at least in part on identifying one or more common entities between the discourse tree and the abstract meaning representation of the template;
identifying a semantic relation corresponding to the rhetorical relation, wherein the semantic relation corresponds to a word of the template; and
replacing, in the discourse tree, the rhetorical relation with an updated rhetorical relation that corresponds to the semantic relation.

14. The non-transitory computer-readable medium of claim 8, wherein providing the candidate response as part of the dialogue and in response to the request is further based at least in part on determining that the candidate response is topically relevant to utterance of the request.

15. A computing device, comprising:
a non-transitory computer-readable medium storing computer-executable program instructions for managing dialogue utilizing one or more dialogue discourse trees; and
a processor communicatively coupled to the non-transitory computer-readable medium for executing the computer-executable program instructions, wherein executing the computer-executable program instructions configures the computing device to perform operations comprising:

receiving a request from a user device, the request comprising an utterance between two entities;

generating an instance of dialogue based at least in part on merging a plurality of utterances previously provided by either of the two entities, the plurality of utterances comprising the utterance of the request;

identifying, from a corpus of candidate responses, a set of candidate responses for the utterance of the request;

for a candidate response of the set of candidate responses, generating a dialogue discourse tree for the instance of dialogue and the candidate response, the dialogue discourse tree including nodes corresponding to elementary discourse units representing text fragments of the plurality of utterances and the candidate response, at least one non-terminal node of the nodes in the dialogue discourse tree representing a rhetorical relationship between two elementary discourse units and each terminal node of the nodes of the dialogue discourse tree being associated with an elementary discourse unit, the dialogue discourse tree comprising at least one node representing a dialogue-specific rhetorical relationship between two utterances of the instance of dialogue;

classifying the dialogue discourse tree for the candidate response utilizing a first machine-learning model, the first machine-learning model being previously trained using a supervised learning technique and a training data set comprising a plurality of dialogue discourse trees previously labeled as valid or invalid; and based at least in part on the classifying the dialogue discourse tree for the candidate response, providing the candidate response as part of the dialogue and in response to the request.

16. The computing device of claim 15, wherein identifying the set of candidate responses from the corpus of candidate response comprises operations for:

determining, for the utterance of the request, a first communicative discourse tree comprising a question root node;

determining, for the candidate response, a second communicative discourse tree, wherein the second communicative discourse tree comprises an answer root node;

responsive to identifying that the question root node and the answer root node are identical, merging the first and second communicative discourse trees to form a merged communicative discourse tree;

computing a level of complementarity between the first communicative discourse tree and the second communicative discourse tree by providing the merged communicative discourse tree to a second machine-learning model, the second machine-learning model being previous trained to determine a level of complementarity of sub-trees of two communicative discourse trees; and responsive to determining that the level of complementarity is above a threshold, identifying the utterance of the request and the candidate response as complementary.

17. The computing device of claim 15, wherein classifying the dialogue discourse tree comprises classifying the dialogue discourse tree for the candidate response as being valid or invalid, wherein a valid classification indicates proper rhetorical flow is maintained between the utterances corresponding to the dialogue discourse tree, and wherein an invalid classification indicates proper rhetorical flow is broken between the utterances corresponding to the dialogue discourse tree.

18. The computing device of claim 15, wherein the operations further comprise:

generating the training data set for the first machine-learning model, based at least in part on generating a plurality of dialogue instances from a corpus of documents, wherein generating a dialogue instance from a document further comprises:

splitting input text of the document into a set of text fragments;

building a communicative discourse tree for a text fragment of the set of text fragments;

identifying a set of satellite elementary discourse units of the communicative discourse tree for the text fragment;

selecting an entity or an attribute from a satellite elementary discourse unit;

generating a query from the entity or the attribute selected from the satellite elementary discourse unit;

executing the query against a knowledge base;

generating a question corresponding to the satellite elementary discourse unit based at least in part on one or more search results obtained from executing the query;

updating the communicative discourse tree based at least in part on inserting the question as a new node, the new node being inserted based at least in part on the satellite elementary discourse unit; and generating the dialogue instance using the updated communicative discourse tree.

19. The computing device of claim 18, wherein the operations further comprise:

generating a second dialogue discourse tree based at least in part on the dialogue instance generated, the second dialogue discourse tree including second nodes corresponding to second elementary discourse units representing second text fragments of the dialogue instance, each nonterminal node of the nodes in the second dialogue discourse tree representing a corresponding rhetorical relationship between two elementary discourse units and each terminal node of the nodes of the second dialogue discourse tree being associated with a corresponding elementary discourse unit, the second dialogue discourse tree comprising at least one dialogue-specific rhetorical relationship between two utterances of the second dialogue discourse tree;

associating the second dialogue discourse tree with a label indicating the second dialogue discourse tree is valid; and storing the second dialogue discourse tree and the label as part of the training data set utilized to train the first machine-learning model.

20. The computing device of claim 15, wherein generating the dialogue discourse tree further comprises:

generating a discourse tree for the candidate response, the discourse tree comprising a set of nodes, each nonterminal node of the set of nodes in the discourse tree representing a corresponding rhetorical relationship between two elementary discourse units and each terminal node of the set of nodes of the discourse tree being associated with a particular elementary discourse unit;

identifying, in the discourse tree, a rhetorical relation of type elaboration or joint, wherein the rhetorical relation relates a first elementary discourse unit and a second elementary discourse unit, and wherein the first elementary discourse unit and the second elementary discourse unit form a reference sentence;

identifying an abstract meaning representation of a template based at least in part on identifying one or more common entities between the discourse tree and the abstract meaning representation of the template;

identifying a semantic relation corresponding to the rhetorical relation, wherein the semantic relation corresponds to a word of the template; and replacing, in the discourse tree, the rhetorical relation with an updated rhetorical relation that corresponds to the semantic relation.

\* \* \* \* \*